US010183587B2

(12) United States Patent
Unno et al.

(10) Patent No.: US 10,183,587 B2
(45) Date of Patent: Jan. 22, 2019

(54) POWER SUPPLY SYSTEM AND POWER TRANSMISSION METHOD

(71) Applicant: HONDA MOTOR CO., LTD., Tokyo (JP)

(72) Inventors: Ryota Unno, Wako (JP); Hirokazu Oguma, Wako (JP); Daijiro Takizawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/415,876

(22) Filed: Jan. 26, 2017

(65) Prior Publication Data
US 2017/0210240 A1 Jul. 27, 2017

(30) Foreign Application Priority Data
Jan. 26, 2016 (JP) ................................. 2016-012120

(51) Int. Cl.
*H02J 7/00* (2006.01)
*B60L 11/18* (2006.01)
(Continued)

(52) U.S. Cl.
CPC ............ *B60L 11/1859* (2013.01); *B60L 7/14* (2013.01); *B60L 11/1803* (2013.01); *B60L 11/1862* (2013.01); *B60L 11/1864* (2013.01); *B60L 11/1868* (2013.01); *B60L 11/1872* (2013.01); *H02J 7/0054* (2013.01); *H02J 7/0065* (2013.01); *H02J 7/0068* (2013.01); *H02M 7/53875* (2013.01); *B60L 2210/10* (2013.01); *B60L 2240/527* (2013.01);
(Continued)

(58) Field of Classification Search
USPC ................................. 320/107, 108, 109, 112
See application file for complete search history.

(56) References Cited

U.S. PATENT DOCUMENTS

2012/0200257 A1 8/2012 Schwarz et al.
2015/0331472 A1* 11/2015 Iwamoto ............... G06F 1/3212
713/323

FOREIGN PATENT DOCUMENTS

JP 2007-089262 4/2007
JP 2008-154302 7/2008
(Continued)

OTHER PUBLICATIONS

Japanese Office Action for corresponding JP Application No. 2016-012120, dated Oct. 17, 2017 (w/ English machine translation).
(Continued)

*Primary Examiner* — Brian Ngo
(74) *Attorney, Agent, or Firm* — Mori & Ward, LLP

(57) ABSTRACT

A power supply system includes a first energy storage, a second energy storage, a power transmission circuit, and circuitry. The circuitry is configured to acquire a remaining capacity and a temperature of the second energy storage. The circuitry is configured to determine a target remaining capacity range of the second energy storage in accordance with the temperature. The circuitry is configured to control the power transmission circuit to control power transmission among the electric load, the first energy storage, and the second energy storage such that the remaining capacity of the second energy storage is within the target remaining capacity range.

20 Claims, 21 Drawing Sheets

(51) Int. Cl.
*B60L 7/14* (2006.01)
*H02M 7/5387* (2007.01)
*H02J 7/34* (2006.01)

(52) U.S. Cl.
CPC ... *B60L 2240/529* (2013.01); *B60L 2240/545* (2013.01); *B60L 2240/547* (2013.01); *B60L 2240/549* (2013.01); *H02J 7/345* (2013.01)

(56) References Cited

FOREIGN PATENT DOCUMENTS

| | | |
|---|---|---|
| JP | 2011-240863 | 12/2011 |
| JP | 2013-085390 | 5/2013 |
| JP | 2014-042404 | 3/2014 |
| WO | WO2013/031615 | 3/2013 |

OTHER PUBLICATIONS

Japanese Office Action for corresponding JP Application No. 2016-012120, dated Mar. 6, 2018 (w/ English machine translation).

\* cited by examiner

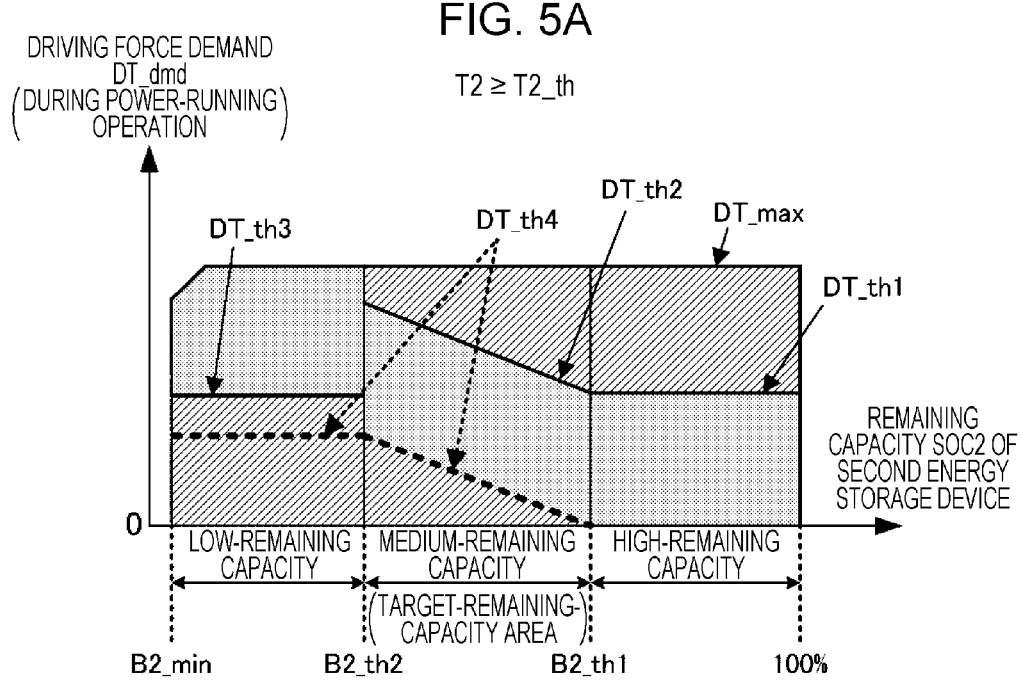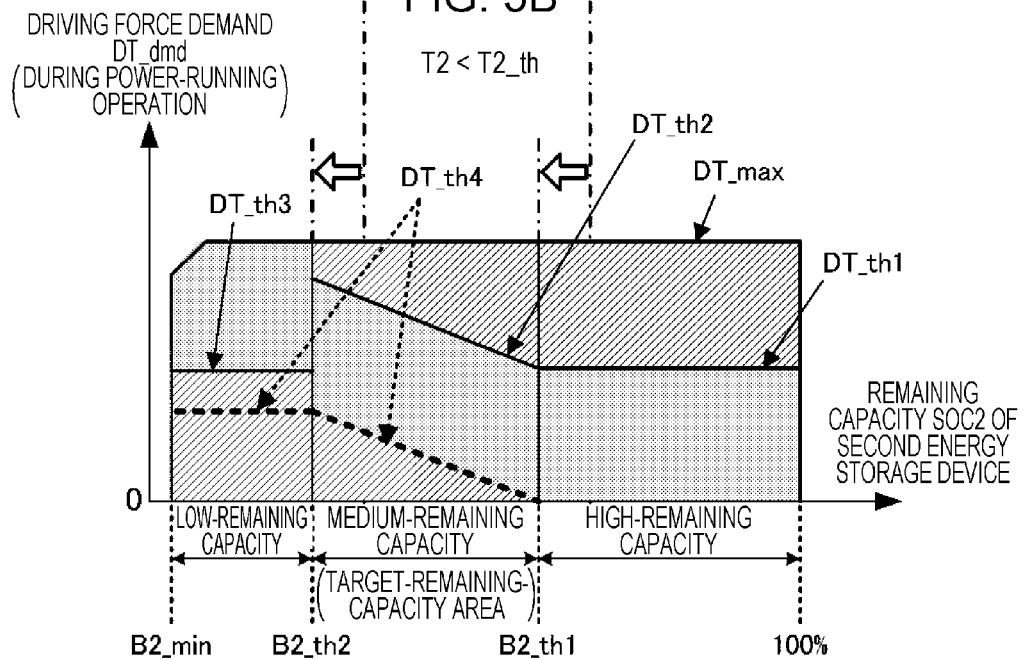

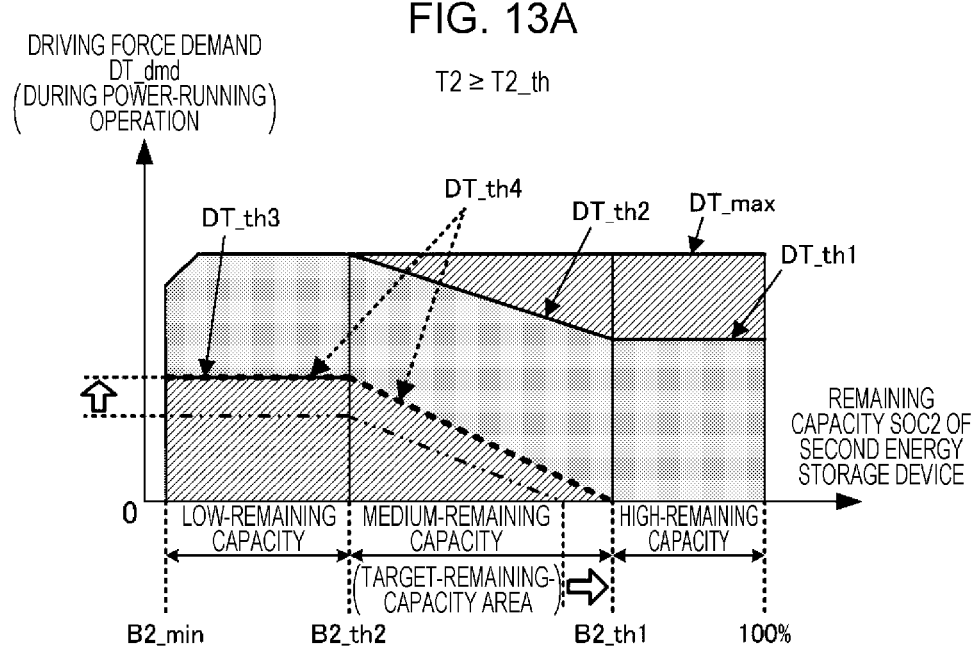
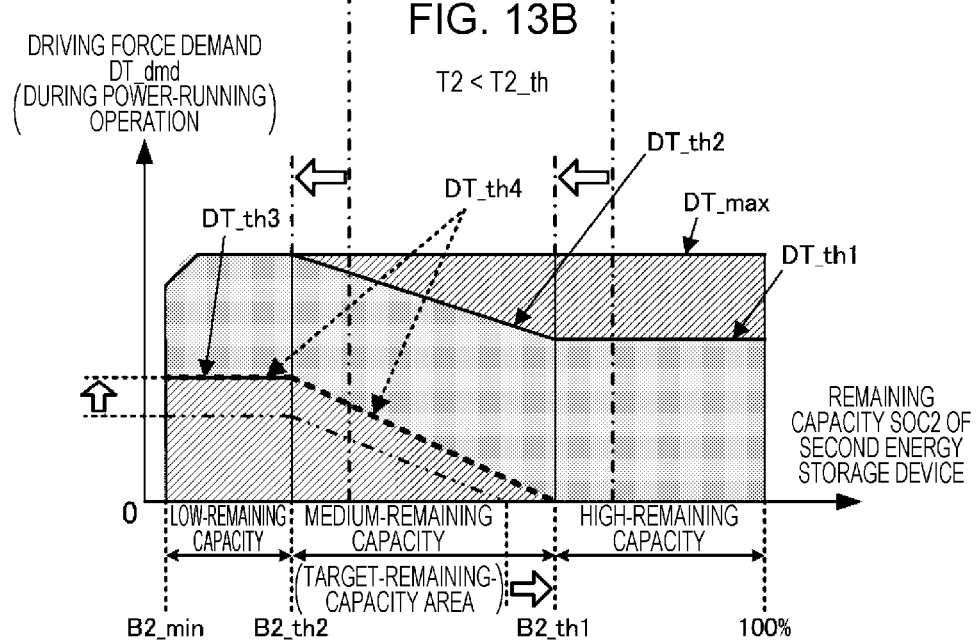

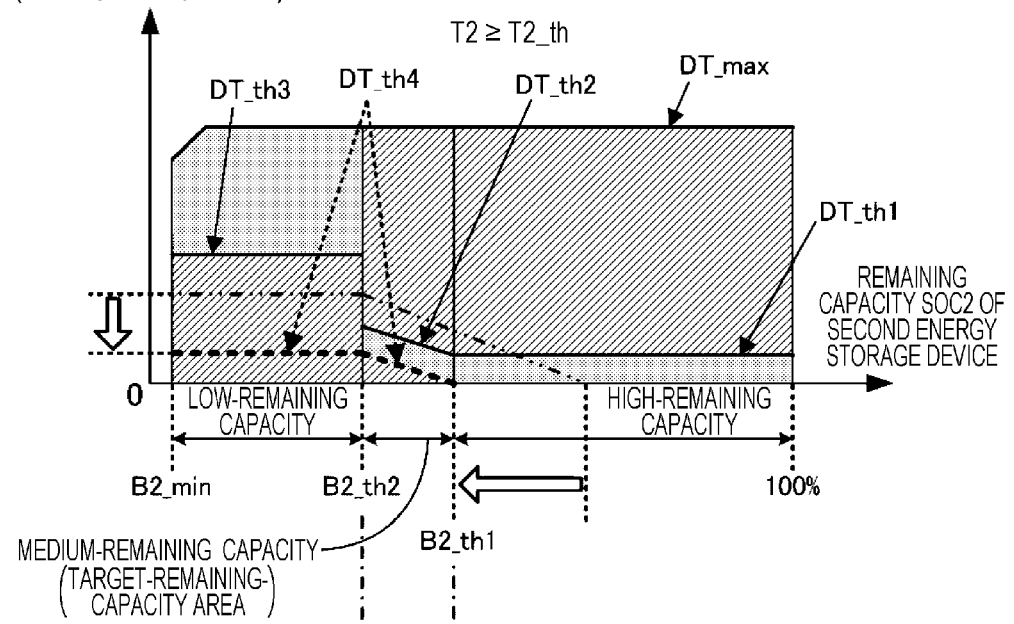
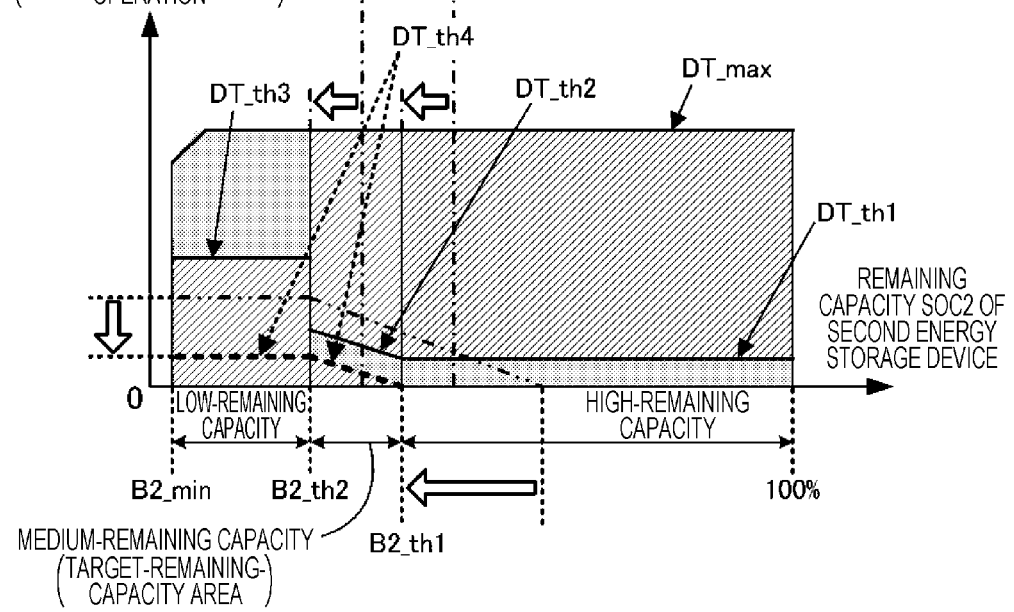

POWER SUPPLY SYSTEM AND POWER TRANSMISSION METHOD

CROSS-REFERENCE TO RELATED APPLICATIONS

The present application claims priority under 35 U.S.C. § 119 to Japanese Patent Application No. 2016-012120, filed Jan. 26, 2016, entitled "Power Supply System, Transportation Device, and Power Transmission Method." The contents of this application are incorporated herein by reference in their entirety.

BACKGROUND

1. Field

The present disclosure relates to a power supply system and a power transmission method.

2. Description of the Related Art

Hitherto, there have been proposed power supply systems of this type, for example, systems for supplying power to an electric motor for a vehicle by using two energy storage devices, as disclosed in Japanese Unexamined Patent Application Publication Nos. 2007-89262 and 2008-154302.

In Japanese Unexamined Patent Application Publication No. 2007-89262, a technique is proposed for using a battery and a capacitor as two energy storage devices and controlling power supply from the battery and the capacitor to an electric motor in different ways for a fuel-efficiency oriented mode and a response oriented mode.

In Japanese Unexamined Patent Application Publication No. 2008-154302, a technique is proposed for adjusting the ratio of distributed target power values for two energy storage devices with respect to a total required power value to reduce the difference in temperature or state of charge (SOC), or remaining capacity, between the two energy storage devices.

SUMMARY

According to a first aspect of the present invention, a power supply system includes a first energy storage, a second energy storage, a power transmission circuit, and circuitry. The first energy storage supplies electric power to an electric load. The second energy storage supplies electric power to the electric load. The electric load is connected to the first energy storage and to the second energy storage via the power transmission circuit. The circuitry is configured to acquire a remaining capacity of the second energy storage. The circuitry is configured to acquire a temperature of the second energy storage. The circuitry is configured to determine a target remaining capacity range of the second energy storage in accordance with the temperature. The circuitry is configured to control the power transmission circuit to control power transmission among the electric load, the first energy storage, and the second energy storage such that the remaining capacity of the second energy storage is within the target remaining capacity range.

According to a second aspect of the present invention, a power transmission method for power transmission among an electric load, a first energy storage, and a second energy storage, the power transmission method includes acquiring a remaining capacity of the second energy storage. A temperature of the second energy storage is acquired. A target remaining capacity range of the second energy storage is determined in accordance with the temperature. The power transmission among the electric load, the first energy storage, and the second energy storage is controlled such that the remaining capacity of the second energy storage is within the target remaining capacity range.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 5A and FIG. 5B illustrate, in map form, the relationship between a driving force demand and the remaining capacity of a second energy storage device in a normal combined-use control process in a first control mode, which is executed in STEP4 in FIG. 4.

FIG. 13A and FIG. 13B illustrate, in map form, the relationship between a driving force demand and the remaining capacity of the second energy storage device in the normal combined-use control process in the second control mode, which is executed in STEP4 in FIG. 4.

FIG. 14A and FIG. 14B illustrate, in map form, the relationship between a driving force demand and the remaining capacity of the second energy storage device in the normal combined-use control process in the third control mode, which is executed in STEP4 in FIG. 4.

DESCRIPTION OF THE EMBODIMENTS

Figure 1:
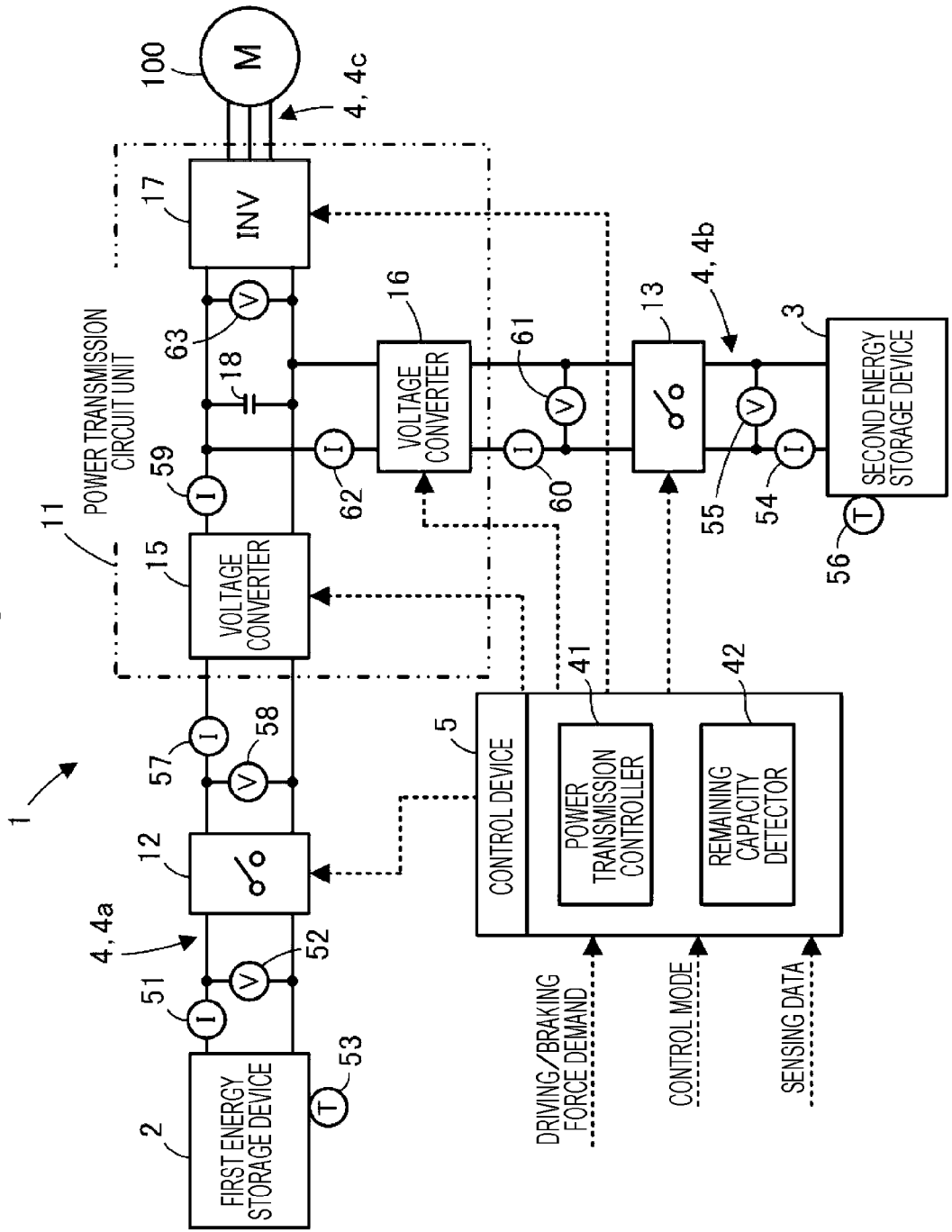
FIG. 1 illustrates an overall configuration of a power supply system according to embodiments of the present disclosure.

The embodiments will now be described with reference to the accompanying drawings, wherein like reference numerals designate corresponding or identical elements throughout the various drawings.

First Embodiment

A first embodiment of the present disclosure will be described hereinafter with reference to FIG. 1 to FIG. 21. Referring to FIG. 1, a power supply system 1 according to this embodiment is a system for supplying power to an electric motor 100. The electric motor 100 is an example of an electric load.

In this embodiment, by way of example, the power supply system 1 is mounted in a transportation device, for example, an electrically driven vehicle (not illustrated), that includes the electric motor 100 as a propulsion generator. The electric motor 100 is capable of performing a power-running operation for generating a driving force upon being supplied with power, and also performing a regenerative operation for outputting regenerative power by using the kinetic energy of the electrically driven vehicle (hereinafter sometimes referred to simply as vehicle).

The power supply system 1 includes a first energy storage device 2, a second energy storage device 3, a power transmission path 4 provided among the electric motor 100, the first energy storage device 2, and the second energy storage device 3, and a control device 5 having a function of controlling activation of the power supply system 1. The first energy storage device 2 and the second energy storage device 3 serve as power sources. The power supply system 1 may also include electric loads such as auxiliaries, in addition to the electric motor 100.

In this embodiment, the first energy storage device 2 and the second energy storage device 3 are rechargeable energy storage devices having different characteristics. Specifically, the first energy storage device 2 and the second energy storage device 3 have the following characteristics.

The first energy storage device 2 is an energy storage device having a higher energy density than the second energy storage device 3. The energy density is an amount of electrical energy storable per unit weight or unit volume. The first energy storage device 2 may be a lithium-ion battery, for example.

The second energy storage device 3 is an energy storage device having a higher power density than the first energy storage device 2. The power density is an amount of electricity that can be output per unit weight or unit volume (an amount of electrical energy per unit time or an amount of charge per unit time). Examples of the second energy storage device 3 may include a lithium-ion battery, a nickel-hydrogen battery, and a capacitor.

The first energy storage device 2 with a relatively high energy density is capable of storing a greater amount of electrical energy than the second energy storage device 3. The second energy storage device 3 with a relatively high power density has a lower impedance than the first energy storage device 2, and is thus capable of outputting instantaneously high power.

In addition, the first energy storage device 2 is an energy storage device having a lower resistance to deterioration due to changes in the input or output of the first energy storage device 2 (the amount of power discharged from the first energy storage device 2 or the amount of charging power used to charge the first energy storage device 2) than the second energy storage device 3. Thus, if the first energy storage device 2 is discharged or charged in such a manner that changes in the input or output of the first energy storage device 2 frequently occur, deterioration of the first energy storage device 2 is more likely to progress than that of the second energy storage device 3. When the first energy storage device 2 is discharged or charged steadily in such a manner that changes in the input or output thereof are less likely to occur, progression of deterioration of the first energy storage device 2 is restrained, compared with when the first energy storage device 2 is discharged or charged in such a manner that changes in the input or output of the first energy storage device 2 frequently occur.

In contrast, even if the second energy storage device 3 having a relatively high resistance to deterioration due to changes in the input or output of the second energy storage device 3 is discharged in such a manner that changes in the input or output of the second energy storage device 3 frequently occur, deterioration of the second energy storage device 3 is less likely to progress than that of the first energy storage device 2.

Furthermore, the first energy storage device 2 and the second energy storage device 3 have the following charging characteristics. The first energy storage device 2 has a lower resistance to deterioration due to charging (in particular, charging at high rates) (i.e., deterioration caused by charging is more likely to progress) than the second energy storage device 3, whereas the second energy storage device 3 has a higher resistance to deterioration due to charging (i.e., deterioration caused by charging is less likely to progress) than the first energy storage device 2.

The second energy storage device 3 further has a characteristic in that discharging or charging with the remaining capacity being kept at an approximately intermediate value results in the progression of deterioration being prevented, compared with discharging or charging with the remaining capacity being biased toward the high-capacity side or the low-capacity side. More specifically, the second energy storage device 3 has a characteristic in that deterioration of the second energy storage device 3 is more likely to progress as the remaining capacity of the second energy storage device 3 increases to the high-capacity side or decreases to the low-capacity side from an approximately intermediate value.

The power transmission path 4 is constituted by a current-carrying line, a wiring pattern on a substrate, or the like. The power transmission path 4 has provided therein a power transmission circuit unit 11 for controlling power transmission among the first energy storage device 2, the second energy storage device 3, and the electric motor 100.

The power transmission path 4 includes a power transmission path segment 4a for power transmission between the first energy storage device 2 and the power transmission circuit unit 11, a power transmission path segment 4b for power transmission between the second energy storage device 3 and the power transmission circuit unit 11, and a power transmission path segment 4c for power transmission between the electric motor 100 and the power transmission circuit unit 11. The power transmission path segments 4a and 4b are respectively provided with contactors 12 and 13 as switch units for connection and disconnection of the power transmission path segments 4a and 4b.

The power transmission circuit unit 11 is configured to be capable of controlling power transmission among the first energy storage device 2, the second energy storage device 3, and the electric motor 100 in accordance with a control signal provided by the control device 5. More specifically, the power transmission circuit unit 11 is capable of selectively switching between the source and destination of power supply and controlling an amount of power supplied (a supplied power) from the source to the destination in accordance with the provided control signal.

Specifically, the power transmission circuit unit 11 includes a voltage converter 15, a voltage converter 16, and an inverter 17. The voltage converter 15 is capable of boosting or stepping down a voltage input from the first energy storage device 2 and outputting the resulting voltage. The voltage converter 16 is capable of boosting or stepping down a voltage input from the second energy storage device 3 and outputting the resulting voltage. The inverter 17 is capable of converting direct-current (DC) power into alternating-current (AC) power and outputting the AC power.

The voltage converters 15 and 16 are connected in parallel on the input side of the inverter 17. The inverter 17 is further provided with a capacitor 18 on the input side thereof (the output side of the voltage converters 15 and 16). The capacitor 18 smooths the DC voltage to be input to the inverter 17 (the DC voltage output from the voltage converter 15 or 16).

The power transmission circuit unit 11 may be a circuit unit including the contactors 12 and 13.

Figure 2:
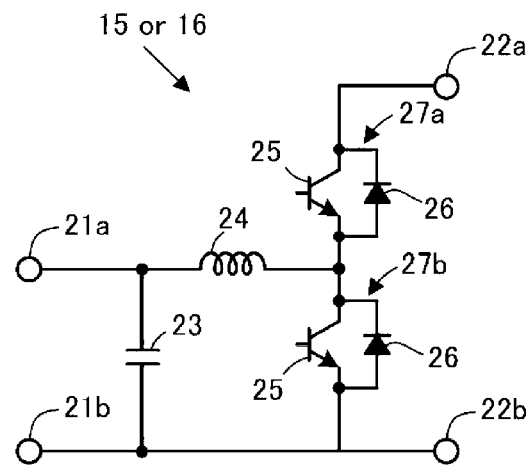
FIG. 2 illustrates an example circuit configuration of a voltage converter in the power supply system according to the embodiments.

The voltage converters 15 and 16 are so-called DC/DC converters, and may be each a known one. FIG. 2 illustrates an example circuit configuration of the voltage converters 15 and 16. The voltage converter 15 or 16 having the illustrated circuit configuration is a voltage converter capable of boosting the output voltage of the corresponding one of the first energy storage device 2 and the second energy storage device 3 and outputting the resulting voltage. The voltage converter 15 or 16 includes a pair of primary-side terminals 21a and 21b connected to the corresponding one of the first energy storage device 2 and the second energy storage device 3, a pair of secondary-side terminals 22a and 22b connected to the inverter 17, a capacitor 23, a coil 24, and high-side and low-side two switch units 27a and 27b. The capacitor 23, the coil 24, and the switch units 27a and 27b are connected between the pair of primary-side terminals 21a and 21b and the pair of secondary-side terminals 22a and 22b in an illustrated manner. Each of the switch units 27a and 27b includes a semiconductor switch element 25, such as a transistor, and a diode 26, which are connected in parallel.

The voltage converter 15 or 16 having the configuration described above is capable of controlling the respective semiconductor switch elements 25 of the switch units 27a and 27b to be turned on or off in accordance with a control signal having a predetermined duty ratio (so-called duty signal) to output a DC voltage, which is obtained by boosting a DC voltage input to the primary-side terminals 21a and 21b at a required boosting ratio, from the secondary-side terminals 22a and 22b or to output a DC voltage, which is obtained by stepping down a DC voltage input to the secondary-side terminals 22a and 22b at a required step-down ratio, from the primary-side terminals 21a and 21b. The boosting ratio or the step-down ratio is variably controllable.

The voltage converter 15 or 16 is further capable of controlling the respective semiconductor switch elements 25 of the switch units 27a and 27b to be turned off to interrupt current flow (power transmission) from the secondary side to the primary side.

As a supplementary explanation, the voltage converters 15 and 16 may have a circuit configuration other than that illustrated in FIG. 2. Furthermore, any one or both of the voltage converters 15 and 16 may be configured to step down a voltage input from the first energy storage device 2 or the second energy storage device 3 and to output the resulting voltage. One of the voltage converters 15 and 16 may be omitted. The necessity of the voltage converter 15 or 16 or the voltage conversion type of the voltage converter 15 or 16 (namely, boosting or stepping down) may be selected from a variety of combinations in accordance with the voltage necessary to activate the electric load, the respective output voltages of the first energy storage device 2 and the second energy storage device 3, and so on.

For example, the first energy storage device 2 is a higher-voltage energy storage device than the second energy storage device 3. In this case, if one of the voltage converters 15 and 16 is to be omitted, it is more preferable that the voltage converter 15, which is connected to the first energy storage device 2, be omitted. Omission of one of the voltage converters 15 and 16 can reduce the cost required to realize a power supply system.

Figure 3:
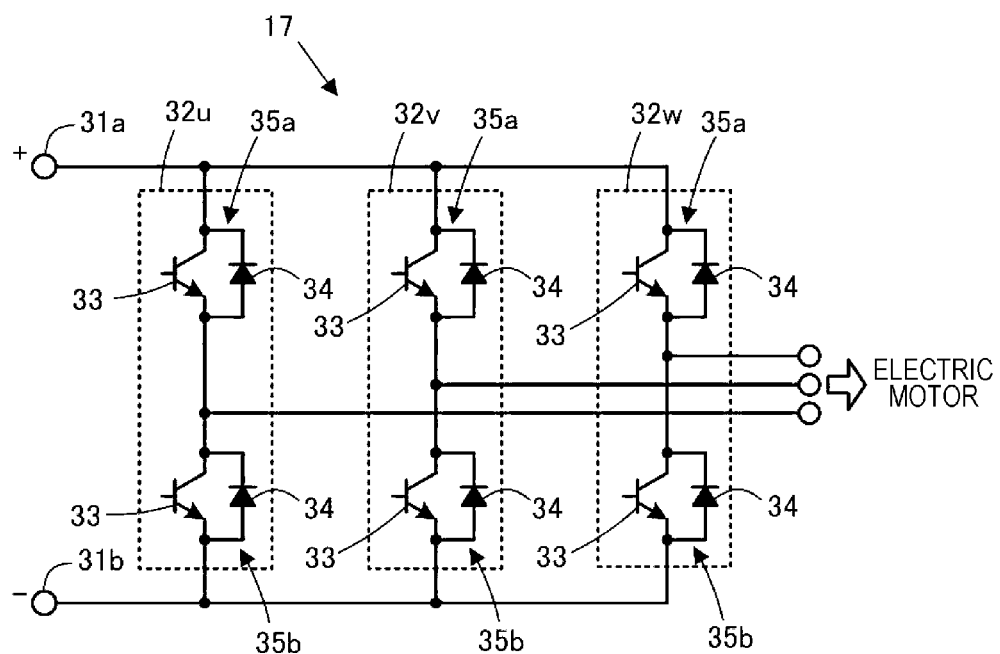
FIG. 3 illustrates an example circuit configuration of an inverter in the power supply system according to the embodiments.

The inverter 17 may be an inverter having a known circuit configuration. FIG. 3 illustrates an example circuit configuration of the inverter 17 when the electric motor 100 is a three-phase electric motor, for example. The inverter 17 illustrated in FIG. 3 is configured such that three-phase arms 32u, 32v, and 32w of the U, V, and W phases are connected in parallel between a pair of power supply terminals 31a and 31b to which a DC voltage is applied. Each of the arms 32u, 32v, and 32w of the respective phases includes high-side and low-side two switch units 35a and 35b that are connected in series. Each of the switch units 35a and 35b includes a diode 34 and a semiconductor switch element 33 such as a transistor that are connected in parallel. The midpoints of the switch units 35a and 35b of the arms 32u, 32v, and 32w of the respective phases serve as three-phase AC power output units.

The inverter 17 having the configuration described above is capable of controlling the respective semiconductor switch elements 33 of the switch units 35a and 35b of the arms 32u, 32v, and 32w of the respective phases to be turned on or off in accordance with a control signal generated by using the pulse width modulation (PWM) control method or the like to convert a DC power input to the power supply terminals 31*a* and 31*b* into three-phase AC power, and outputting the AC power to the electric motor 100 (the electric motor 100 which is in power-running operation).

During the regenerative operation of the electric motor 100 (during generation of power), the inverter 17 is capable of controlling the respective semiconductor switch elements 33 of the switch units 35*a* and 35*b* of the arms 32*u*, 32*v*, and 32*w* of the respective phases to be turned on or off in accordance with a control signal having a predetermined duty ratio (so-called duty signal) to convert a three-phase AC power input from the electric motor 100 into DC power, and outputting the DC power from the power supply terminals 31*a* and 31*b*.

As a supplementary explanation, the number of phases (the number of arms) of the inverter 17 is set in accordance with the number of phases of the AC power necessary to activate the electric load. If the electric load is an electric load (e.g., a DC motor) activated by causing DC power to flow therethrough, the inverter 17 may be omitted.

The power transmission circuit unit 11 having the configuration described above is configured to control the voltage converters 15 and 16 and the inverter 17 (specifically, provide each of the voltage converters 15 and 16 and the inverter 17 with a control signal (duty signal having a predetermined duty ratio) for turning on or off the semiconductor switch elements 25 or 33) to control power transmission among the first energy storage device 2, the second energy storage device 3, and the electric motor 100.

For example, the following operation may be performed during the power-running operation of the electric motor 100: supplying power from one or both of the first energy storage device 2 and the second energy storage device 3 to the electric motor 100, supplying power from the first energy storage device 2 to the second energy storage device 3 to charge the second energy storage device 3, or charging one or both of the first energy storage device 2 and the second energy storage device 3 with regenerative power obtained during the regenerative operation of the electric motor 100.

In this embodiment, the first energy storage device 2 is not charged with power supplied by the second energy storage device 3. However, the power transmission circuit unit 11 may be controlled to charge the first energy storage device 2 with power supplied by the second energy storage device 3.

The control device 5 is constituted by an electronic circuit unit including a central processing unit (CPU), a random access memory (RAM), a read-only memory (ROM), an interface circuit, and so on. The control device 5 may be constituted by a plurality of electronic circuit units that are capable of communicating with each other.

The control device 5 includes a power transmission controller 41 and a remaining capacity detector 42 as functions implemented by a hardware configuration to be mounted therein or a program (software configuration) installed therein. The power transmission controller 41 controls the power transmission circuit unit 11 to control power transmission among the first energy storage device 2, the second energy storage device 3, and the electric motor 100. The remaining capacity detector 42 detects the respective remaining capacities (called states of charge (SOCs)) of the first energy storage device 2 and the second energy storage device 3.

The control device 5 receives, as information necessary to implement the functions described above, a driving/braking force demand, a control mode, and various kinds of sensing data. The driving/braking force demand is constituted by a driving force demand that is a request value for a driving force (driving torque) to be generated by the electric motor 100 during the power-running operation or a braking force demand that is a request value for a braking force (regenerative torque) to be generated by the electric motor 100 during the regenerative operation. The control mode specifies how the power transmission circuit unit 11 is controlled.

The driving/braking force demand is set by a vehicle control device (not illustrated) while an electrically driven vehicle in which the power supply system 1 according to this embodiment is mounted is traveling, in accordance with values such as the respective detected values of the amount of operation of the accelerator pedal and the amount of operation of the brake pedal.

The control device 5 may have a function of setting a driving/braking force demand.

The control mode is set by, for example, the driver of the electrically driven vehicle by operating a mode switching operation device (not illustrated). In this embodiment, three control modes, namely, first to third control modes described below, are selectively set for the control device 5. The control mode may be automatically set in accordance with the state of travel of the electrically driven vehicle, the environment in which the electrically driven vehicle is traveling, or the like.

As to the sensing data, for example, the following data is input to the control device 5: the detection data of a current sensor 51, a voltage sensor 52, a temperature sensor 53, a current sensor 54, a voltage sensor 55, a temperature sensor 56, a current sensor 57, a voltage sensor 58, a current sensor 59, a current sensor 60, a voltage sensor 61, a current sensor 62, and a voltage sensor 63. The current sensor 51 detects a current flowing through the first energy storage device 2. The voltage sensor 52 detects an output voltage of the first energy storage device 2. The temperature sensor 53 detects a temperature of the first energy storage device 2. The current sensor 54 detects a current flowing through the second energy storage device 3. The voltage sensor 55 detects an output voltage of the second energy storage device 3. The temperature sensor 56 detects a temperature of the second energy storage device 3. The current sensor 57 and the voltage sensor 58 detect a current and voltage on the input side of the voltage converter 15 (the first energy storage device 2 side), respectively. The current sensor 59 detects a current on the output side of the voltage converter 15 (the inverter 17 side). The current sensor 60 and the voltage sensor 61 detect a current and voltage on the input side of the voltage converter 16 (the second energy storage device 3 side), respectively. The current sensor 62 detects a current on the output side of the voltage converter 16 (the inverter 17 side). The voltage sensor 63 detects a voltage on the input side of the inverter 17 (the voltages on the respective output sides of the voltage converters 15 and 16). The above-described pieces of detection data are input to the control device 5.

The remaining capacity detector 42 of the control device 5 sequentially detects (estimates) the remaining capacity of the first energy storage device 2 by using the detection data of the sensors for the first energy storage device 2, namely, the current sensor 51, the voltage sensor 52, and the temperature sensor 53, for example. Further, the remaining capacity detector 42 sequentially detects (estimates) the remaining capacity of the second energy storage device 3 by using the detection data of the sensors for the second energy storage device 3, namely, the current sensor 54, the voltage sensor 55, and the temperature sensor 56, for example.

There have hitherto been proposed a variety of techniques for detecting the remaining capacity of an energy storage device. A known technique may be employed as a technique for detecting the remaining capacities of the first energy storage device 2 and the second energy storage device 3.

The technique for detecting the respective remaining capacities of the first energy storage device 2 and the second energy storage device 3 may be a technique that does not use the detection data of any one of the current flow, the output voltage, and the temperature, or a technique that uses any other detection data. A detection device different from the control device 5 may perform a process of detecting the respective remaining capacities of the first energy storage device 2 and the second energy storage device 3.

The power transmission circuit unit 11 controls the voltage converters 15 and 16 and the inverter 17 of the power transmission circuit unit 11 by appropriately using, for example, the detection data of the current sensors 57, 59, 60, and 62 and the voltage sensors 58, 61, and 63, the detection data of the temperature sensors 53 and 56, the driving/braking force demand of the electric motor 100, and the detected values of the respective remaining capacities of the first energy storage device 2 and the second energy storage device 3, which are obtained by the remaining capacity detector 42.

Control Process for Power Transmission Controller

A control process for the power transmission controller 41 of the control device 5 will now be described in detail hereinafter.

Figure 4:
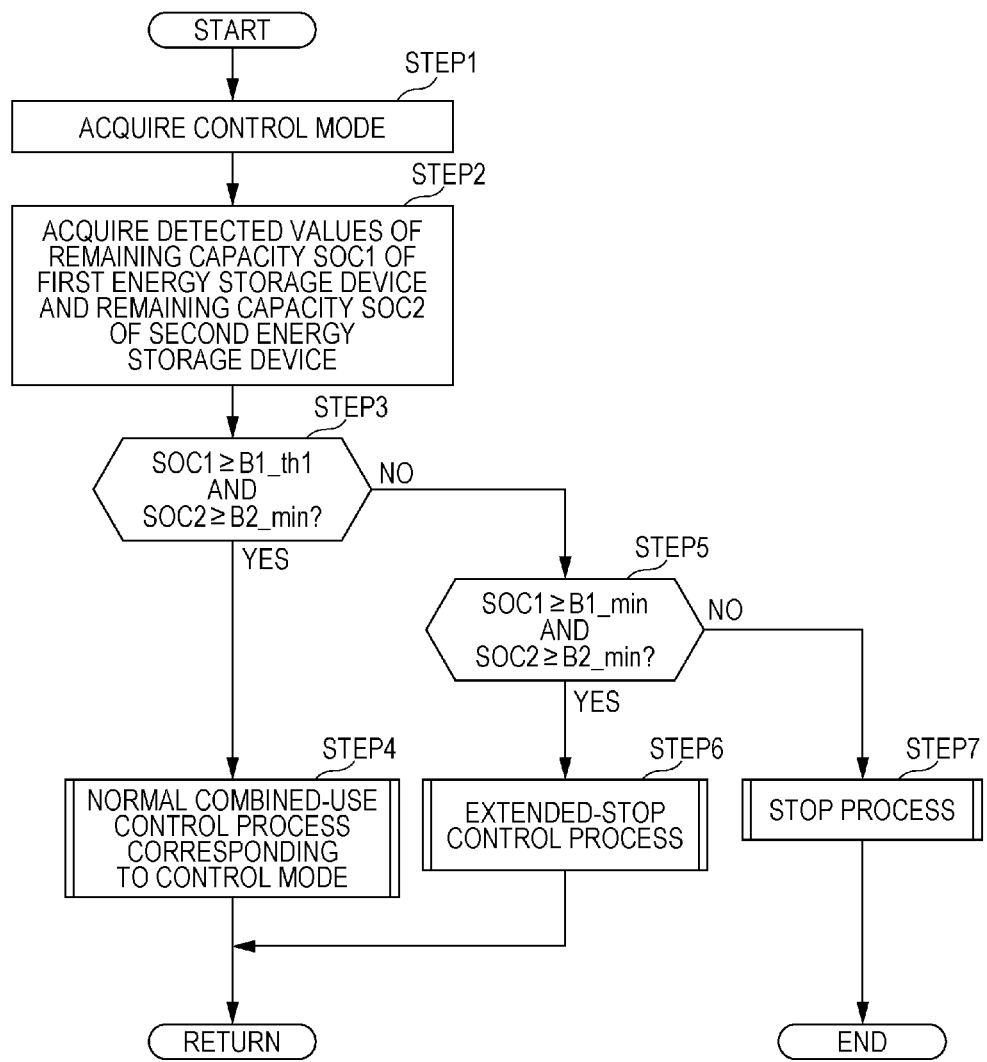
FIG. 4 is a flowchart of a control process for a control device in the power supply system according to the embodiments.

During the travel of the vehicle, the control device 5 sequentially executes a control process illustrated in a flowchart in FIG. 4 by using the power transmission controller 41 at intervals of a predetermined control process period. The control process illustrated in the flowchart in FIG. 4 is a control process performed during the power-running operation of the electric motor 100.

In STEP1, the power transmission controller 41 acquires the currently set control mode. Then, in STEP2, the power transmission controller 41 acquires, from the remaining capacity detector 42, a detected value of the remaining capacity SOC1 of the first energy storage device 2 (hereinafter sometimes referred to as the first remaining capacity SOC1) and a detected value of the remaining capacity SOC2 of the second energy storage device 3 (hereinafter sometimes referred to as the second remaining capacity SOC2).

Then, in STEP3, the power transmission controller 41 determines whether or not the following conditions hold true: the detected value of the first remaining capacity SOC1 is greater than or equal to a predetermined threshold value B1_th1 and the detected value of the second remaining capacity SOC2 is greater than or equal to a predetermined lower limit B2_min.

The threshold value B1_th1 for the first remaining capacity SOC1 is a threshold value determined in advance as a limit value of the first remaining capacity SOC1 which is required for a normal combined-use control process described below. The threshold value B1_th1 may be, for example, a limit remaining capacity value that allows only the first energy storage device 2 to supply a supplied power required for the electric motor 100 to generate a certain output (e.g., a supplied power required for the vehicle to cruise at a predetermined vehicle speed) to the electric motor 100. The threshold value B1_th1 is set to a value slightly higher than a lower limit B1_min (a near-zero value). The lower limit B1_min is a limit remaining capacity value that allows the first energy storage device 2 to supply power to outside so as not to cause deterioration of the first energy storage device 2.

The lower limit B2_min for the second remaining capacity SOC2 is a limit remaining capacity value (a near-zero value) that allows the second energy storage device 3 to supply power to outside so as not to cause deterioration of the second energy storage device 3.

The determination result of STEP3 is affirmative when the first remaining capacity SOC1 and the second remaining capacity SOC2 take values that fall in a normal range (common range). In this situation, in STEP4, the power transmission controller 41 executes a normal combined-use control process corresponding to the currently set control mode. The normal combined-use control process is a process for controlling the power transmission circuit unit 11 to supply power from one or both of the first energy storage device 2 and the second energy storage device 3 to the electric motor 100 in the manner corresponding to the control mode and to, when power is supplied from the first energy storage device 2 to the electric motor 100, supply power from the first energy storage device 2 to charge the second energy storage device 3, if necessary. The details of the normal combined-use control process will be described below.

The normal combined-use control process allows the second energy storage device 3 to be charged with power supplied from the first energy storage device 2, if necessary, whereas the remaining capacity SOC1 of the first energy storage device 2 decreases. Thus, the first remaining capacity SOC1 becomes smaller than the threshold value B1_th1 and the determination result of STEP3 becomes negative.

When the determination result of STEP3 is negative, then, in STEP5, the power transmission controller 41 determines whether or not the following conditions hold true: the detected value of the first remaining capacity SOC1 is greater than or equal to the lower limit B1_min and the detected value of the second remaining capacity SOC2 is greater than or equal to the lower limit B2_min.

The determination result of STEP5 is affirmative when, in particular, the remaining capacity of the first energy storage device 2 is low but it is possible to supply power to the electric motor 100 for a certain time period by the cooperation of the first energy storage device 2 and the second energy storage device 3 so as to allow the electric motor 100 to generate a demanded driving force.

In this situation, in STEP6, the power transmission controller 41 executes an extended-stop control process. The extended-stop control process is a process for controlling the power transmission circuit unit 11 so that the remaining capacity of both the first energy storage device 2 and the second energy storage device 3 is consumed as much as possible. The details of the extended-stop control process will be described below.

The determination result of STEP5 is negative when it is difficult to supply power from the first energy storage device 2 and the second energy storage device 3 to the electric motor 100. In this situation, the power transmission controller 41 executes a stop process in STEP7. In the stop process, the power transmission controller 41 controls the voltage converters 15 and 16 or the contactors 12 and 13 to interrupt the output of the first energy storage device 2 and the second energy storage device 3 (discharging to the load side) and to hold the interruption state.

In the stop process, the control device 5 generates an alarm output (visual output or audio output) to alert the vehicle driver that, for example, the vehicle is no longer able to travel or the electric motor 100 is no longer able to operate due to the insufficient remaining capacity of the first energy storage device 2 and the second energy storage device 3.

Normal Combined-Use Control Process

The normal combined-use control process in STEP4 will now be described in detail. Brief definitions of terms as used in the following description are presented below.

In the following description, the "output" or "input" of each of the first energy storage device 2 and the second energy storage device 3, the "supplied power", or the "charging power" refers to an amount of electricity expressed as a value of (electric) power (an amount of electrical energy per unit time), for example.

The "supplied power corresponding to a driving force demand DT_dmd" of the electric motor 100 refers to a supplied power that allows a driving force generated by the electric motor 100 when this power is supplied to the electric motor 100 to be identical to or substantially identical to the driving force demand DT_dmd.

The "supplied power corresponding to the driving force demand DT_dmd" is based on the driving force demand DT_dmd and the rotational speed of the electric motor 100 (specifically, the rotational speed of a rotor or an output shaft of the electric motor 100) when the "supplied power" refers to an amount of electricity expressed as a value of (electric) power. The value of the "supplied power corresponding to the driving force demand DT_dmd" can be determined by using, for example, the driving force demand DT_dmd and the detected value of the rotational speed of the electric motor 100 in accordance with a map or an operational expression.

The "supplied power corresponding to a certain threshold value" related to the driving force demand DT_dmd refers to a supplied power that corresponds to the driving force demand DT_dmd when the driving force demand DT_dmd is made to coincide with the threshold value.

First Control Mode

Based on the terms defined above, a case in which the control mode is set to the first control mode, which is a basic control mode among the first to third control modes, will be described with reference to FIG. 5A to FIG. 10.

The first control mode is a control mode for controlling the power transmission circuit unit 11 so that the progression of deterioration of the first energy storage device 2 and the second energy storage device 3 can be restrained as much as possible.

An overview of the normal combined-use control process in the first control mode will be described with reference to FIG. 5A and FIG. 5B. FIG. 5A and FIG. 5B illustrate, in map form, the relationship in the first control mode between the second remaining capacity SOC2 and the proportion of powers to be output by the first energy storage device 2 and the second energy storage device 3 with respect to the amount of electricity to be supplied (the supplied power) to the electric motor 100 in accordance with the driving force demand DT_dmd of the electric motor 100.

FIG. 5A illustrates the case where a temperature T2 of the second energy storage device 3 (hereinafter sometimes referred to as the second temperature T2) is greater than or equal to a predetermined threshold temperature T2_th, and FIG. 5B illustrates the case where the second temperature T2 is lower than the threshold temperature T2_th. Temperatures greater than or equal to the threshold temperature T2_th represent a normal temperature range of the second energy storage device 3 in a room temperature environment, for example, and temperatures lower than the threshold temperature T2_th represent a temperature range of the second energy storage device 3 that occurs in a low-temperature environment such as in winter. In the following, a condition in which the second temperature T2 is lower than the threshold temperature T2_th is sometimes referred to as the low-temperature condition of the second energy storage device 3, and a condition in which the second temperature T2 is greater than or equal to the threshold temperature T2_th is sometimes referred to as the non-low-temperature condition of the second energy storage device 3.

In FIG. 5A and FIG. 5B, diagonally hatched areas represent areas in which the first energy storage device 2 is responsible for supplying part or all of the power to be supplied to the electric motor 100, and shaded areas represent areas in which the second energy storage device 3 is responsible for supplying part or all of the power to be supplied to the electric motor 100.

More specifically, in each of FIG. 5A and FIG. 5B, a diagonally hatched area adjoining the line (horizontal axis) along which the driving force demand DT_dmd=0 holds represents an area within which only the first energy storage device 2 is responsible for supplying all of the power to be supplied to the electric motor 100, and a shaded area adjoining the line (horizontal axis) represents an area within which only the second energy storage device 3 is responsible for supplying all of the power to be supplied to the electric motor 100.

Furthermore, a shaded area above the diagonally hatched area or a diagonally hatched area above the shaded area represents an area within which both the first energy storage device 2 and the second energy storage device 3 are responsible for supplying the power to be supplied to the electric motor 100.

In the normal combined-use control process in the first control mode, as illustrated in FIG. 5A or FIG. 5B, the proportion of powers to be output by the first energy storage device 2 and the second energy storage device 3 in accordance with the driving force demand DT_dmd of the electric motor 100 is different depending on when the value of the second remaining capacity SOC2 falls within a high-remaining-capacity area that satisfies SOC2≥B2_th1 (including the remaining capacity value reaching full state-of-charge (100%)), when the value of the second remaining capacity SOC2 falls within a medium-remaining-capacity area that satisfies B2_th1>SOC2≥B2_th2, or when the value of the second remaining capacity SOC2 falls within a low-remaining-capacity area that satisfies B2_th2>SOC2. In this embodiment, the normal combined-use control process is a process performed when the detected value of the second remaining capacity SOC2 is greater than or equal to the lower limit B2_min. Thus, the low-remaining-capacity area is, more specifically, a remaining-capacity area that satisfies B2_th2>SOC2≥B2_min.

The supplied power corresponding to the driving force demand DT_dmd of the electric motor 100 is supplied from one or both of the first energy storage device 2 and the second energy storage device 3 to the electric motor 100 in the proportion corresponding to the high-, medium-, or low-remaining-capacity area. In the medium-remaining-capacity area and the low-remaining-capacity area, furthermore, in parallel to power supply to the electric motor 100, power is supplied from the first energy storage device 2 to charge the second energy storage device 3, if necessary.

In both the non-low-temperature condition (where T2≥T2_th is satisfied) and the low-temperature condition (where T2<T2_th is satisfied) of the second energy storage device 3, the medium-remaining-capacity area whose upper limit corresponds to the threshold value B2_th1 and lower limit corresponds to the threshold value B2_th2 is a target-remaining-capacity area of the second energy storage device 3. Further, the second energy storage device 3 is charged and discharged in such a manner that power is supplied to the electric motor 100 and power is supplied to charge the second energy storage device 3 so that the actual second remaining capacity SOC2 (detected value) converges to a value within the medium-remaining-capacity area (in this embodiment, substantially the middle value in the medium-remaining-capacity area), which is the target-remaining-capacity area, as much as possible (and thus the second remaining capacity SOC2 (detected value) is maintained to fall within the medium-remaining-capacity area as much as possible).

The upper limit B2_th1 and the lower limit B2_th2 of medium-remaining-capacity area are set in accordance with the control mode and the second temperature T2 (detected value).

The normal combined-use control process in the first control mode will now be described in a specific manner.

Figure 6:
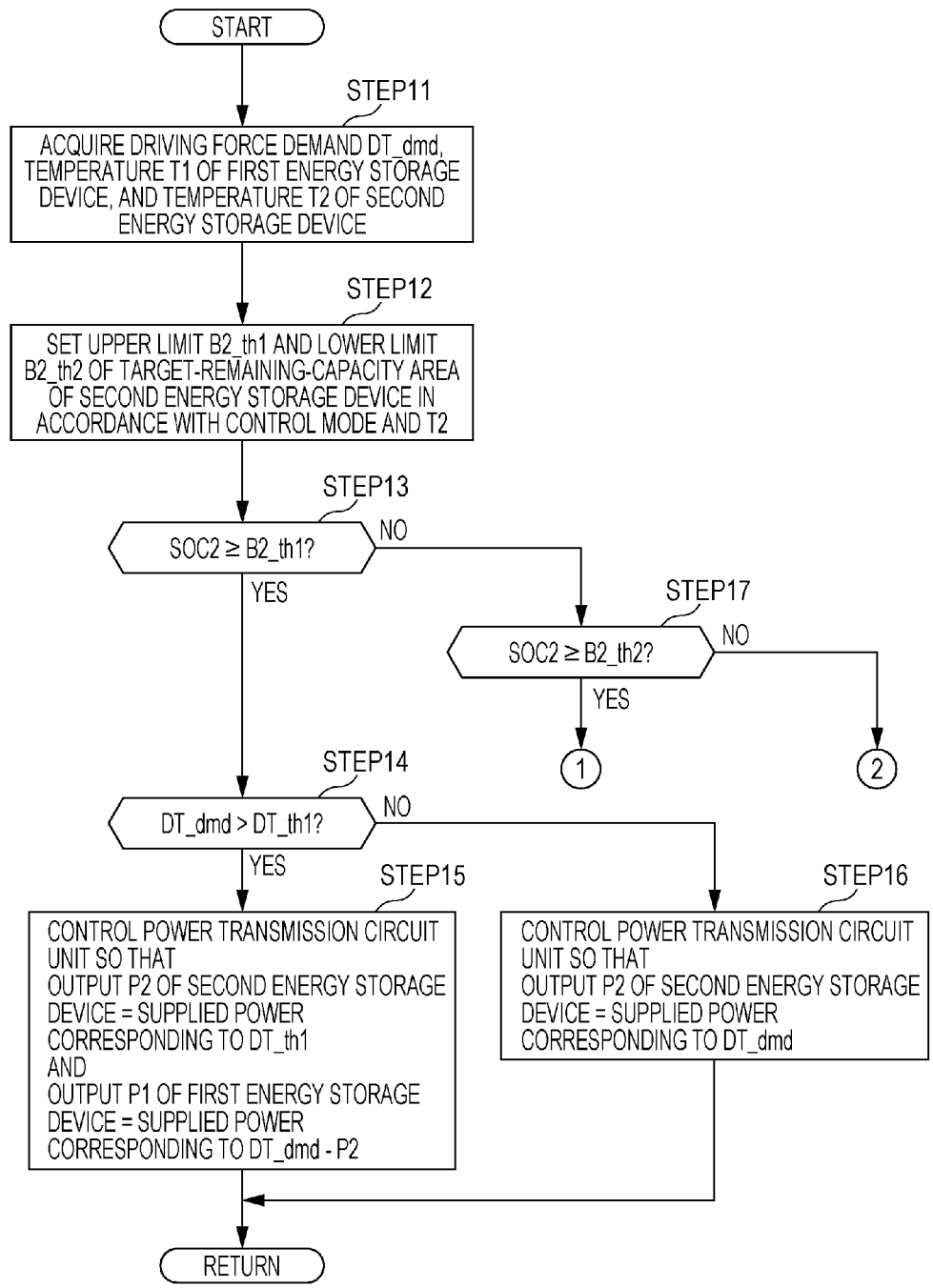
FIG. 6 is a flowchart illustrating the normal combined-use control process executed in STEP4 in FIG. 4.
Figure 7:
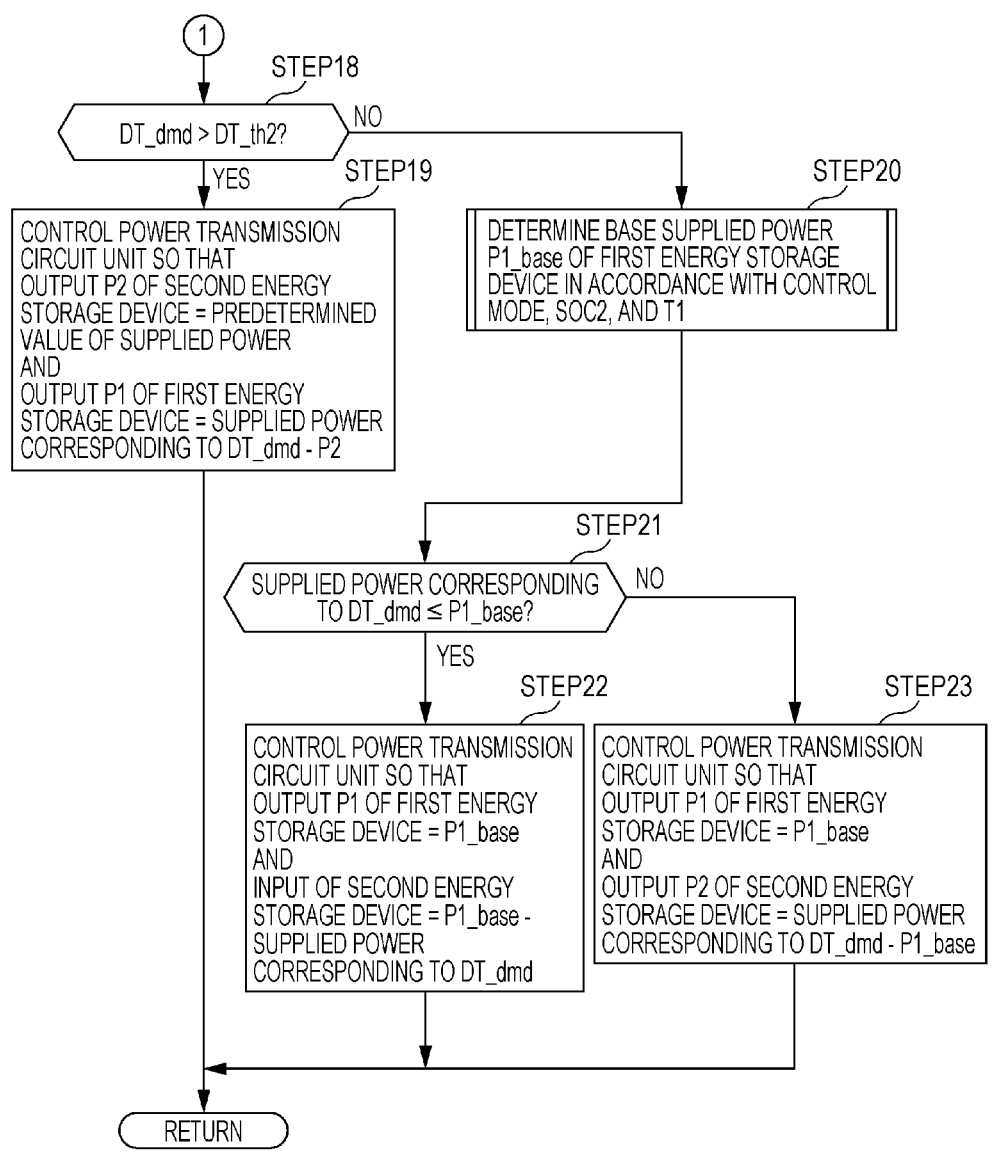
FIG. 7 is a flowchart illustrating the normal combined-use control process executed in STEP4 in FIG. 4.
Figure 8:
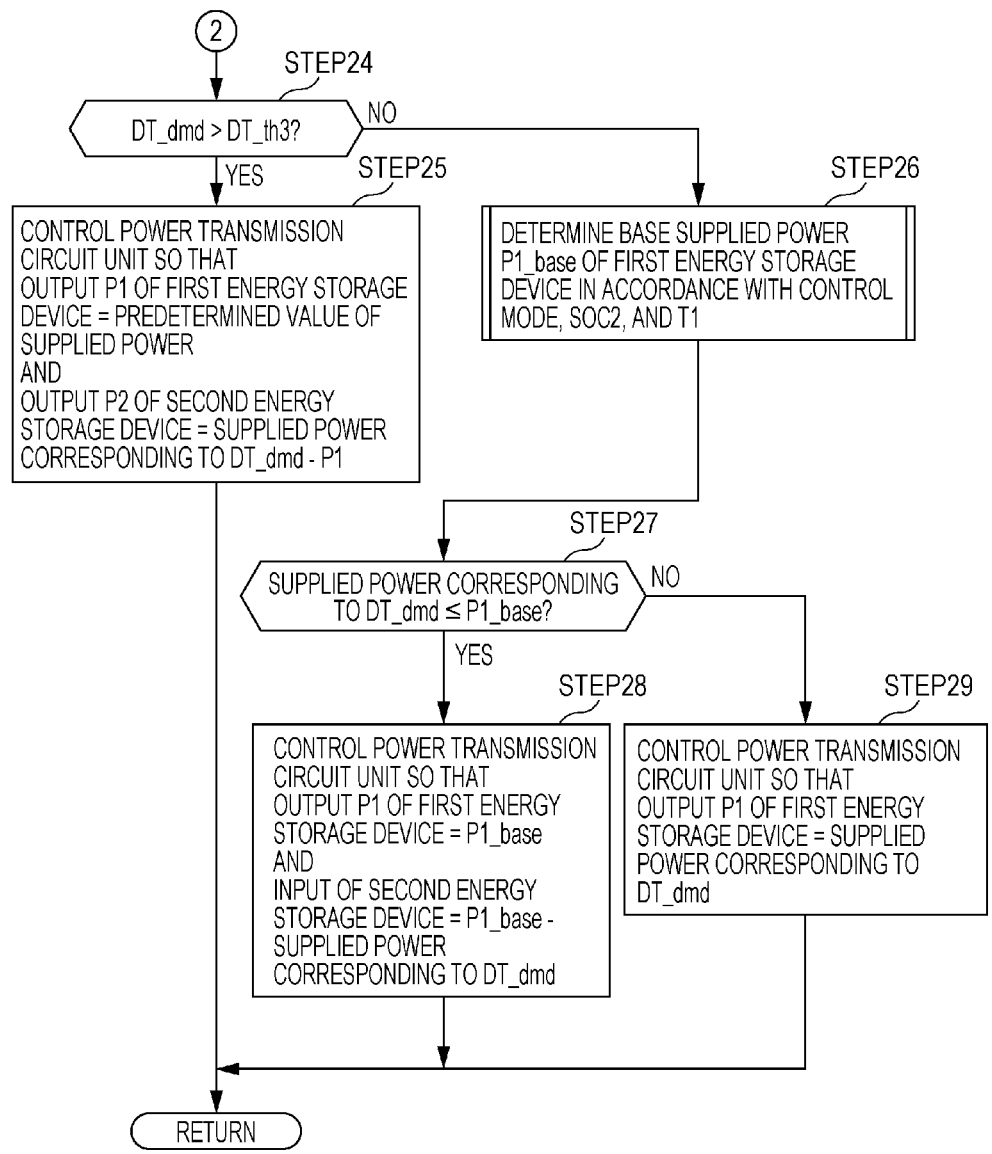
FIG. 8 is a flowchart illustrating the normal combined-use control process executed in STEP4 in FIG. 4.

In the normal combined-use control process, the power transmission controller 41 sequentially executes a process illustrated in a flowchart in FIG. 6 to FIG. 8 at intervals of a predetermined control process period.

In STEP11, the power transmission controller 41 acquires the driving force demand DT_dmd of the electric motor 100, a detected value of a temperature T1 of the first energy storage device 2, and a detected value of the temperature T2 of the second energy storage device 3.

Then, in STEP12, the power transmission controller 41 sets the upper limit B2_th1 and the lower limit B2_th2 of the target-remaining-capacity area (medium-remaining-capacity area) for the second energy storage device 3 in accordance with the control mode and the detected value of the second temperature T2.

The upper limit B2_th1 and the lower limit B2_th2 of the target-remaining-capacity area (medium-remaining-capacity area) when the control mode is the first control mode and the detected value of the second temperature T2 satisfies T2 ≥ T2_th (the non-low-temperature condition of the second energy storage device 3) are set to values (fixed values) determined in advance as those for the first control mode. The upper limit B2_th1 and the lower limit B2_th2 are set in advance based on an experiment or the like so that the medium-remaining-capacity area defined by the upper limit B2_th1 and the lower limit B2_th2 is a remaining-capacity area within which the actual value of the second remaining capacity SOC2 desirably falls to restrain the progression of deterioration of the second energy storage device 3 as much as possible.

In other words, the upper limit B2_th1 and the lower limit B2_th2 of the medium-remaining-capacity area are set in advance based on an experiment or the like so that the progression of deterioration of the second energy storage device 3 can desirably be prevented when the second energy storage device 3 is charged or discharged in such a manner that the actual value of the second remaining capacity SOC2 is maintained to fall within the medium-remaining-capacity area as much as possible.

Figure 9:
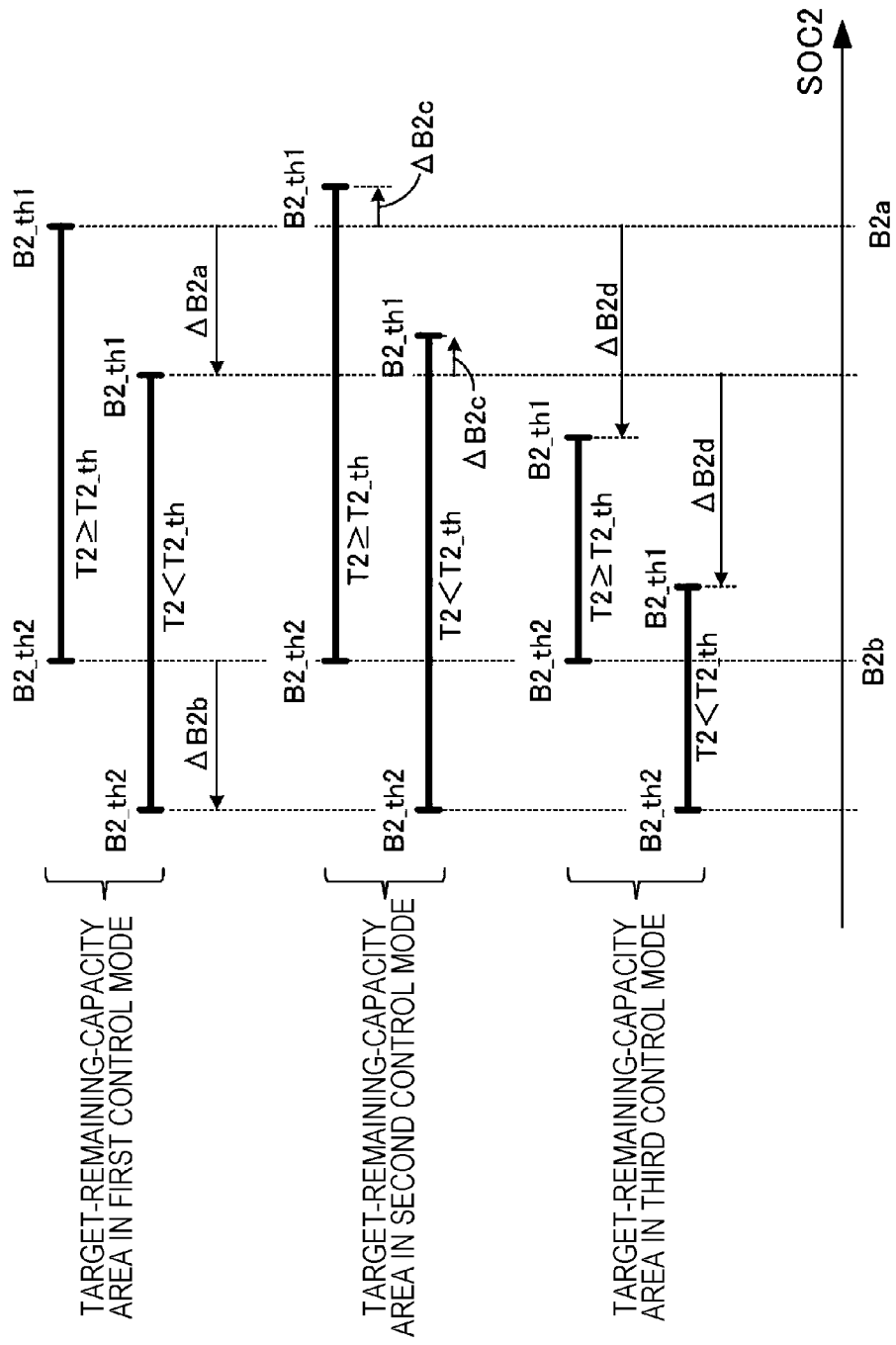
FIG. 9 illustrates respective patterns for setting a target-remaining-capacity area in first to third control modes.

The upper limit B2_th1 and the lower limit B2_th2 of the target-remaining-capacity area for the first control mode when the second temperature T2 satisfies T2<T2_th (the low-temperature condition of the second energy storage device 3) are set to values smaller than the upper limit B2_th1 and the lower limit B2_th2 of the target-remaining-capacity area (medium-remaining-capacity area) for the first control mode when the second temperature T2 satisfies T2 ≥ T2th by predetermined values ΔB2a and ΔB2b, respectively, as illustrated in FIG. 9.

An energy storage device such as the first energy storage device 2 or the second energy storage device 3 typically has a large impedance when the temperature of the energy storage device is relatively low. Thus, when the energy storage device is charged or discharged, the power consumed by the impedance of the energy storage device, which becomes power loss, increases. Thus, if the second energy storage device 3 is charged with power from the first energy storage device 2 in the low-temperature condition of the second energy storage device 3, the amount of electricity is lost as power loss by the impedance of the second energy storage device 3 within the amount of electricity supplied from the first energy storage device 2 to the second energy storage device 3 is larger than that when the second energy storage device 3 is charged under the non-low-temperature condition of the second energy storage device 3. In the low-temperature condition of the second energy storage device 3, therefore, it is desirable to prevent the occurrence of a situation that requires the second energy storage device 3 to be charged with power supplied by the first energy storage device 2, compared with the non-low-temperature condition of the second energy storage device 3.

In this embodiment, accordingly, in STEP12, in the low-temperature condition where the second temperature T2 satisfies T2<T2 th, the power transmission controller 41 sets the upper limit B2_th1 and the lower limit B2_th2 of the target-remaining-capacity area (medium-remaining-capacity area) for the second energy storage device 3 to be lower than those in the non-low-temperature condition where the second temperature T2 satisfies than T2≥T2_th in the manner described above. This prevents the occurrence of a situation that requires power to be supplied from the first energy storage device 2 to charge the second energy storage device 3 in the low-temperature condition of the second energy storage device 3, compared with the non-low-temperature condition of the second energy storage device 3.

Also, since the upper limit B2_th1 and the lower limit B2_th2 of the target-remaining-capacity area in the low-temperature condition of the second energy storage device 3 are lower than those in the non-low-temperature condition of the second energy storage device 3, it is possible to charge the second energy storage device 3 with a larger amount of regenerative power generated during the regenerative operation of the electric motor 100 than that in the non-low-temperature condition. This charging operation allows the second energy storage device 3 to generate heat which can result in rapid transition of the second energy storage device 3 from the low-temperature condition to the non-low-temperature condition.

After the upper limit B2_th1 and the lower limit B2_th2 of the target-remaining-capacity area (medium-remaining-capacity area) have been set in the manner described above, in STEP13, the power transmission controller 41 determines whether or not the detected value of the second remaining capacity SOC2, which is acquired in STEP2, is greater than or equal to the upper limit B2_th1 of the target-remaining-capacity area.

The determination result of STEP13 is affirmative when the detected value of the second remaining capacity SOC2 falls within the high-remaining-capacity area. In this case, then, in STEP14, the power transmission controller 41 determines whether or not the driving force demand DT_dmd is larger than a predetermined threshold value DT_th1.

In an example of this embodiment, the threshold value DT_th1 is a predetermined constant value (fixed value) that has been determined in advance. The threshold value DT_th1 may be, for example, an upper limit driving force value, or a nearby driving force value, that can be generated by the electric motor 100 using power supplied only from the second energy storage device 3 when the second remaining capacity SOC2 falls within the high-remaining-capacity area. The threshold value DT_th1 may be set to be variable by using, for example, the detected value of the temperature of the second energy storage device 3, which is obtained by the temperature sensor 56, in order to more appropriately prevent deterioration of the second energy storage device 3.

The determination result of STEP14 is affirmative within the diagonally hatched area in the high-remaining-capacity area illustrated in FIG. 5A or FIG. 5B. In this case, in STEP15, the power transmission controller 41 controls the power transmission circuit unit 11 so that an output P2 of the second energy storage device 3 coincides with a supplied power corresponding to the threshold value DT_th1 and so that an output P1 of the first energy storage device 2 coincides with the power deficit obtained by subtracting the output P2, which is a power that the second energy storage device 3 is responsible for supplying, from the supplied power corresponding to the driving force demand DT_dmd.

The output P1 of the first energy storage device 2 is, specifically, an amount of electricity output from (an amount of power discharged from) the first energy storage device 2, and the output P2 of the second energy storage device 3 is, specifically, an amount of electricity output from (an amount of power discharged from) the second energy storage device 3.

Accordingly, the supplied power corresponding to the driving force demand DT_dmd is fed from both the first energy storage device 2 and the second energy storage device 3 to the electric motor 100 in such a manner that the sum of the output P1 of the first energy storage device 2 and the output P2 of the second energy storage device 3 coincides with the supplied power corresponding to the driving force demand DT_dmd. In this case, a portion (the output P2), which the second energy storage device 3 is responsible for supplying, of the supplied power corresponding to the driving force demand DT_dmd is equal to the supplied power corresponding to the threshold value DT_th1.

Specifically, the processing of STEP15 can be executed in the following way, for example. A target value for the input voltage of the inverter 17 (=the output voltages of the voltage converters 15 and 16) is set in accordance with the detected value of the rotational speed of the electric motor 100 or the like. In addition, the supplied power corresponding to the threshold value DT_th1 is set as the target value for the output power of the voltage converter 16, and a supplied power obtained by subtracting the output P2 (=the supplied power corresponding to the threshold value DT_th1), which is a power that the second energy storage device 3 is responsible for supplying, from the supplied power corresponding to the driving force demand DT_dmd is set as the target value for the output power of the voltage converter 15.

Further, the voltage converters 15 and 16 are controlled by using a control signal (duty signal) so as to realize the target value for the input voltage of the inverter 17 and the target values for the respective output powers of the voltage converters 15 and 16. Also, the inverter 17 is feedback-controlled by using a control signal (duty signal) so as to cause a target current to flow through the electric motor 100. The target current is a current that can realize a target power set in accordance with the driving force demand DT_dmd or a target power obtained by limiting the target power set in accordance with the driving force demand DT_dmd through a limiting process (a limiting process for limiting the respective outputs of the energy storage devices 2 and 3).

On the other hand, the determination result of STEP14 is negative within the shaded area in the high-remaining-capacity area illustrated in FIG. 5A or FIG. 5B. In this case, in STEP16, the power transmission controller 41 controls the power transmission circuit unit 11 so that the output P2 of the second energy storage device 3 coincides with the supplied power corresponding to the driving force demand DT_dmd.

Accordingly, the supplied power corresponding to the driving force demand DT_dmd is fed to the electric motor 100 only from the second energy storage device 3 without using the first energy storage device 2.

Specifically, the processing of STEP16 can be executed in the following way, for example. A target value for the input voltage of the inverter 17 (=the output voltage of the voltage converter 16) is set in accordance with the detected value of the rotational speed of the electric motor 100 or the like. In addition, the supplied power corresponding to the driving force demand DT_dmd is set as the target value for the output power of the voltage converter 16.

Further, the voltage converter 16 is controlled so as to realize the target value for the input voltage of the inverter 17 and the target value for the output power of the voltage converter 16. Also, the inverter 17 is feedback-controlled so as to cause the target current corresponding to the driving force demand DT_dmd to flow through the electric motor 100.

Furthermore, the voltage converter 15 is controlled to be in power supply interruption state. Alternatively, the contactor 12 on the first energy storage device 2 side is controlled to be turned off.

As described above, when the detected value of the second remaining capacity SOC2 falls within the high-remaining-capacity area, power is supplied to the electric motor 100 from an energy storage device including at least the second energy storage device 3 out of the first energy storage device 2 and the second energy storage device 3 during the power-running operation of the electric motor 100. This allows the second energy storage device 3 to be actively discharged to make the remaining capacity SOC2 of the second energy storage device 3 approach the medium-remaining-capacity area (target-remaining-capacity area).

As a supplementary explanation, the threshold value DT_th1, which is used in the determination processing of STEP14, may be set in a way different from that described above. For example, the threshold value DT_th1 may be set so that the supplied power corresponding to the threshold value DT_th1 is equal to a predetermined constant value (e.g., an upper-limit supplied power that can be output by the second energy storage device 3 within the high-remaining-capacity area or a nearby constant value of supplied power). The threshold value DT_th1 may also be set to vary depending on the detected value of the second remaining capacity SOC2.

When the determination result of STEP13 is negative, in STEP17, the power transmission controller 41 further determines whether or not the detected value of the second remaining capacity SOC2 is greater than or equal to the threshold value B2_th2, which is the lower limit of the medium-remaining-capacity area.

The determination result of STEP17 is affirmative when the detected value of the second remaining capacity SOC2 falls within the medium-remaining-capacity area, which is the target-remaining-capacity area. In this situation, then, in STEP18 (see FIG. 7), the power transmission controller 41 determines whether or not the driving force demand DT_dmd is larger than a predetermined threshold value DT_th2.

In an example of this embodiment, for example, as illustrated in FIG. 5A or FIG. 5B, the predetermined threshold value DT_th2 is a threshold value set to be variable in accordance with the detected value of the second remaining capacity SOC2. Specifically, the threshold value DT_th2 is set so that the threshold value DT_th2 increases as the detected value of the second remaining capacity SOC2 decreases (in other words, so that the threshold value DT_th2 decreases as the detected value of the second remaining capacity SOC2 approaches the upper limit B2_th1 of the target-remaining-capacity area). In addition, the threshold value DT_th2 is set to a driving force value larger than a driving force that can be generated by the electric motor 100 when a base supplied power P1_base, described below, is supplied to the electric motor 100.

The determination result of STEP18 is affirmative within the diagonally hatched area above the shaded area in the medium-remaining-capacity area (target-remaining-capacity area) illustrated in FIG. 5A or FIG. 5B. In this case, in STEP19, the power transmission controller 41 controls the power transmission circuit unit 11 so that the output P2 of the second energy storage device 3 coincides with a predetermined value of supplied power and so that the output P1 of the first energy storage device 2 coincides with the power deficit obtained by subtracting the output P2, which is a power that the second energy storage device 3 is responsible for supplying, from the supplied power corresponding to the driving force demand DT_dmd.

In this case, specific control of the power transmission circuit unit 11 can be performed in a manner similar to that in STEP15 in FIG. 6.

Accordingly, the supplied power corresponding to the driving force demand DT_dmd is fed from both the first energy storage device 2 and the second energy storage device 3 to the electric motor 100 in such a manner that the sum of the output P1 of the first energy storage device 2 and the output P2 of the second energy storage device 3 coincides with the supplied power corresponding to the driving force demand DT_dmd. In this case, a portion of the supplied power corresponding to the driving force demand DT_dmd which the second energy storage device 3 is responsible for supplying is equal to the predetermined value of supplied power.

The predetermined value of supplied power to be output from the second energy storage device 3 may be, for example, an upper-limit supplied power that can be output by the second energy storage device 3 within the medium-remaining-capacity area or a nearby constant value of supplied power. Alternatively, the predetermined value of supplied power may be, for example, a supplied power set to vary depending on the detected value of the second remaining capacity SOC2.

On the other hand, when the determination result of STEP18 is negative, then, in STEP20, the power transmission controller 41 determines the base supplied power P1_base, which is a "base" value of the output P1 of the first energy storage device 2, in accordance with the control mode, the detected value of the second remaining capacity SOC2, and the detected value of the first temperature T1.

The base supplied power P1_base is a lower limit amount of electricity to be output from the first energy storage device 2 regardless of the driving force demand DT_dmd when the detected value of the second remaining capacity SOC2 falls within the medium-remaining-capacity area or the low-remaining-capacity area. That is, in this embodiment, the power transmission circuit unit 11 is controlled so that the base supplied power P1_base or a larger supplied power is output from the first energy storage device 2 regardless of the driving force demand DT_dmd when the detected value of the second remaining capacity SOC2 falls within the medium-remaining-capacity area or the low-remaining-capacity area.

Figure 10:
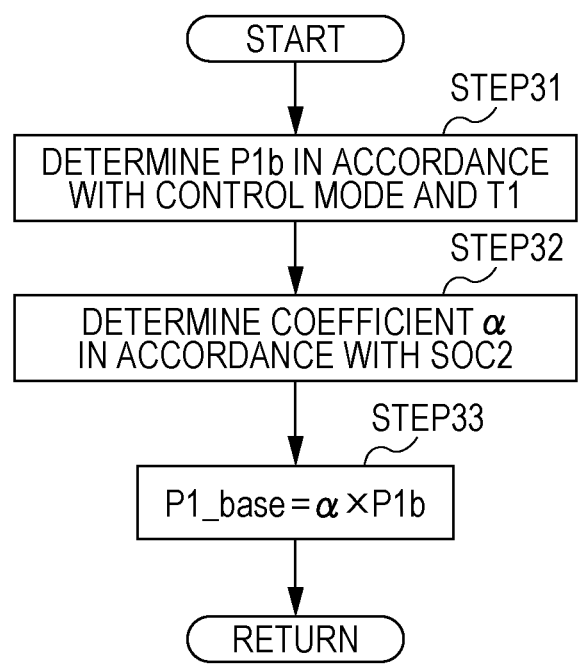
FIG. 10 is a flowchart illustrating the processing of STEP20 in FIG. 7 or the processing of STEP26 in FIG. 8.

The base supplied power P1_base is set in a way illustrated in a flowchart in FIG. 10, for example. Specifically, in STEP31, the power transmission controller 41 determines a supplied power P1b, which is a maximum value of the base supplied power P1_base, in accordance with the control mode and the detected value of the temperature T1 of the first energy storage device 2 (the first temperature T1).

The value of the supplied power P1b when the detected value of the first temperature T1 is greater than or equal to a predetermined threshold temperature T1_th (hereinafter sometimes referred to as the non-low-temperature condition of the first energy storage device 2) is set to a fixed value determined in advance for each control mode. Temperatures that satisfy T1≥T1_th represent a normal temperature range of the first energy storage device 2 in a room temperature environment, for example.

In this embodiment, the value of the supplied power P1b for the first control mode when T1≥T1_th is satisfied is a value that is smaller than a value for the second control mode and that is larger than a value for the third control mode.

Figure 12:
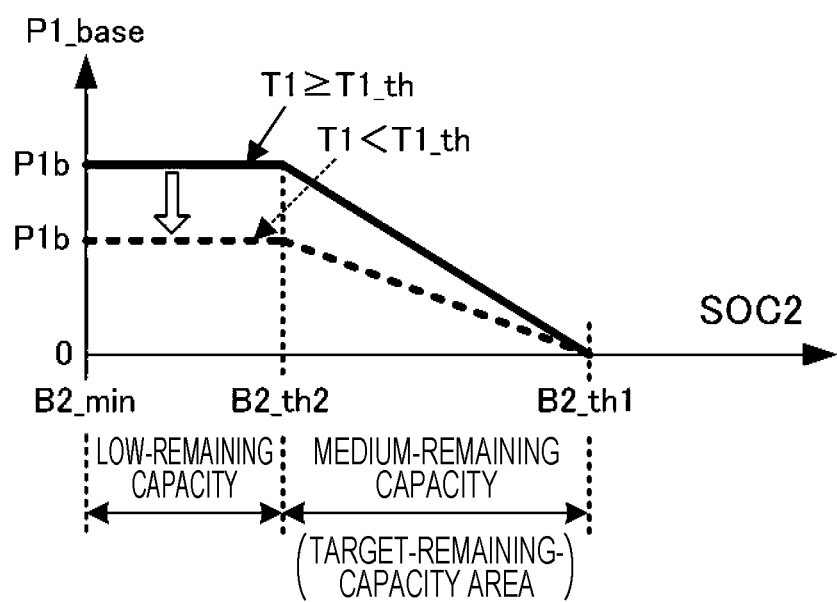
FIG. 12 is a graph illustrating the relationship between a base supplied power P1 base, which is determined in the process illustrated in FIG. 10, and the remaining capacity of the second energy storage device.

The value of the supplied power P1b when the detected value of the first temperature T1 is smaller than the threshold temperature T1_th (hereinafter sometimes referred to as the low-temperature condition of the first energy storage device 2) is set to, as illustrated in FIG. 12, a value smaller than the value set when T1≥T1_th is satisfied (a fixed value set for each control mode) by a predetermined value (a certain value determined in advance for each control mode) regardless of the control mode. Temperatures that satisfy T1<T1_th represent a temperature range of the first energy storage device 2 that occurs in a low-temperature environment such as in winter.

The threshold temperature T1_th for the first temperature T1 may be the same as or different from the threshold temperature T2_th for the second temperature T2. Setting the threshold temperature T1_th to a value equal to the threshold temperature T2_th facilitates the establishment of a control process. In addition, since a change of the control in accordance with whether or not the first temperature T1 is greater than or equal to the threshold temperature T1_th and a change of the control in accordance with whether or not the second temperature T2 is greater than or equal to the threshold temperature T2_th are performed at the same time or at similar timings, frequent changes of the control can be avoided.

Then, in STEP32, the power transmission controller 41 determines a coefficient α in accordance with the detected value of the second remaining capacity SOC2. The coefficient α specifies a pattern in which the base supplied power P1_base changes in accordance with the detected value of the second remaining capacity SOC2.

Figure 11:
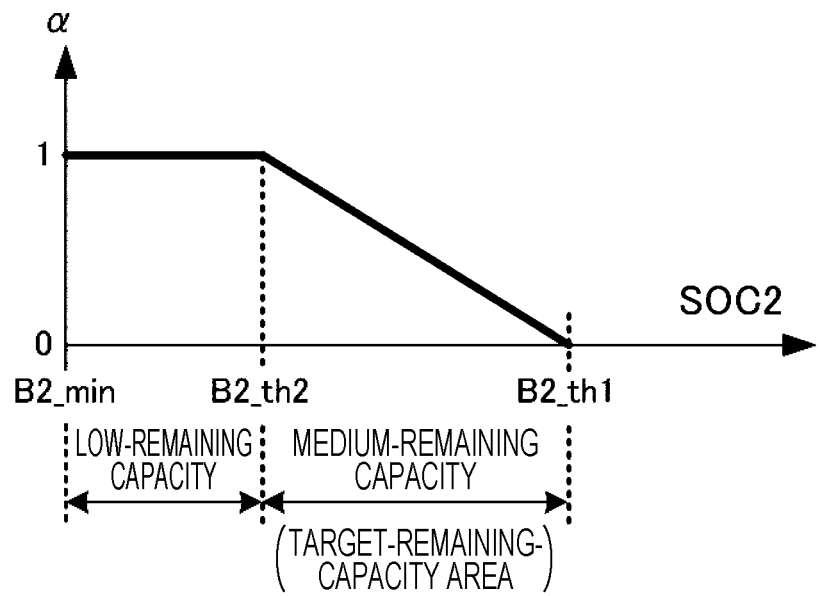
FIG. 11 is a graph illustrating the relationship between a coefficient α, which is used in the process illustrated in FIG. 10, and the remaining capacity of the second energy storage device.

The coefficient α is set from the detected value of the second remaining capacity SOC2 in accordance with, for example, a pattern depicted on a graph in FIG. 11 by using a map created in advance or by using an operational expression. In the illustrated example, the coefficient α takes a value in the range from "0" to "1". The value of the coefficient α is basically set to increase as the detected value of the second remaining capacity SOC2 decreases within a remaining capacity area (low-side remaining capacity area) obtained by combining the medium-remaining-capacity area and the low-remaining-capacity area of the second energy storage device 3.

More specifically, when the detected value of the second remaining capacity SOC2 falls within the medium-remaining-capacity area (target-remaining-capacity area), the value of the coefficient α is set to successively increase from "0" to "1" as the detected value of the second remaining capacity SOC2 decreases from the upper limit B2_th1 to the lower limit B2_th2 of the medium-remaining-capacity area.

When the detected value of the second remaining capacity SOC2 falls within the low-remaining-capacity area, the value of the coefficient α is set to the maximum value "1".

Then, in STEP33, the power transmission controller 41 multiplies the supplied power P1b, which is determined in STEP31, by the value of the coefficient α, which is determined in the way described above, to calculate the base supplied power P1_base (=α× P1b).

Accordingly, the base supplied power P1_base is determined to change in a pattern similar to that for the coefficient α in accordance with the detected value of the second remaining capacity SOC2. In this case, furthermore, the supplied power P1b (=the value of the base supplied power P1_base within the low-remaining-capacity area of the second remaining capacity SOC2) that is a maximum value of the base supplied power P1_base is determined for each control mode so that the supplied power P1b when the first temperature T1 satisfies T1<T1_th (the low-temperature condition of the first energy storage device 2) is relatively lower than that when the first temperature T1 satisfies T1≥T1_th (the non-low-temperature condition of the first energy storage device 2).

The base supplied power P1_base may be defined by, for example, setting an upper limit of the output P1 of the first energy storage device 2 in accordance with the detected value of the first remaining capacity SOC1 or the like and, when the base supplied power P1_base calculated in the way described above exceeds the upper limit, executing a limiting process subsequently to the processing of STEP33 to forcibly limit the base supplied power P1_base to the upper limit.

Alternatively, for example, the base supplied power P1_base may be determined, instead of by performing the processing of STEP31 to STEP33, for each control mode directly from the detected value of the first temperature T1 and the detected value of the second remaining capacity SOC2 by using a map created in advance or by using an operational expression.

Referring back to FIG. 7, after the processing of STEP20 has been executed in the way described above, then, in STEP21, the power transmission controller 41 determines whether or not the supplied power corresponding to the driving force demand DT_dmd is less than or equal to the base supplied power P1_base. The determination processing in STEP21 is equivalent to a process of determining whether or not the driving force demand DT_dmd is less than or equal to a threshold value obtained by converting the base supplied power P1_base into a driving force value in accordance with the detected value of the rotational speed of the electric motor 100. This threshold value is a threshold value DT_th4 indicated by a broken line in FIG. 5A or FIG. 5B. The threshold value DT_th4 indicated by the broken line in FIG. 5A or FIG. 5B is a threshold value obtained when the rotational speed of the electric motor 100 is set to be constant.

The determination result of STEP21 is affirmative within the bottom diagonally hatched area in the medium-remaining-capacity area illustrated in FIG. 5A or FIG. 5B. In this situation, in STEP22, the power transmission controller 41 controls the power transmission circuit unit 11 so that the output P1 of the first energy storage device 2 coincides with the base supplied power P1_base and so that the input of the second energy storage device 3, that is, the charging power, coincides with a supplied power corresponding to the surplus power obtained by subtracting the supplied power corresponding to the driving force demand DT_dmd from the base supplied power P1_base (the surplus supplied power).

Accordingly, the base supplied power P1_base, which is set in the way described above in accordance with the detected value of the second remaining capacity SOC2, is output from the first energy storage device 2 regardless of the driving force demand DT_dmd. In addition, a supplied power corresponding to the driving force demand DT_dmd within the base supplied power P1_base is fed from the first energy storage device 2 to the electric motor 100 and the surplus supplied power obtained by subtracting the supplied power corresponding to the driving force demand DT_dmd from the base supplied power P1_base is supplied from the first energy storage device 2 to charge the second energy storage device 3.

Specifically, the processing of STEP22 can be executed in the following way, for example. A target value for the input voltage of the inverter 17 (=the output voltage of the voltage converter 15) is set in accordance with the detected value of the rotational speed of the electric motor 100 or the like. In addition, the base supplied power P1_base is set as the target value for the output power of the voltage converter 15, and a supplied power obtained by subtracting the supplied power corresponding to the driving force demand DT_dmd from the base supplied power P1_base is set as the target value for the power to be supplied from the input side of the voltage converter 16 (the second energy storage device 3 side) to the second energy storage device 3.

Further, the voltage converter 15 is controlled so as to realize the target value for the input voltage of the inverter 17 and the target value for the output power of the voltage converter 15, and the voltage converter 16 is controlled so as to realize the target value for the power to be supplied from the voltage converter 16 to the second energy storage device 3. Also, the inverter 17 is feedback-controlled so as to cause the target current corresponding to the driving force demand DT_dmd to flow through the electric motor 100.

When the base supplied power P1_base coincides with the supplied power corresponding to the driving force demand DT_dmd, the input (the charging power) of the second energy storage device 3 is zero. Thus, the voltage converter 16 is controlled to be in power supply interruption state or the contactor 13 on the second energy storage device 3 side is controlled to be turned off.

On the other hand, the determination result of STEP21 is negative within the shaded area in the medium-remaining-capacity area (target-remaining-capacity area) illustrated in FIG. 5A or FIG. 5B. In this case, in STEP23, the power transmission controller 41 controls the power transmission circuit unit 11 so that the output P1 of the first energy storage device 2 coincides with the base supplied power P1_base and so that the output P2 of the second energy storage device 3 coincides with the power deficit obtained by subtracting the base supplied power P1_base from the supplied power corresponding to the driving force demand DT_dmd.

In this case, specific control of the power transmission circuit unit 11 can be performed in a manner similar to that in STEP15 in FIG. 6.

Accordingly, the supplied power corresponding to the driving force demand DT_dmd is fed from both the first energy storage device 2 and the second energy storage device 3 to the electric motor 100 in such a manner that the sum of the output P1 of the first energy storage device 2 and the output P2 of the second energy storage device 3 coincides with the supplied power corresponding to the driving force demand DT_dmd. In this case, a portion (the output P1) of the supplied power corresponding to the driving force demand DT_dmd which the first energy storage device 2 is responsible for supplying is equal to the base supplied power P1_base, which is set in the way described above in accordance with the detected value of the second remaining capacity SOC2.

As a supplementary explanation, when, in STEP23, the output P2 of the second energy storage device 3 (the power deficit obtained by subtracting the base supplied power P1_base from the supplied power corresponding to the driving force demand DT_dmd) exceeds the upper-limit supplied power that can be output by the second energy storage device 3 within the medium-remaining-capacity area, the output P2 of the second energy storage device 3 may be limited to the upper-limit supplied power and processing similar to that of STEP19 may be performed to control the power transmission circuit unit 11.

Alternatively, the threshold value DT_th2 in the determination processing in STEP18 may be set so that a supplied power corresponding to the threshold value DT_th2 coincides with a value obtained by adding the upper-limit supplied power of the second energy storage device 3, or a nearby constant value of supplied power, to the base supplied power P1_base.

As described above, when the detected value of the second remaining capacity SOC2 falls within the medium-remaining-capacity area (target-remaining-capacity area), power is supplied to the electric motor 100 from an energy storage device including at least the first energy storage device 2 out of the first energy storage device 2 and the second energy storage device 3 during the power-running operation of the electric motor 100.

In addition, when the driving force demand DT_dmd is less than or equal to the threshold value DT_th2, the output P1 of the first energy storage device 2 is kept at the base supplied power P1_base, which is set in accordance with the control mode, the detected value of the first temperature T1, and the detected value of the second remaining capacity SOC2. If the base supplied power P1_base is greater than the supplied power corresponding to the driving force demand DT_dmd (in other words, if the driving force demand DT_dmd is less than the threshold value DT_th4, which is obtained by converting the base supplied power P1_base into a driving force value of the electric motor 100), a supplied power corresponding to the driving force demand DT_dmd within the base supplied power P1_base is supplied only from the first energy storage device 2 to the electric motor 100 and, at the same time, the surplus supplied power is supplied to charge the second energy storage device 3.

In this case, the base supplied power P1_base decreases in accordance with an increase in the detected value of the second remaining capacity SOC2. Thus, if the driving force demand DT_dmd is constant, the amount of charging power used to charge the second energy storage device 3 decreases in accordance with an increase in the detected value of the second remaining capacity SOC2.

Furthermore, when the driving force demand DT_dmd is less than or equal to the threshold value DT_th2, if the base supplied power P1_base is smaller than the supplied power corresponding to the driving force demand DT_dmd (in other words, if the driving force demand DT_dmd is larger than the threshold value DT_th4), the base supplied power P1_base is fed from the first energy storage device 2 to the electric motor 100, whereas the power deficit is fed from the second energy storage device 3 to the electric motor 100.

Thus, when the detected value of the second remaining capacity SOC2 falls within the medium remaining capacity, a situation in which power is supplied from the second energy storage device 3 to the electric motor 100 is less likely to occur than when the detected value of the second remaining capacity SOC2 falls within the high-remaining-capacity area. In addition, as the second remaining capacity SOC2 decreases, a range for the driving force demand DT_dmd over which power is supplied from the first energy storage device 2 to charge the second energy storage device 3 increases and the amount of charging power used to charge the second energy storage device 3 is more likely to increase.

As a result, the second remaining capacity SOC2 can converge to a middle value of the medium-remaining-capacity area (target-remaining-capacity area) (the mean value of the upper limit B2_th1 and the lower limit B2_th2) or a nearby value as much as possible. Thus, the second remaining capacity SOC2 is kept within the medium-remaining-capacity area as much as possible. Consequently, the progression of deterioration of the second energy storage device 3 can be restrained.

When the driving force demand DT_dmd is less than or equal to the threshold value DT_th2, the base supplied power P1_base to be output from the first energy storage device 2 is set in accordance with the control mode, the first temperature T1, and the second remaining capacity SOC2 regardless of the driving force demand DT_dmd. Thus, the output P2 or the input of the second energy storage device 3 varies in accordance with a change in the driving force demand DT_dmd, whereas the output P1 of the first energy storage device 2 varies with low sensitivity to changes in the driving force demand DT_dmd.

As a result, the output P1 of the first energy storage device 2 is of high stability with less frequent changes. Thus, the progression of deterioration of the first energy storage device 2 can be restrained as much as possible.

The determination result of STEP17 is negative when the detected value of the second remaining capacity SOC2 falls within the low-remaining-capacity area. In this situation, then, in STEP24 (see FIG. 8), the power transmission controller 41 determines whether or not the driving force demand DT_dmd is larger than a predetermined threshold value DT_th3.

In an example of this embodiment, the predetermined threshold value DT_th3 is set to a predetermined constant value. In addition, the threshold value DT_th3 is set to a driving force value larger than a driving force that can be generated by the electric motor 100 when the base supplied power P1_base, which is set in the way described above in accordance with the control mode, the second remaining capacity SOC2, and the first temperature T1, is supplied to the electric motor 100.

Note that the threshold value DT_th3 may be set so that a supplied power corresponding to the threshold value DT_th3 becomes equal to the upper-limit supplied power (>P1_base) of the first energy storage device 2 or a nearby constant value of supplied power.

The determination result of STEP24 is affirmative within the shaded area in the low-remaining-capacity area illustrated in FIG. 5A or FIG. 5B. In this case, in STEP25, the power transmission controller 41 controls the power transmission circuit unit 11 so that the output P1 of the first energy storage device 2 coincides with a predetermined value of supplied power and so that the output P2 of the second energy storage device 3 coincides with the power deficit obtained by subtracting the output P1, which the first energy storage device 2 is responsible for supplying, from the supplied power corresponding to the driving force demand DT_dmd.

In this case, specific control of the power transmission circuit unit 11 can be performed in a manner similar to that in STEP15 in FIG. 6.

Accordingly, the supplied power corresponding to the driving force demand DT_dmd is fed from both the first energy storage device 2 and the second energy storage device 3 to the electric motor 100 in such a manner that the sum of the output P1 of the first energy storage device 2 and the output P2 of the second energy storage device 3 coincides with the supplied power corresponding to the driving force demand DT_dmd. In this case, a portion of the supplied power corresponding to the driving force demand DT_dmd which the first energy storage device 2 is responsible for supplying is equal to the predetermined value of supplied power.

The predetermined value of supplied power to be output from the first energy storage device 2 may be, for example, an upper-limit supplied power that can be output by the first energy storage device 2 or a nearby constant value of supplied power. Alternatively, the predetermined value of supplied power may be a supplied power set to vary depending on either or both of the detected value of the first remaining capacity SOC1 and the detected value of the second remaining capacity SOC2.

On the other hand, when the determination result of STEP24 is negative, then, in STEP26, the power transmission controller 41 determines the base supplied power P1_base, which is a "base" value of the output P1 of the first energy storage device 2, in accordance with the control mode, the detected value of the second remaining capacity SOC2, and the detected value of the first temperature T1.

The processing of STEP26 is the same or substantially the same as the processing of STEP20. In this embodiment, the coefficient α is the maximum value "1" within the low-remaining-capacity area. Thus, the base supplied power P1_base, which is determined in STEP26, is equal to the maximum supplied power P1b determined in accordance with the control mode and the first temperature T1.

As in the processing of STEP20, for example, an upper limit of the output P1 of the first energy storage device 2 may be set in accordance with the detected value of the first remaining capacity SOC1 and so on, and, when the base supplied power P1_base, which is determined in accordance with the control mode, the first temperature T1, and the second remaining capacity SOC2, exceeds the upper limit, the base supplied power P1_base may be forcibly limited to the upper limit.

Alternatively, for example, the base supplied power P1_base may be determined, instead of by executing the process illustrated in the flowchart in FIG. 10 in STEP26, for each control mode directly from the detected value of the second remaining capacity SOC2 and the detected value of the first temperature T1 by using a map created in advance or by using an operational expression.

After the processing of STEP26 has been executed, then, in STEP27, the power transmission controller 41 determines whether or not the supplied power corresponding to the driving force demand DT_dmd is less than or equal to the base supplied power P1_base. As in the determination processing of STEP21, the determination processing of STEP27 is equivalent to a process of determining whether or not the driving force demand DT_dmd is less than or equal to the threshold value DT_th4 (see FIG. 5A or FIG. 5B), which is obtained by converting the base supplied power P1_base into a driving force value in accordance with the detected value of the rotational speed of the electric motor 100.

The determination result of STEP27 is affirmative within the diagonally hatched area in the low-remaining-capacity area illustrated in FIG. 5A or FIG. 5B when the driving force demand DT_dmd is less than or equal to the threshold value DT_th4. In this situation, in STEP28, the power transmission controller 41 controls the power transmission circuit unit 11 so that the output P1 of the first energy storage device 2 coincides with the base supplied power P1_base and so that the input (the charging power) of the second energy storage device 3 coincides with a supplied power corresponding to the surplus power obtained by subtracting the supplied power corresponding to the driving force demand DT_dmd from the base supplied power P1_base.

In this case, specific control of the power transmission circuit unit 11 can be performed in a manner similar to that in STEP22 in FIG. 7.

Accordingly, the base supplied power P1_base, which is set in the way described above in accordance with the control mode, the detected value of the second remaining capacity SOC2, and the detected value of the first temperature T1, is output from the first energy storage device 2 regardless of the driving force demand DT_dmd. In addition, a supplied power corresponding to the driving force demand DT_dmd within the base supplied power P1_base is fed from the first energy storage device 2 to the electric motor 100 and the surplus supplied power obtained by subtracting the supplied power corresponding to the driving force demand DT_dmd from the base supplied power P1_base is supplied from the first energy storage device 2 to charge the second energy storage device 3.

On the other hand, the determination result of STEP27 is negative within the diagonally hatched area in the low-remaining-capacity area illustrated in FIG. 5A or FIG. 5B when the driving force demand DT_dmd is larger than the threshold value DT_th4. In this case, in STEP29, the power transmission controller 41 controls the power transmission circuit unit 11 so that the output P1 of the first energy storage device 2 coincides with the supplied power corresponding to the driving force demand DT_dmd.

Accordingly, the supplied power corresponding to the driving force demand DT_dmd is fed to the electric motor 100 only from the first energy storage device 2 without using the second energy storage device 3.

Specifically, the processing of STEP29 can be executed in the following way, for example. A target value for the input voltage of the inverter 17 (=the output voltage of the voltage converter 15) is set in accordance with the detected value of the rotational speed of the electric motor 100 or the like. In addition, the supplied power corresponding to the driving force demand DT_dmd is set as the target value for the output power of the voltage converter 15.

Further, the voltage converter 15 is controlled by using a control signal (duty signal) so as to realize the target value for the input voltage of the inverter 17 and the target value for the output power of the voltage converter 15. Also, the inverter 17 is feedback-controlled by using a control signal (duty signal) so as to cause a target current to flow through the electric motor 100. The target current is a current that can realize a target power set in accordance with the driving force demand DT_dmd or a target power obtained by limiting the target power set in accordance with the driving force demand DT_dmd through a limiting process (a limiting process for limiting the output of the first energy storage device 2).

Further, the voltage converter 16 is controlled to be in power supply interruption state. Alternatively, the contactor 13 on the second energy storage device 3 side is controlled to be turned off.

As described above, when the detected value of the second remaining capacity SOC2 falls within the low-remaining-capacity area, power is supplied to the electric motor 100 from an energy storage device including at least the first energy storage device 2 out of the first energy storage device 2 and the second energy storage device 3 during the power-running operation of the electric motor 100.

In addition, when the supplied power corresponding to the driving force demand DT_dmd is less than or equal to the base supplied power P1_base, the output P1 of the first energy storage device 2 is kept at the base supplied power P1_base regardless of the driving force demand DT_dmd. Then, a supplied power corresponding to the driving force demand DT_dmd within the base supplied power P1_base is supplied only from the first energy storage device 2 to the electric motor 100 and, at the same time, the surplus supplied power is used to charge the second energy storage device 3. Thus, the input of the second energy storage device 3 varies in accordance with a change in the driving force demand DT_dmd, whereas the output P1 of the first energy storage device 2 (=P1_base) varies with low sensitivity to changes in the driving force demand DT_dmd.

In addition, when the supplied power corresponding to the driving force demand DT_dmd is larger than the base supplied power P1_base, the supplied power corresponding to the driving force demand DT_dmd is supplied only from the first energy storage device 2 to the electric motor 100 until the driving force demand DT_dmd exceeds the threshold value DT_th3. Only when the driving force demand DT_dmd exceeds the threshold value DT_th3, the second energy storage device 3 is responsible for supplying a portion of the supplied power corresponding to the driving force demand DT_dmd.

Thus, when the detected value of the second remaining capacity SOC2 falls within the low-remaining-capacity area, a situation in which power is supplied from the second energy storage device 3 to the electric motor 100 is less likely to occur than when the detected value of the second remaining capacity SOC2 falls within the high-remaining-capacity area or the medium-remaining-capacity area.

In addition, since the base supplied power P1_base is equal to the maximum supplied power P1b within the low-remaining-capacity area, a range for the driving force demand DT_dmd over which power is supplied from the first energy storage device 2 to charge the second energy storage device 3 and the amount of charging power used to charge the second energy storage device 3 are larger than those within the medium-remaining-capacity area.

As a result, unless a situation in which the driving force demand DT_dmd is larger than the threshold value DT_th3 continues, the second remaining capacity SOC2 is likely to return from the low-remaining-capacity area to the medium-remaining-capacity area (target-remaining-capacity area).

When the supplied power corresponding to the driving force demand DT_dmd is less than or equal to the base supplied power P1_base, furthermore, the base supplied power P1_base to be output from the first energy storage device 2 is set in accordance with the control mode, the second remaining capacity SOC2, and the first temperature T1 regardless of the driving force demand DT_dmd. In particular, the base supplied power P1_base is kept constant within the low-remaining-capacity area even though the second remaining capacity SOC2 changes. Thus, the output P1 of the first energy storage device 2 does not vary in accordance with a change in the driving force demand DT_dmd.

In addition, the output P1 of the first energy storage device 2 is set to a predetermined constant value when the driving force demand DT_dmd is larger than the threshold value DT_th3, which can prevent the output P1 of the first energy storage device 2 from varying in accordance with the driving force demand DT_dmd.

As a result, the output P1 of the first energy storage device 2 within the low-remaining-capacity area is of high stability with less frequent changes. Thus, the progression of deterioration of the first energy storage device 2 can be restrained as much as possible.

The normal combined-use control process performed when the control mode is set to the first control mode, which is a basic control mode among the first to third control modes, has been described in detail.

Second Control Mode

There will now be described the normal combined-use control process performed when the control mode is set to the second control mode.

FIG. 13A and FIG. 13B illustrate, in map form, the relationship in the second control mode between the second remaining capacity SOC2 and the proportion of powers to be output by the first energy storage device 2 and the second energy storage device 3 with respect to the amount of electricity to be supplied (the supplied power) to the electric motor 100 in accordance with the driving force demand DT_dmd of the electric motor 100 for the respective cases where the second temperature T2 is greater than or equal to the threshold temperature T2_th (the non-low-temperature condition of the second energy storage device 3) and where the second temperature T2 is lower than the threshold temperature T2_th (the low-temperature condition of the second energy storage device 3). In FIG. 13A and FIG. 13B, the meanings of the diagonally hatched areas and the shaded areas are similar to those in FIG. 5A and FIG. 5B. In FIG. 13A, a two-dot chain line indicates the line representing the threshold value DT_th4 indicated by the broken line in FIG. 5A, for comparison with the first control mode in which T2≥T2_th holds. In FIG. 13B, a two-dot chain line indicates the line representing the threshold value DT_th4 indicated by the broken line in FIG. 5B, for comparison with the first control mode in which T2<T2_th holds.

The comparison between the first control mode illustrated in FIG. 5A and FIG. 5B and the second control mode illustrated in FIG. 13A and FIG. 13B demonstrates that the second control mode is a control mode in which threshold values used to define the proportion of powers to be output by the first energy storage device 2 and the second energy storage device 3 are different from those in the first control mode.

In the second control mode according to this embodiment, when the second remaining capacity SOC2 is comparatively low, the second energy storage device 3 is more likely to be charged than in the first control mode. When the second remaining capacity SOC2 is comparatively high, a range for the driving force demand DT_dmd over which power is supplied from the second energy storage device 3 to the electric motor 100 is larger than that in the first control mode.

More specifically, in the second control mode according to this embodiment, in STEP12, in both the cases where the second temperature T2 satisfies T2≥T2_th and where the second temperature T2 satisfies T2<T2_th, as illustrated in FIG. 9, the upper limit B2_th1 of the medium-remaining-capacity area (target-remaining-capacity area) for the second remaining capacity SOC2 is set to a value higher than that in the first control mode by a predetermined value ΔB2c. Thus, the magnitude relationship between the upper limit B2_th1 of the target-remaining-capacity area in the first control mode and the upper limit B2_th1 of the target-remaining-capacity area in the second control mode is maintained to be the same for both the non-low-temperature condition and low-temperature condition of the second energy storage device 3.

In this embodiment, the same predetermined value ΔB2c is used for the non-low-temperature condition and low-temperature condition of the second energy storage device 3. Alternatively, different predetermined values ΔB2c may be used.

In this embodiment, furthermore, as illustrated in FIG. 9, the lower limit B2_th2 of the medium-remaining-capacity area (target-remaining-capacity area) for the second remaining capacity SOC2 in the second control mode is set to a value equal to the lower limit B2_th2 in the first control mode in both the cases where the second temperature T2 satisfies T2≥T2_th and where the second temperature T2 satisfies T2<T2_th. However, the lower limit B2_th2 in the second control mode may be set to a value different from the lower limit B2_th2 in the first control mode (for example, a value slightly larger than the lower limit B2_th for the first control mode) in either or both of the cases where the second temperature T2 satisfies T2≥T2_th and where the second temperature T2 satisfies T2<T2_th.

In addition, in STEP20 and STEP26 in the second control mode, the base supplied power P1_base of the first energy storage device 2 within the low-remaining-capacity area and the medium-remaining-capacity area of the second energy storage device 3 is determined so that, in both the cases where the first temperature T1 satisfies T1≥T1_th and where the first temperature T1 satisfies T1<T1_th, as illustrated in FIG. 13A and FIG. 13B, the base supplied power P1_base is larger than that in the first control mode (in other words, the threshold value DT_th4 obtained by converting the base supplied power P1_base to a driving force value in accordance with the rotational speed of the electric motor 100 (a value calculated with a constant rotational speed) is larger than that in the first control mode).

The base supplied power P1_base can be determined in a way similar to that in the first control mode. For example, as in the first control mode, the base supplied power P1_base (=α× P1b) can be determined by using a process similar to the process illustrated in the flowchart in FIG. 10. In this case, however, the supplied power P1b, which is a maximum value of the base supplied power P1_base, is set to be larger than that in the first control mode both when T1≥T1_th is satisfied and when T1<T1_th is satisfied and to be smaller when T1<T1_th than when T1≥T1_th. In the second control mode, the supplied power P1b, which is a maximum value of the base supplied power P1_base, may be, for example, an upper-limit supplied power that can be output from the first energy storage device 2 or a nearby supplied power in each of the cases where T1≥T1_th is satisfied and where T1<T1_th is satisfied.

The base supplied power P1_base in the second control mode may be determined directly from, for example, the detected value of the second remaining capacity SOC2 and the detected value of the first temperature T1 by using a map created in advance or by using an operational expression.

In this embodiment, furthermore, in the second control mode, the power transmission controller 41 sets the threshold value DT_th1 for the driving force demand DT_dmd within the high-remaining-capacity area and the threshold value DT_th2 for the driving force demand DT_dmd within the medium-remaining-capacity area to be both larger than those in the first control mode in each of the cases where T1≥T1_th is satisfied and where T1<T1_th is satisfied.

In the example illustrated in FIG. 13A and FIG. 13B, furthermore, the power transmission controller 41 sets the threshold value DT_th3 for the driving force demand DT_dmd within the low-remaining-capacity area so that the supplied power corresponding to the threshold value DT_th3 coincides with the base supplied power P1_base in each of the cases where T1≥T1_th is satisfied and where T1<T1_th is satisfied. However, the supplied power corresponding to the threshold value DT_th3 may be larger than the base supplied power P1_base so long as the supplied power corresponding to the threshold value DT_th3 is less than or equal to the upper-limit supplied power that can be output from the first energy storage device 2.

The way in which threshold values related to the second remaining capacity SOC2 and the driving force demand DT_dmd in the second control mode are set is the same or substantially the same as that in the first control mode, except the particulars described above.

The normal combined-use control process in the second control mode is executed in accordance with the flowchart illustrated in FIG. 6 to FIG. 8 described above in a way similar to that in the first control mode. Note that the processing of STEP27 and STEP29 in FIG. 8 may be omitted if the threshold value DT_th3 for the driving force demand DT_dmd within the low-remaining-capacity area is set so that the supplied power corresponding to the threshold value DT_th3 coincides with the base supplied power P1_base.

The normal combined-use control process in the second control mode is executed in the way described above.

In the second control mode, a remaining capacity area (low-side remaining capacity area) obtained by combining the low-remaining-capacity area and the medium-remaining-capacity area is larger than that in the first control mode, and a range for the driving force demand DT_dmd over which power is supplied from the first energy storage device 2 to charge the second energy storage device 3 within the low-side remaining capacity area is larger than that in the first control mode. Thus, the second remaining capacity SOC2 is more likely to be kept in a state near the high-remaining-capacity area than in the first control mode.

In addition, a range for the driving force demand DT_dmd over which power is supplied from the second energy storage device 3 to the electric motor 100 within the medium-remaining-capacity area and the high-remaining-capacity area is also larger than that in the first control mode.

As a result, when the driving force demand DT_dmd is comparatively large (when DT_dmd>DT_th4 holds), the power to be supplied to the electric motor 100 can be changed over a wide range for the driving force demand DT_dmd with high responsivity to changes in the driving force demand DT_dmd. Thus, the responsivity of the actual driving force of the electric motor 100 to changes in the driving force demand DT_dmd can be increased.

In this embodiment, the threshold value B2_th1, which is the upper limit of the medium-remaining-capacity area for the second remaining capacity SOC2, and the base supplied power P1_base of the first energy storage device 2 are both set to values larger than those in the first control mode. Alternatively, only one of the threshold value B2_th1 and the base supplied power P1_base may be set to a value larger than that in the first control mode. In this case, the area within which power is supplied from the first energy storage device 2 to charge the second energy storage device 3 can also be larger than that in the first control mode.

Third Control Mode

There will now be described the normal combined-use control process performed when the control mode is set to the third control mode.

FIG. 14A and FIG. 14B illustrate, in map form, the relationship in the third control mode between the second remaining capacity SOC2 and the proportion of powers to be output by the first energy storage device 2 and the second energy storage device 3 with respect to the amount of electricity to be supplied (the supplied power) to the electric motor 100 in accordance with the driving force demand DT_dmd of the electric motor 100 for the respective cases where the second temperature T2 is greater than or equal to the threshold temperature T2_th (the non-low-temperature condition of the second energy storage device 3) and where the second temperature T2 is lower than the threshold temperature T2_th (the low-temperature condition of the second energy storage device 3). In FIG. 14A and FIG. 14B, the meanings of the diagonally hatched areas and the shaded areas are similar to those in FIG. 5A and FIG. 5B. In FIG. 14A, a two-dot chain line indicates the line representing the threshold value DT_th4 indicated by the broken line in FIG. 5A, for comparison with the first control mode in which T2≥T2_th holds. In FIG. 14B, a two-dot chain line indicates the line representing the threshold value DT_th4 indicated by the broken line in FIG. 5B, for comparison with the first control mode in which T2<T2_th holds.

The comparison between the first control mode illustrated in FIG. 5A and FIG. 5B and the third control mode illustrated in FIG. 14A and FIG. 14B demonstrates that the third control mode is a control mode in which threshold values used to define the proportion of powers to be output by the first energy storage device 2 and the second energy storage device 3 are different from those in the first control mode.

In the third control mode according to this embodiment, even when the second remaining capacity SOC2 is comparatively low, the second energy storage device 3 is less likely to be charged than in the first control mode. When the second remaining capacity SOC2 is comparatively high, a range for the driving force demand DT_dmd over which power is supplied from the first energy storage device 2 to the electric motor 100 is larger than that in the first control mode.

More specifically, in the third control mode according to this embodiment, in STEP12, in both the cases where the second temperature T2 satisfies T2≥T2_th and where the second temperature T2 satisfies T2<T2_th, as illustrated in FIG. 9, the upper limit B2_th1 of the medium-remaining-capacity area (target-remaining-capacity area) for the second remaining capacity SOC2 is set to a value lower than that in the first control mode by a predetermined value ΔB2d. Thus, the magnitude relationship between the upper limit B2_th1 of the target-remaining-capacity area in the first control mode or second control mode and the upper limit B2_th1 of the target-remaining-capacity area in the third control mode is maintained to be the same for both the non-low-temperature condition and low-temperature condition of the second energy storage device 3.

In this embodiment, the same predetermined value ΔB2d is used for the non-low-temperature condition and low-temperature condition of the second energy storage device 3. Alternatively, different predetermined values ΔB2d may be used.

In this embodiment, furthermore, as illustrated in FIG. 9, the lower limit B2_th2 of the medium-remaining-capacity area (target-remaining-capacity area) for the second remaining capacity SOC2 in the third control mode is set to a value equal to the lower limit B2_th2 in the first control mode in both the cases where the second temperature T2 satisfies T2≥T2_th and where the second temperature T2 satisfies T2<T2_th. However, the lower limit B2_th2 in the third control mode may be set to a value different from the lower limit B2_th2 in the first control mode (for example, a value slightly smaller than the lower limit B2_th for the first control mode) in either or both of the cases where the second temperature T2 satisfies T2≥T2_th and where the second temperature T2 satisfies T2<T2_th.

In addition, in STEP20 and STEP26 in the third control mode, the base supplied power P1_base of the first energy storage device 2 within the low-remaining-capacity area and the medium-remaining-capacity area of the second energy storage device 3 is determined so that, in both the cases where the first temperature T1 satisfies T1≥T1_th and where the first temperature T1 satisfies T1<T1_th, as illustrated in FIG. 14A and FIG. 14B, the base supplied power P1_base is smaller than that in the first control mode (in other words, the threshold value DT_th4 obtained by converting the base supplied power P1_base to a driving force value in accordance with the rotational speed of the electric motor 100 (a value calculated with a constant rotational speed) is smaller than that in the first control mode).

The base supplied power P1_base can be determined in a way similar to that in the first control mode. For example, as in the first control mode, the base supplied power P1_base (=α× P1b) can be determined by using a process similar to the process illustrated in the flowchart in FIG. 10. In this case, however, the supplied power P1b, which is a maximum value of the base supplied power P1_base, is set to be smaller than that in the first control mode both when T1≥T1_th is satisfied and when T1<T1_th is satisfied and to be smaller when T1<T1_th than when T1≥T1_th.

The base supplied power P1_base in the third control mode may be determined directly from, for example, the detected value of the second remaining capacity SOC2 and the detected value of the first temperature T1 by using a map created in advance or by using an operational expression.

In this embodiment, furthermore, in the third control mode, the power transmission controller 41 sets the threshold value DT_th1 for the driving force demand DT_dmd within the high-remaining-capacity area and the threshold value DT_th2 for the driving force demand DT_dmd within the medium-remaining-capacity area to be both smaller than those in the first control mode in each of the cases where T1≥T1_th is satisfied and where T1<T1_th is satisfied.

The way in which threshold values related to the second remaining capacity SOC2 and the driving force demand DT_dmd in the third control mode are set is the same or substantially the same as that in the first control mode, except the particulars described above.

The normal combined-use control process in the third control mode is executed in accordance with the flowchart illustrated in FIG. 6 to FIG. 8 described above in a way similar to that in the first control mode.

The normal combined-use control process in the third control mode is executed in the way described above.

In the third control mode, a remaining capacity area (low-side remaining capacity area) obtained by combining the low-remaining-capacity area and the medium-remaining-capacity area is smaller than that in the first control mode, and a range for the driving force demand DT_dmd over which power is supplied from the first energy storage device 2 to charge the second energy storage device 3 within the low-side remaining capacity area is smaller than that in the first control mode. Thus, a situation in which power is supplied from the first energy storage device 2 to charge the second energy storage device 3 is less likely to occur.

The power loss resulting from charging the second energy storage device 3 can thus be reduced compared with that in the first control mode and the second control mode. As a result, the amount of electrical energy consumed by all of the first energy storage device 2 and the second energy storage device 3 per unit distance of travel of the vehicle can be reduced compared with that in the first control mode and the second control mode. The drivable range of the vehicle can therefore be extended.

In this embodiment, the threshold value B2_th1, which is the upper limit of the medium-remaining-capacity area for the second remaining capacity SOC2, and the base supplied power P1_base of the first energy storage device 2 are both set to values smaller than those in the first control mode. Alternatively, only one of the threshold value B2_th1 and the base supplied power P1_base may be set to a value smaller than that in the first control mode. In this case, the area within which power is supplied from the first energy storage device 2 to charge the second energy storage device 3 can also be smaller than that in the first control mode.

A brief summary of the first to third control modes described above is presented below. The first control mode is a so-called "long-lasting mode", which is used mainly to let the first energy storage device 2 and the second energy storage device 3 deteriorate as little as possible. The second control mode is a so-called "sport mode", which is used mainly to enhance responsivity to the driving force demand DT_dmd of the electric motor 100. The third control mode is a so-called "eco mode", which is used mainly to enhance the fuel economy performance of the vehicle (the distance traveled by the vehicle per unit of electrical energy consumed).

The normal combined-use control process described above allows the second energy storage device 3 to be charged or discharged so that, in any of the first control mode, the second control mode, and the third control mode, the second remaining capacity SOC2 can converge to a value in the target-remaining-capacity area (medium-remaining-capacity area) corresponding to each control mode (the middle value in the target-remaining-capacity area or a nearby value) and can be kept within the target-remaining-capacity area.

In this case, in the low-temperature condition of the second energy storage device 3 in which T2<T2_th holds, the upper limit B2_th1 and the lower limit B2_th2 of the target-remaining-capacity area are set to values smaller than those in the non-low-temperature condition of the second energy storage device 3 in which T2≥T2_th holds, regardless of the control mode. Thus, in the low-temperature condition where the second energy storage device 3 has a high impedance, a situation in which the second energy storage device 3 is charged with power supplied by the first energy storage device 2 is less likely to occur than in the non-low-temperature condition where the second energy storage device 3 has a comparatively low impedance. This can prevent an increase in the power loss of the first energy storage device 2 which results from charging the second energy storage device 3.

In addition, in the low-temperature condition of the second energy storage device 3 where T2<T2_th holds, the second energy storage device 3 can be charged with a larger amount of regenerative power than in the non-low-temperature condition of the second energy storage device 3 where T2≥T2_th holds. Thus, charging with the regenerative power allows the second energy storage device 3 to generate heat which can used for rapid transition of the second energy storage device 3 from the low-temperature condition to the non-low-temperature condition.

Therefore, in the low-temperature condition of the second energy storage device 3, a reduction in the drivable range over which the normal combined-use control process enables the vehicle to continue traveling can be prevented compared with the non-low-temperature condition of the second energy storage device 3.

In the low-temperature condition of the second energy storage device 3, furthermore, since the upper limit B2_th1 of the target-remaining-capacity area is lower than that in the non-low-temperature condition of the second energy storage device 3 regardless of the control mode, the second remaining capacity SOC2 is more likely to be kept at a remaining capacity value lower than that in the non-low-temperature condition. Hence, in the low-temperature condition of the second energy storage device 3, the second energy storage device 3 is charged with a larger amount of regenerative power obtained during a regenerative operation described below than that in the non-low-temperature condition of the second energy storage device 3. Thus, even in the low-temperature condition of the second energy storage device 3, a situation in which there is a shortage of the remaining capacity of the second energy storage device 3 for the power-running operation of the electric motor 100 can be prevented from occurring as much as possible.

Extended-Stop Control Process

The extended-stop control process in STEP6 will now be described in detail.

In the extended-stop control process, the power transmission controller 41 controls the power transmission circuit unit 11 to supply only the deficit against the supplied power corresponding to the driving force demand DT_dmd from the second energy storage device 3 to the electric motor 100 while supplying power from the first energy storage device 2 to the electric motor 100 as continuously as possible during the power-running operation of the electric motor 100.

Figure 15:
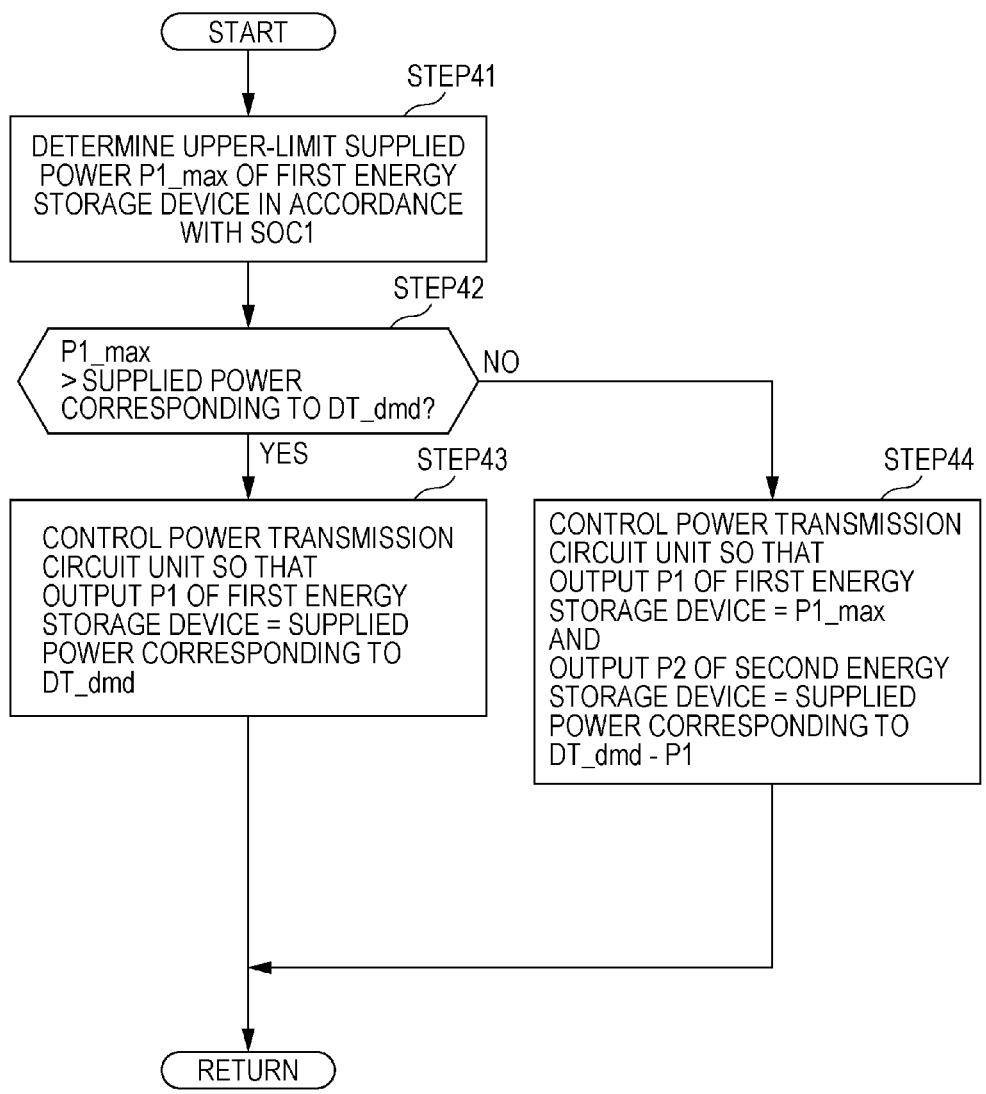
FIG. 15 is a flowchart illustrating an extended-stop control process executed in STEP6 in FIG. 4.

In the extended-stop control process, the power transmission controller 41 executes a process illustrated in a flowchart in FIG. 15 at intervals of a predetermined control process period. Specifically, in STEP41, the power transmission controller 41 determines an upper-limit supplied power P1_max that can be output from the first energy storage device 2, in accordance with the detected value of the first remaining capacity SOC1.

Figure 17:
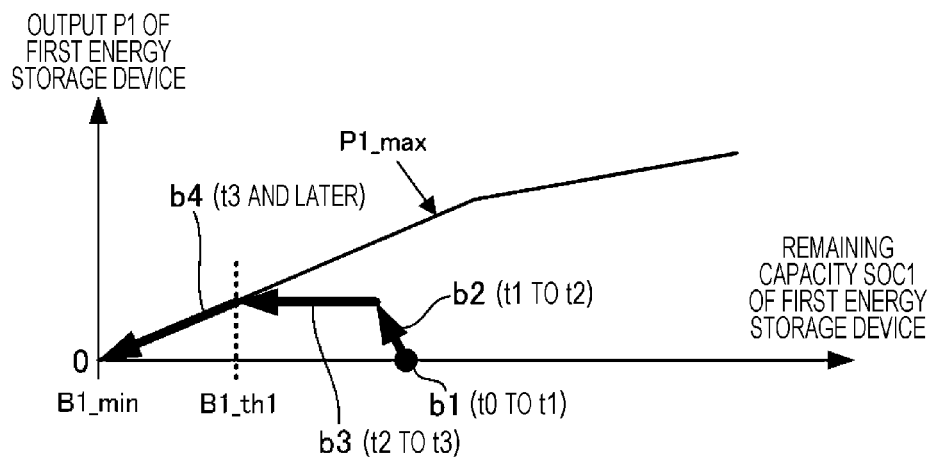
FIG. 17 is a graph illustrating an example of changes in the remaining capacity of the first energy storage device over time.

The upper-limit supplied power P1_max is determined from the detected value of the first remaining capacity SOC1, for example, in a manner depicted on a graph in FIG. 17 by using a map created in advance or by using an operational expression. The upper-limit supplied power P1_max is determined to be a value that becomes smaller as the first remaining capacity SOC1 decreases.

The upper-limit supplied power P1_max may be set in accordance with the detected value of the first remaining capacity SOC1 and the detected value of the first temperature T1. In this case, preferably, the upper-limit supplied power P1 max is set so that the lower the first temperature T1, the smaller the upper-limit supplied power P1_max.

Then, in STEP42, the power transmission controller 41 determines whether or not the upper-limit supplied power P1 max is larger than the supplied power corresponding to the driving force demand DT_dmd.

If the determination result of STEP42 is affirmative, in STEP43, the power transmission controller 41 controls the power transmission circuit unit 11 so that the output P1 of the first energy storage device 2 coincides with the supplied power corresponding to the driving force demand DT_dmd.

In this case, specific control of the power transmission circuit unit 11 can be performed in a manner similar to that in STEP29 in FIG. 8.

On the other hand, if the determination result of STEP42 is negative, in STEP44, the power transmission controller 41 controls the power transmission circuit unit 11 so that the output P1 of the first energy storage device 2 coincides with the upper-limit supplied power P1_max and so that the output P2 of the second energy storage device 3 coincides with the power deficit obtained by subtracting the output P1 of the first energy storage device 2 (=P1_max) from the supplied power corresponding to the driving force demand DT_dmd.

In this case, specific control of the power transmission circuit unit 11 can be performed in a manner similar to that in STEP15 in FIG. 6.

In STEP44, when the detected value of the first remaining capacity SOC1 has reached the lower limit B1_min and the upper-limit supplied power P1_max=0 holds, the supplied power corresponding to the driving force demand DT_dmd is supplied only from the second energy storage device 3 to the electric motor 100. In this situation, the voltage converter 15 of the power transmission circuit unit 11 is controlled to be in power supply interruption state or the contactor 12 on the first energy storage device 2 side is controlled to be turned off.

The extended-stop control process is executed in the way described above. In the extended-stop control process, the first energy storage device 2 from which it is difficult to output a high supplied power is preferentially used to supply power to the electric motor 100. Even when the upper-limit supplied power P1_max, which can be output by the first energy storage device 2, does not reach the supplied power corresponding to the driving force demand DT_dmd, power is supplied from both the first energy storage device 2 and the second energy storage device 3 to the electric motor 100, allowing the first energy storage device 2 to be discharged to the remaining capacity corresponding to the lower limit B1_min.

Thereafter, the second energy storage device 3 from which it is easy to output a high supplied power is used to supply power to the electric motor 100. This allows the second energy storage device 3 to be discharged to the remaining capacity corresponding to the lower limit B2_min or to a nearby remaining capacity.

An example of changes in the first remaining capacity SOC1 and the second remaining capacity SOC2 through the normal combined-use control process and extended-stop control process described above will now be described with reference to FIG. 16 to FIG. 18.

In the illustrated example, the control mode in the normal combined-use control process is the first control mode, by way of example, and the detected value of the second temperature T2 is a temperature that satisfies T2≥T2_th1.

Figure 16:
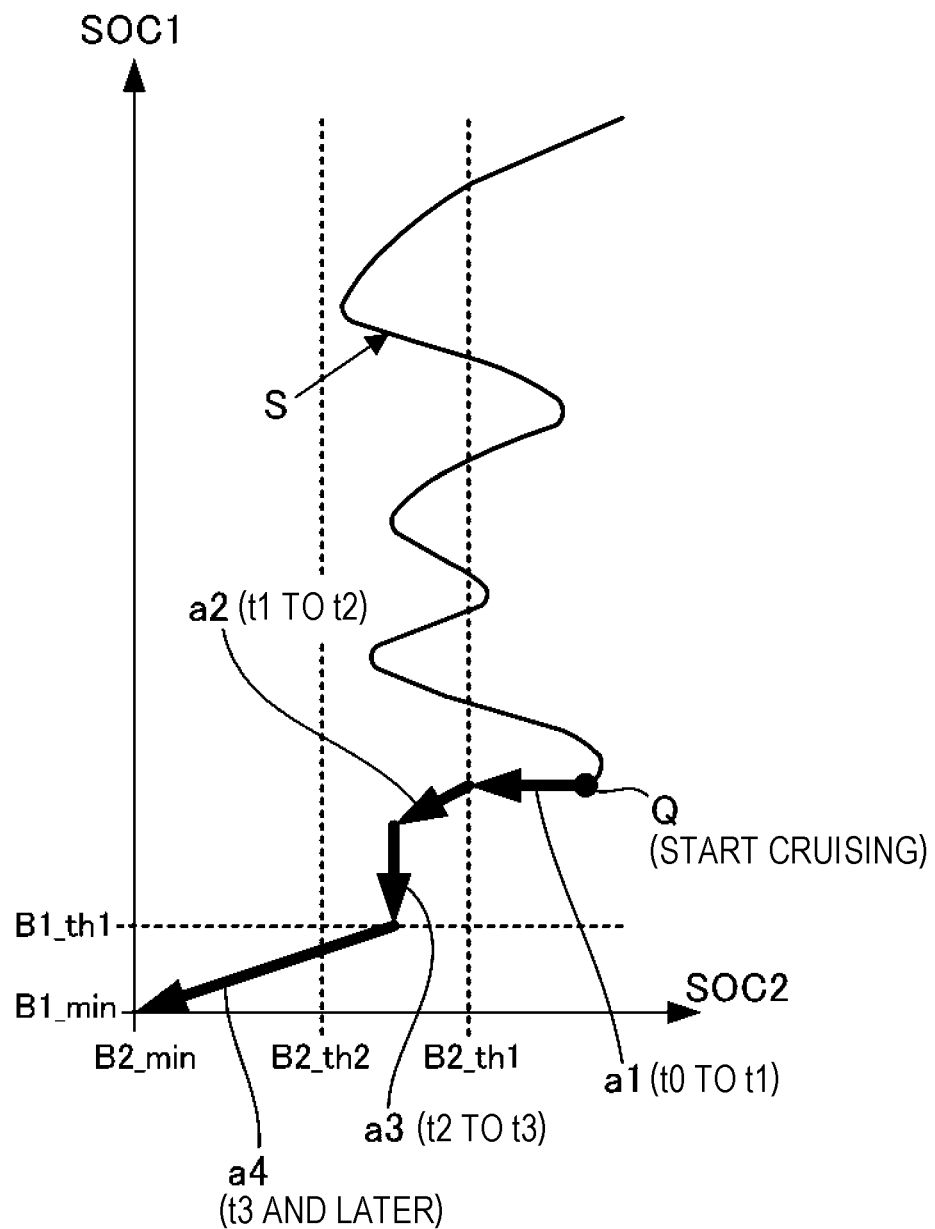
FIG. 16 is a graph illustrating an example of changes in a combination of the respective remaining capacities of a first energy storage device and the second energy storage device over time.

FIG. 16 illustrates a graph S, which depicts, by way of example, in which pattern the combination of the first remaining capacity SOC1 and the second remaining capacity SOC2 changes when the vehicle is traveling with the normal combined-use control process being executed.

The graph S demonstrates that the second remaining capacity SOC2 increases or decreases so as to be kept at, for example, a value near the threshold value B2_th1 by appropriately charging the second energy storage device 3 with power supplied from the first energy storage device 2, whereas the first remaining capacity SOC1 decreases.

In FIG. 16, thick-line arrows a1 to a4 indicate how the combination of the first remaining capacity SOC1 and the second remaining capacity SOC2 changes when the vehicle starts cruising at, for example, the time point (time t0) at which the combination of the first remaining capacity SOC1 and the second remaining capacity SOC2 is in a state indicated by a point Q. Cruising is movement of a vehicle with the driving force demand DT_dmd of the electric motor 100 and the rotational speed being kept substantially constant.

In FIG. 17, a point b1 and thick-line arrows b2 to b4 indicate changes in the first remaining capacity SOC1 from the time t0. In FIG. 18, thick-line arrows c1 and c2, a point c3, and a thick-line arrow c4 indicate changes in the second remaining capacity SOC2 from the time t0.

The indications a1, b1, and c1 represent the time period from the time t0 to time t1, the indications a2, b2, and c2 represent the time period from the time t1 to time t2, the indications a3, b3, and c3 represent the time period from the time t2 to time t3, and the indications a4, b4, and c4 represent the time period after the time t3. The time t3 is a time at which the extended-stop control process is started in response to the first remaining capacity SOC1 reaching the threshold value B1_th1. In addition, the driving force demand DT_dmd of the electric motor 100 which is cruising has a value positioned at the height indicated by c1, c2, c3, and c4 in FIG. 18, for example.

Figure 18:
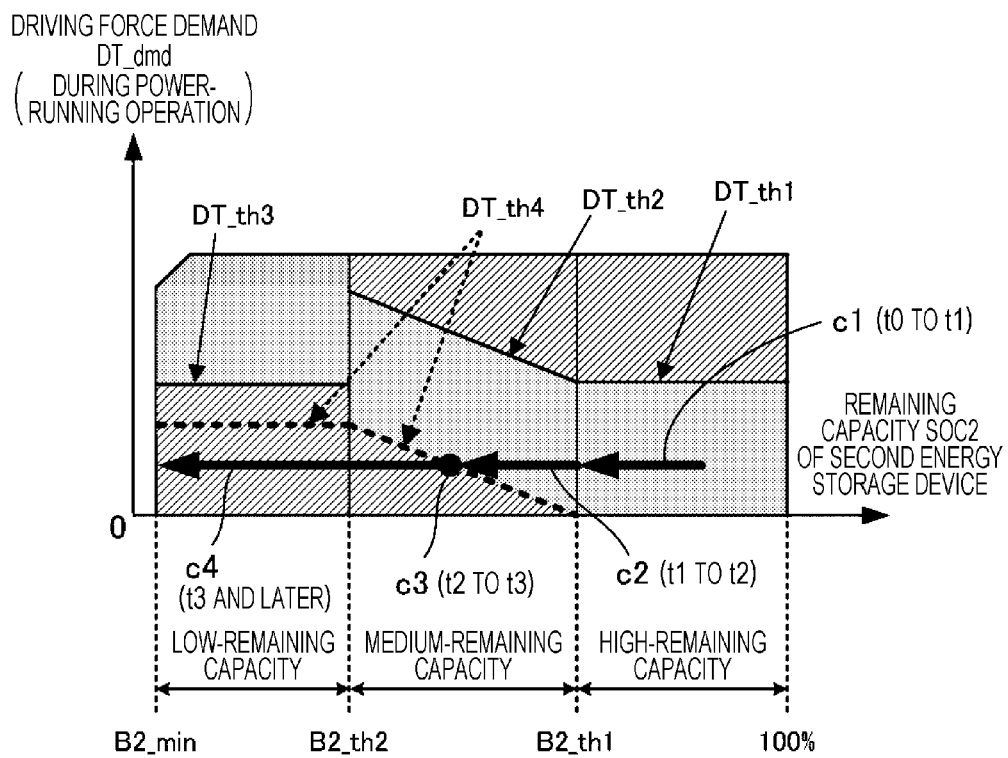
FIG. 18 is a graph illustrating an example of changes in the remaining capacity of the second energy storage device over time.

During the time period from the time t0 to the time t1, through the normal combined-use control process in the first control mode, no power is supplied from the first energy storage device 2 to the electric motor 100 or nor is the second energy storage device 3 charged with power supplied from the first energy storage device 2, and power is supplied only from the second energy storage device 3 to the electric motor 100 (see FIG. 18). Thus, as indicated by way of example by the arrow a1 in FIG. 16 and the point b1 in FIG. 17, the first remaining capacity SOC1 is kept constant. In addition, as indicated by way of example by the arrow a1 in FIG. 16 and the arrow c1 in FIG. 18, the second remaining capacity SOC2 decreases.

When the second remaining capacity SOC2 reaches the threshold value B2_th1 at the time t1, then, during the time period from the time t1 to the time t2, through the normal combined-use control process in the first control mode, power is supplied from both the first energy storage device 2 and the second energy storage device 3 to the electric motor 100 (see FIG. 18). Thus, as indicated by way of example by the arrow a2 in FIG. 16 and the arrow b2 in FIG. 17, the first remaining capacity SOC1 decreases and, as indicated by way of example by the arrow a2 in FIG. 16 and the arrow c2 in FIG. 18, the second remaining capacity SOC2 decreases.

When the second remaining capacity SOC2 reaches the value corresponding to the point c3 in FIG. 18 at the time t2, through the normal combined-use control process in the first control mode, power is supplied only from the first energy storage device 2 to the electric motor 100. Thus, during the time period from the time t2 to the time t3, as indicated by way of example by the arrow a3 in FIG. 16 and the point c3 in FIG. 18, the second remaining capacity SOC2 is kept constant. Then, as indicated by way of example by the arrow a3 in FIG. 16 and the arrow b3 in FIG. 17, the first remaining capacity SOC1 decreases.

When the first remaining capacity SOC1 decreases to the threshold value B1_th1 at the time t3, the extended-stop control process is started. Thus, after the time t3, as indicated by way of example by the arrow a4 in FIG. 16 and the arrow b4 in FIG. 17, the first remaining capacity SOC1 decreases to the lower limit B1 min while the first energy storage device 2 outputs the upper-limit supplied power P1_max. In addition, as indicated by way of example by the arrow a4 in FIG. 16 and the arrow c4 in FIG. 18, the second remaining capacity SOC2 decreases to the lower limit B2_min.

Figure 19:
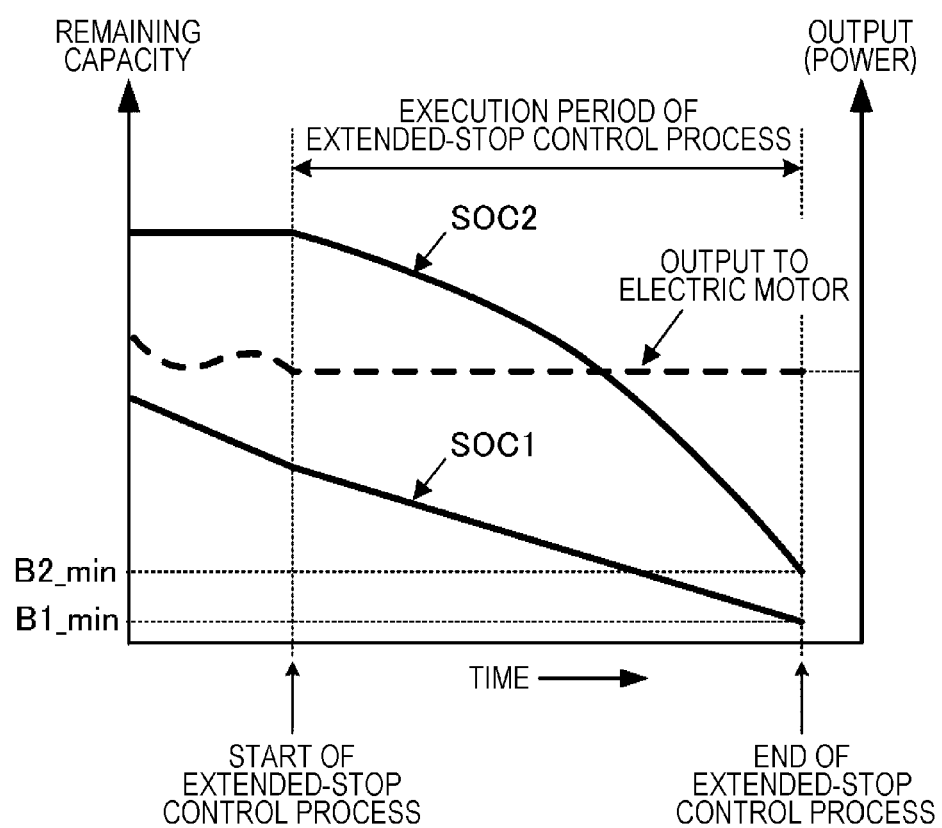
FIG. 19 is a graph illustrating an example of changes in the remaining capacities of the first energy storage device and the second energy storage device over time within a period during which the extended-stop control process is executed.

FIG. 19 illustrates an example of changes in the first remaining capacity SOC1 and the second remaining capacity SOC2 over time in the extended-stop control process. The illustrated example provides an example of changes in the first remaining capacity SOC1 and the second remaining capacity SOC2 over time when the output (the supplied power) to the electric motor 100 is kept at a certain constant value (that is, when the vehicle is cruising) after the start of the extended-stop control process.

As illustrated in FIG. 19, power is supplied from both the first energy storage device 2 and the second energy storage device 3 to the electric motor 100. This allows the remaining capacities SOC1 and SOC2 of the first energy storage device 2 and the second energy storage device 3 to be consumed to the lower limits B1_min and B2 min, respectively, while ensuring a constant value of supplied power to the electric motor 100.

In the manner described above, an extension of the period during which power can be supplied to the electric motor 100 with the use of both the first energy storage device 2 and the second energy storage device 3 allows the power of both the first energy storage device 2 and the second energy storage device 3 to be exhausted more fully than an extension of the period during which power can be supplied to the electric motor 100 with the use of either energy storage device (e.g., the first energy storage device 2). Thus, the period during which power can be supplied to the electric motor 100 and therefore the drivable range of the vehicle can further be extended.

In the extended-stop control process, as described above, the first energy storage device 2 and the second energy storage device 3 can be discharged fully to the respective lower limits B1_min and B2_min or to nearby remaining capacity values due to power supply to the electric motor 100.

Control Process During Regenerative Operation

There will now be described a control process for the power transmission controller 41 during the regenerative operation of the electric motor 100.

Figure 20:
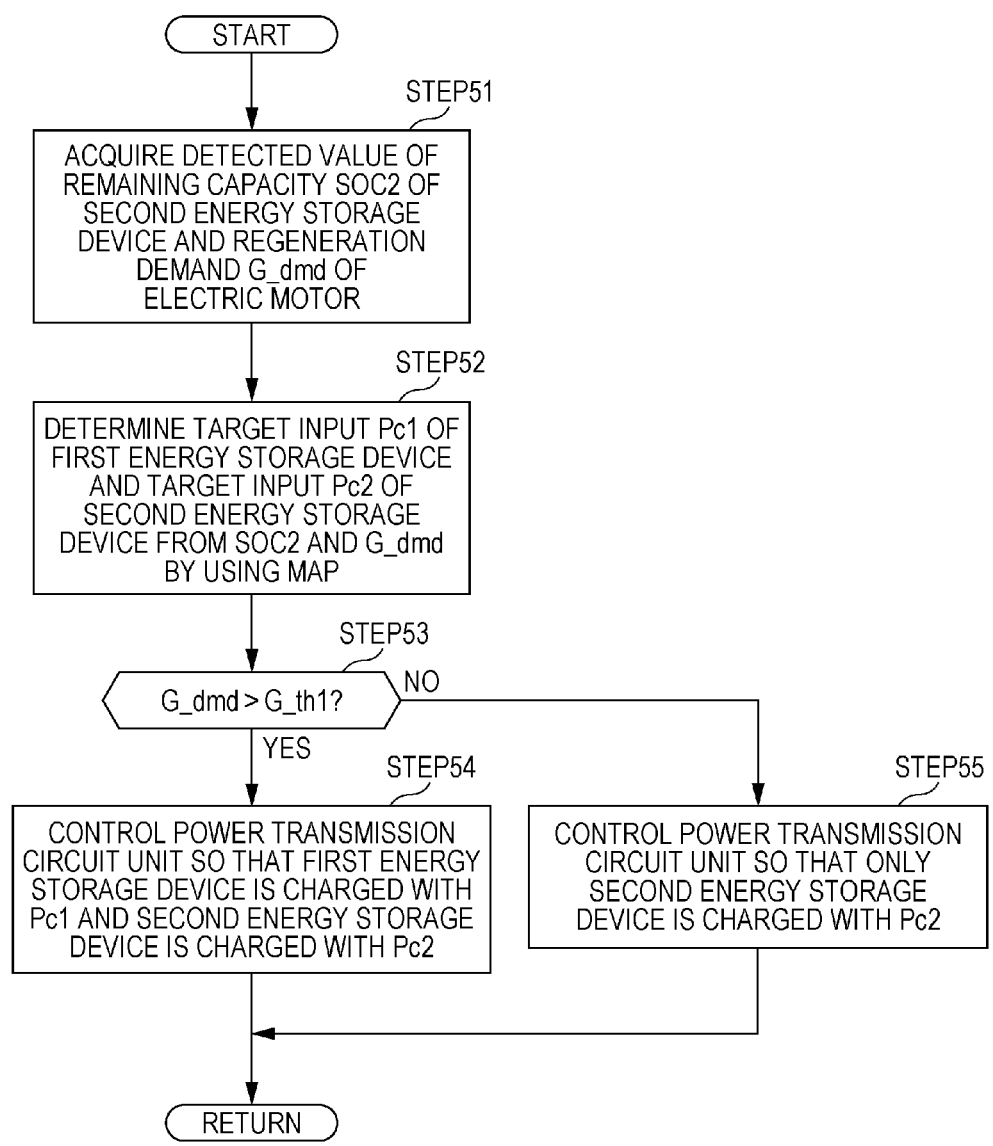
FIG. 20 is a flowchart illustrating a control process for the control device during a regenerative operation of an electric motor according to a first embodiment of the present disclosure.

In this embodiment, the control process for the power transmission controller 41 during the regenerative operation of the electric motor 100 is executed at intervals of a predetermined control process period in a way illustrated in a flowchart in FIG. 20.

Specifically, in STEP51, the power transmission controller 41 acquires a detected value of the second remaining capacity SOC2 and a regeneration demand G_dmd of the electric motor 100. In this embodiment, the regeneration demand G_dmd is a request value for power to be generated by the electric motor 100 (an amount of energy generated per unit time).

The regeneration demand G_dmd is determined from, for example, a braking force demand during the regenerative operation of the electric motor 100 and a detected value of the rotational speed of the electric motor 100 by using a map created in advance or by using an operational expression.

Then, in STEP52, the power transmission controller 41 determines the respective target inputs Pc1 and Pc2 (amounts of target charging power) of the first energy storage device 2 and the second energy storage device 3 from the detected value of the second remaining capacity SOC2 and the regeneration demand G_dmd of the electric motor 100 on the basis of a map created in advance.

Figure 21:
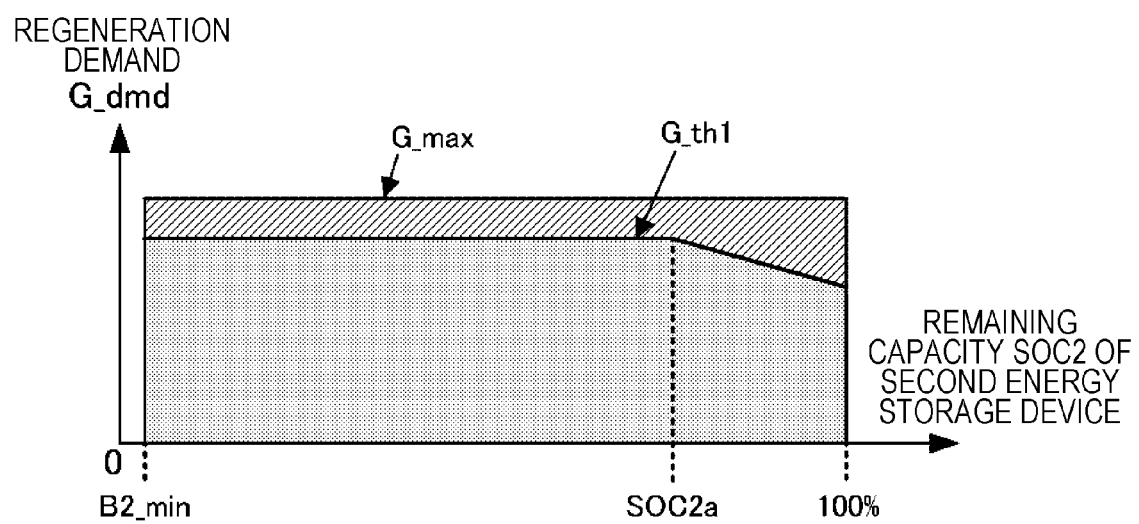
FIG. 21 illustrates a map for the process illustrated in FIG. 20.

FIG. 21 illustrates a visual representation of the map. On the map, a shaded area within which the regeneration demand G_dmd is less than or equal to a predetermined threshold value G_th1 represents an area within which only the second energy storage device 3 is charged (an area within which Pc1=0 holds), and a diagonally hatched area within which the regeneration demand G_dmd is larger than the threshold value G_th1 represents an area within which both the first energy storage device 2 and the second energy storage device 3 are charged.

The threshold value G_th1 is a threshold value set in accordance with the detected value of the second remaining capacity SOC2. In the illustrated example, the threshold value G_th1 is a predetermined constant value (fixed value) in an area within which the second remaining capacity SOC2 is less than or equal to a predetermined value SOC2a, and is set to decrease in accordance with an increase in the second remaining capacity SOC2 in an area within which the second remaining capacity SOC2 is larger than the predetermined value SOC2a. The threshold value G_th1 is further set to a value closer to a maximum value G_max of the regeneration demand G_dmd among the maximum value G_max and zero, or is set so that the difference between the maximum value G_max and the threshold value G_th1 is less than or equal to a predetermined value.

In STEP52, when the combination of the detected value of the second remaining capacity SOC2 and the regeneration demand G_dmd falls within the shaded area, the target input Pc1 of the first energy storage device 2 is set to zero and the regeneration demand G_dmd is set as the target input Pc2 of the second energy storage device 3. Accordingly, if the regeneration demand G_dmd is smaller than the threshold value G_th1, the target inputs Pc1 and Pc2 are set so that only the second energy storage device 3 is charged with regenerative power.

When the combination of the detected value of the second remaining capacity SOC2 and the regeneration demand G_dmd falls within the diagonally hatched area, a regenerative value that coincides with the threshold value G_th1 is set as the target input Pc2 of the second energy storage device 3 and the residual regenerative value, which is obtained by subtracting the target input Pc2 of the second energy storage device 3 from the regeneration demand G_dmd, is set as the target input Pc1 of the first energy storage device 2.

Accordingly, when the regeneration demand G_dmd is larger than the threshold value G_th1 and when the detected value of the second remaining capacity SOC2 is larger than the predetermined value SOC2a, the target inputs Pc1 and Pc2 are set so that the ratio of the target input Pc2 of the second energy storage device 3 to the regeneration demand G_dmd decreases as the detected value of the second remaining capacity SOC2 increases (in other words, so that the ratio of the target input Pc1 of the first energy storage device 2 to the regeneration demand G_dmd increases as the detected value of the second remaining capacity SOC2 increases). Furthermore, the target input Pc1 is set to a value that is less than or equal to a predetermined value and that is smaller than the target input Pc2.

Then, in STEP53, the power transmission controller 41 determines whether or not the regeneration demand G_dmd is larger than the threshold value G_th1.

The determination result of STEP53 is affirmative within the diagonally hatched area illustrated in FIG. 21. In this situation, in STEP54, the power transmission controller 41 controls the power transmission circuit unit 11 so that the first energy storage device 2 and the second energy storage device 3 are charged with the target inputs Pc1 and Pc2, respectively.

Specifically, the processing of STEP54 can be executed in the following way, for example. A target value for the output voltage of the inverter 17 (=the input voltages of the voltage converters 15 and 16) is set in accordance with the detected value of the rotational speed of the electric motor 100 or the like. In addition, the target input Pc1 is set as the target value for the output power from the voltage converter 15 to the first energy storage device 2, and the target input Pc2 is set as the target value for the output power from the voltage converter 16 to the second energy storage device 3.

Further, the inverter 17 is controlled so as to realize the target value for the output voltage of the inverter 17. Also, the voltage converters 15 and 16 are controlled so as to realize the target value for the output power from the voltage converter 15 to the first energy storage device 2 and the target value for the output power from the voltage converter 16 to the second energy storage device 3.

On the other hand, the determination result of STEP53 is negative within the shaded area illustrated in FIG. 21. In this situation, in STEP55, the power transmission controller 41 controls the power transmission circuit unit 11 so that only the second energy storage device 3 is charged with the target input Pc2.

Specifically, the processing of STEP55 can be executed in the following way, for example. A target value for the output voltage of the inverter 17 (=the input voltage of the voltage converter 16) is set in accordance with the detected value of the rotational speed of the electric motor 100 or the like. In addition, the target input Pc2 is set as the target value for the output power from the voltage converter 16 to the second energy storage device 3.

Further, the inverter 17 is controlled so as to realize the target value for the output voltage of the inverter 17. Also, the voltage converter 16 is controlled so as to realize the target value for the output power from the voltage converter 16 to the second energy storage device 3.

Furthermore, the voltage converter 15 is controlled to be in power supply interruption state. Alternatively, the contactor 12 on the first energy storage device 2 side is controlled to be turned off. This prohibits discharging from the first energy storage device 2.

In the way described above, the control process for the power transmission controller 41 during the regenerative operation of the electric motor 100 is executed.

The control process for the power transmission controller 41 during the regenerative operation is executed in the way described above, thereby allowing regenerative power to be supplied to basically charge the second energy storage device 3. Only an excess of regenerative power used to charge the second energy storage device 3 (a regenerative value exceeding the threshold value G_th1) is used to charge the first energy storage device 2.

According to the first embodiment described above, the upper limit B2_th1 and the lower limit B2_th2 of the target-remaining-capacity area (medium-remaining-capacity area) in the low-temperature condition of the second energy storage device 3 are lower than those in the non-low-temperature condition regardless of which of the first to third control modes is used. This results in an increase in the regenerative power with which the second energy storage device 3 can be charged in the low-temperature condition of the second energy storage device 3. Thus, the occurrence of a shortage of the second remaining capacity SOC2 for low-temperature condition of the second energy storage device 3 can be prevented as much as possible.

The first energy storage device 2 typically has a low resistance to deterioration due to charging at high rates (high-speed charging in which the charging power per unit time is large). However, the normal combined-use control process or the extended-stop control process does not involve a control process such as a process for charging the first energy storage device 2 with power supplied by the second energy storage device 3. In the control process performed during the regenerative operation of the electric motor 100, furthermore, the regenerative value for the first energy storage device 2 is reduced as much as possible. Thus, the progression of deterioration of the first energy storage device 2 caused by charging can be restrained as much as possible.

The correspondences between components illustrated in the first embodiment described above and components disclosed herein will be briefly explained below.

In this embodiment, the processing of STEP22 or STEP28, which is executed by the power transmission controller 41 in a condition where the driving force demand DT_dmd is smaller than the threshold value DT_th4, which is obtained by converting the base supplied power P1_base into a driving force value in accordance with the detected value of the rotational speed of the electric motor 100, when the detected value of the second remaining capacity SOC2 falls within the medium-remaining-capacity area (target-remaining-capacity area) or the low-remaining-capacity area regardless of which of the first to third control modes is used, corresponds to a first process disclosed herein the present disclosure.

Furthermore, the processing of STEP15 or STEP16, which is executed by the power transmission controller 41 when the detected value of the second remaining capacity SOC2 falls within the high-remaining-capacity area regardless of the control mode, corresponds to a second process disclosed herein the present disclosure.

The first process (the processing of STEP22 or STEP28) and the second process (the processing of STEP15 or STEP16) constitute a remaining-capacity adjusting process disclosed herein the present disclosure.

Furthermore, the processing of STEP12 in the normal combined-use control process corresponds to a target-remaining-capacity area setting process disclosed herein the present disclosure.

Furthermore, the control process performed during the regenerative operation illustrated in FIG. 20 corresponds to a regenerative power charging process disclosed herein the present disclosure.

Second Embodiment

Next, a second embodiment of the present disclosure will be described with reference to FIG. 22 and FIG. 23. This embodiment is the same or substantially the same as the first embodiment, except for a control process performed during the regenerative operation of the electric motor 100. Thus, the same or substantially the same portions as those in the first embodiment are not described herein.

Figure 22:
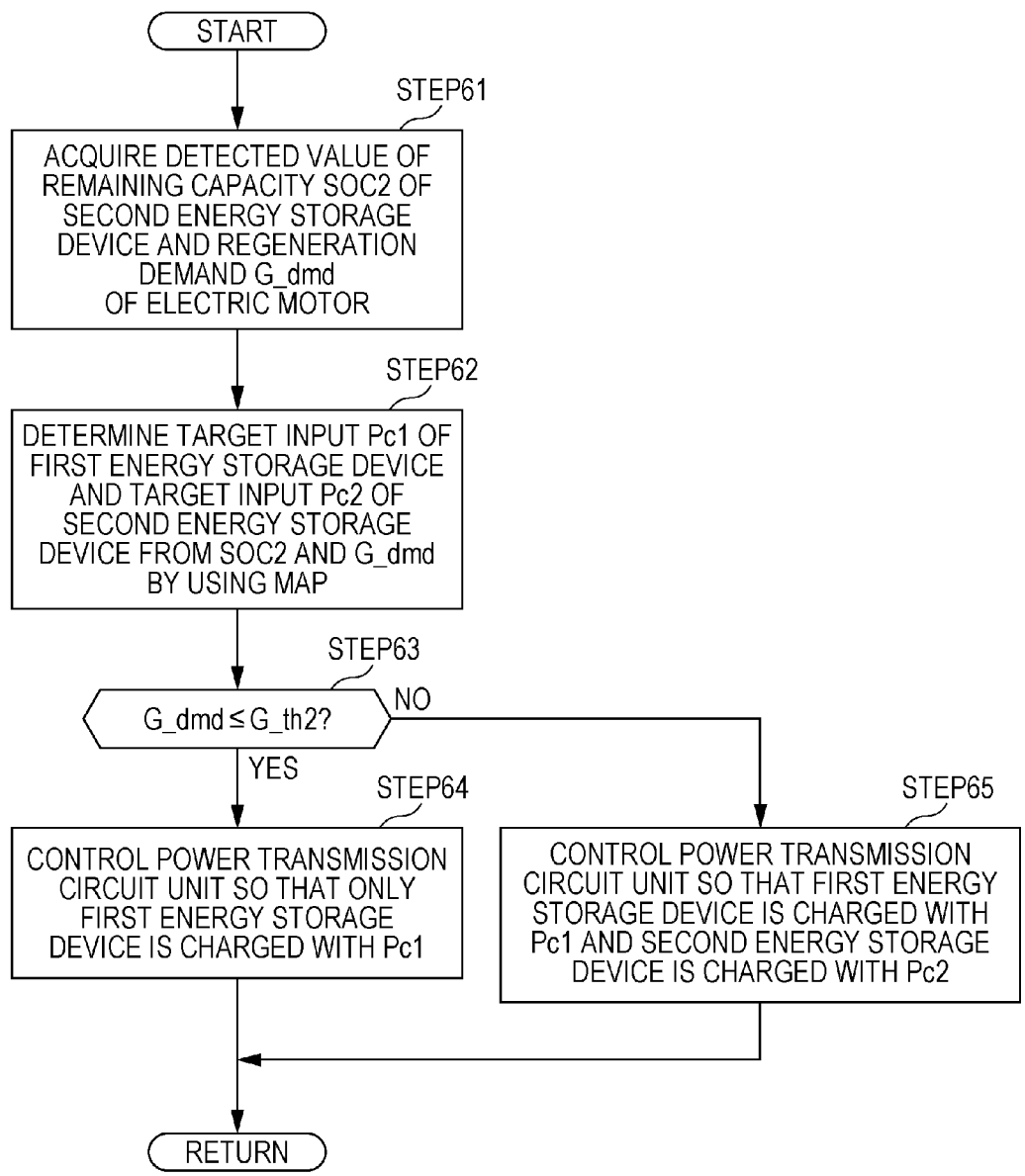
FIG. 22 is a flowchart illustrating a control process for the control device during the regenerative operation of the electric motor according to a second embodiment of the present disclosure.

In this embodiment, the control process for the power transmission controller 41 during the regenerative operation of the electric motor 100 is executed at intervals of a predetermined control process period in a way illustrated in a flowchart in FIG. 22.

Specifically, in STEP61, the power transmission controller 41 acquires a detected value of the second remaining capacity SOC2 and a regeneration demand G_dmd of the electric motor 100. The processing of STEP61 is the same or substantially the same as the processing of STEP51 in the first embodiment.

Then, in STEP62, the power transmission controller 41 determines the respective target inputs Pc1 and Pc2 (amounts of target charging power) of the first energy storage device 2 and the second energy storage device 3 from the detected value of the second remaining capacity SOC2 and the regeneration demand G_dmd of the electric motor 100 on the basis of a map created in advance.

Figure 23:
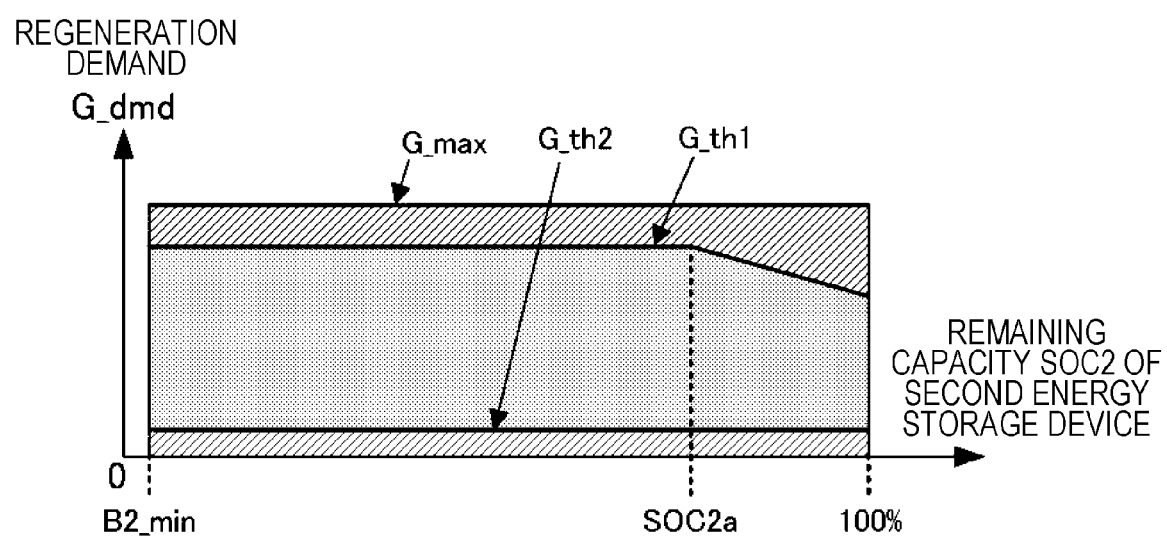
FIG. 23 illustrates a map for the process illustrated in FIG. 22 (or FIG. 24).

FIG. 23 illustrates a visual representation of the map in this embodiment. On the map, a diagonally hatched area within which the regeneration demand G_dmd is less than or equal to a predetermined threshold value G_th2 represents an area within which only the first energy storage device 2 is charged (an area within which Pc2=0 holds), and a shaded area within which the regeneration demand G_dmd is larger than the threshold value G_th2 and is less than or equal to a predetermined threshold value G_th1 and a diagonally hatched area within which the regeneration demand G_dmd is larger than the threshold value G_th1 represent an area within which both the first energy storage device 2 and the second energy storage device 3 are charged.

Of the threshold values G_th1 and G_th2, the threshold value G_th1 is a threshold value set in accordance with the detected value of the second remaining capacity SOC2, as in the first embodiment.

In this embodiment, the threshold value G_th2 is a predetermined constant value that has been determined in advance. The threshold value G_th2 is a comparatively small value (a near-zero value).

In STEP62, when the combination of the detected value of the second remaining capacity SOC2 and the regeneration demand G_dmd falls within the bottom diagonally hatched area, the target input Pc2 of the second energy storage device 3 is set to zero and the regeneration demand G_dmd is set as the target input Pc1 of the first energy storage device 2.

Accordingly, the target inputs Pc1 and Pc2 are set so that only the first energy storage device 2 is charged with regenerative power.

When the combination of the detected value of the second remaining capacity SOC2 and the regeneration demand G_dmd falls within the shaded area, a regenerative value that coincides with the threshold value G_th2 is set as the target input Pc1 of the first energy storage device 2 and the residual regenerative value, which is obtained by subtracting the target input Pc1 of the first energy storage device 2 from the regeneration demand G_dmd, is set as the target input Pc2 of the second energy storage device 3.

When the combination of the detected value of the second remaining capacity SOC2 and the regeneration demand G_dmd falls within the top diagonally hatched area, a supplied power that coincides with a value obtained by subtracting the threshold value G_th2 from the threshold value G_th1 (=G_th1−G_th2) is set as the target input Pc2 of the second energy storage device 3 and the residual regenerative value, which is obtained by subtracting the target input Pc2 of the second energy storage device 3 from the regeneration demand G_dmd, is set as the target input Pc1 of the first energy storage device 2.

Then, in STEP63, the power transmission controller 41 determines whether or not the regeneration demand G_dmd is less than or equal to the threshold value G_th2.

The determination result of STEP63 is affirmative within the bottom diagonally hatched area illustrated in FIG. 23. In this situation, in STEP64, the power transmission controller 41 controls the power transmission circuit unit 11 so that only the first energy storage device 2 is charged with the target input Pc1.

Specifically, the processing of STEP64 can be executed in the following way, for example. A target value for the output voltage of the inverter 17 (=the input voltage of the voltage converter 15) is set in accordance with the detected value of the rotational speed of the electric motor 100 or the like. In addition, the target input Pc1 is set as the target value for the output power from the voltage converter 15 to the first energy storage device 2.

Further, the inverter 17 is controlled so as to realize the target value for the output voltage of the inverter 17. Also, the voltage converter 15 is controlled so as to realize the target value for the output power from the voltage converter 15 to the first energy storage device 2.

Furthermore, the voltage converter 16 is controlled to be in power supply interruption state. Alternatively, the contactor 13 on the second energy storage device 3 side is controlled to be turned off. This prohibits discharging from the second energy storage device 3.

On the other hand, the determination result of STEP63 is negative within the shaded area or the top diagonally hatched area illustrated in FIG. 23. In this situation, in STEP65, the power transmission controller 41 controls the power transmission circuit unit 11 so that the first energy storage device 2 and the second energy storage device 3 are charged with the target inputs Pc1 and Pc2, respectively.

In this case, specific control of the power transmission circuit unit 11 can be performed in a manner similar to that in the processing of STEP54 in the first embodiment.

In this embodiment, the threshold values G_th1 and G_th2 are set so that the target input Pc1 of the first energy storage device 2 is kept less than or equal to a predetermined value.

In this embodiment, the control process for the power transmission controller 41 during the regenerative operation of the electric motor 100 is executed in the way described above.

The control process for the power transmission controller 41 during the regenerative operation is executed in the way described above, thereby allowing the first energy storage device 2 to be charged with a small amount of regenerative power less than or equal to the threshold value G_th2, except for the case where the regeneration demand G_dmd is larger than the threshold value G_th1. In this case, since the amount of charging power used to charge the first energy storage device 2 is small, the first energy storage device 2 can be charged at a low charging rate (low rate). This allows the first energy storage device 2 to be charged while preventing the progression of deterioration of the first energy storage device 2 during the regenerative operation. Hence, the drivable range of the vehicle can be extended.

In the second embodiment described above, as in the first embodiment, the upper limit B2_th1 and the lower limit B2_th2 of the target-remaining-capacity area (medium-remaining-capacity area) in the low-temperature condition of the second energy storage device 3 are lower than those in the non-low-temperature condition regardless of which of the first to third control modes is used. This results in an increase in the regenerative power with which the second energy storage device 3 can be charged in the low-temperature condition of the second energy storage device 3. Thus, the occurrence of a shortage of the second remaining capacity SOC2 for low-temperature condition of the second energy storage device 3 can be prevented as much as possible.

In addition, the normal combined-use control process or the extended-stop control process does not involve a control process such as a process for charging the first energy storage device 2, which has a relatively low resistance to deterioration due to charging, with power supplied by the second energy storage device 3. In the control process performed during the regenerative operation of the electric motor 100, furthermore, the regenerative value for the first energy storage device 2 is limited to a small regenerative value. Thus, the progression of deterioration of the first energy storage device 2 caused by charging can be restrained as much as possible.

The correspondences between components illustrated in this embodiment and components disclosed herein will now be further explained below. In this embodiment, the control process performed during the regenerative operation illustrated in FIG. 22 corresponds to a regenerative power charging process disclosed herein the present disclosure.

The other correspondences between components illustrated in this embodiment and components disclosed herein are the same as those for the first embodiment.

Third Embodiment

Next, a third embodiment of the present disclosure will be described with reference to FIG. 24. This embodiment is the same or substantially the same as the second embodiment, except for a control process performed during the regenerative operation of the electric motor 100. Thus, the same or substantially the same portions as those in the first embodiment are not described herein.

Figure 24:
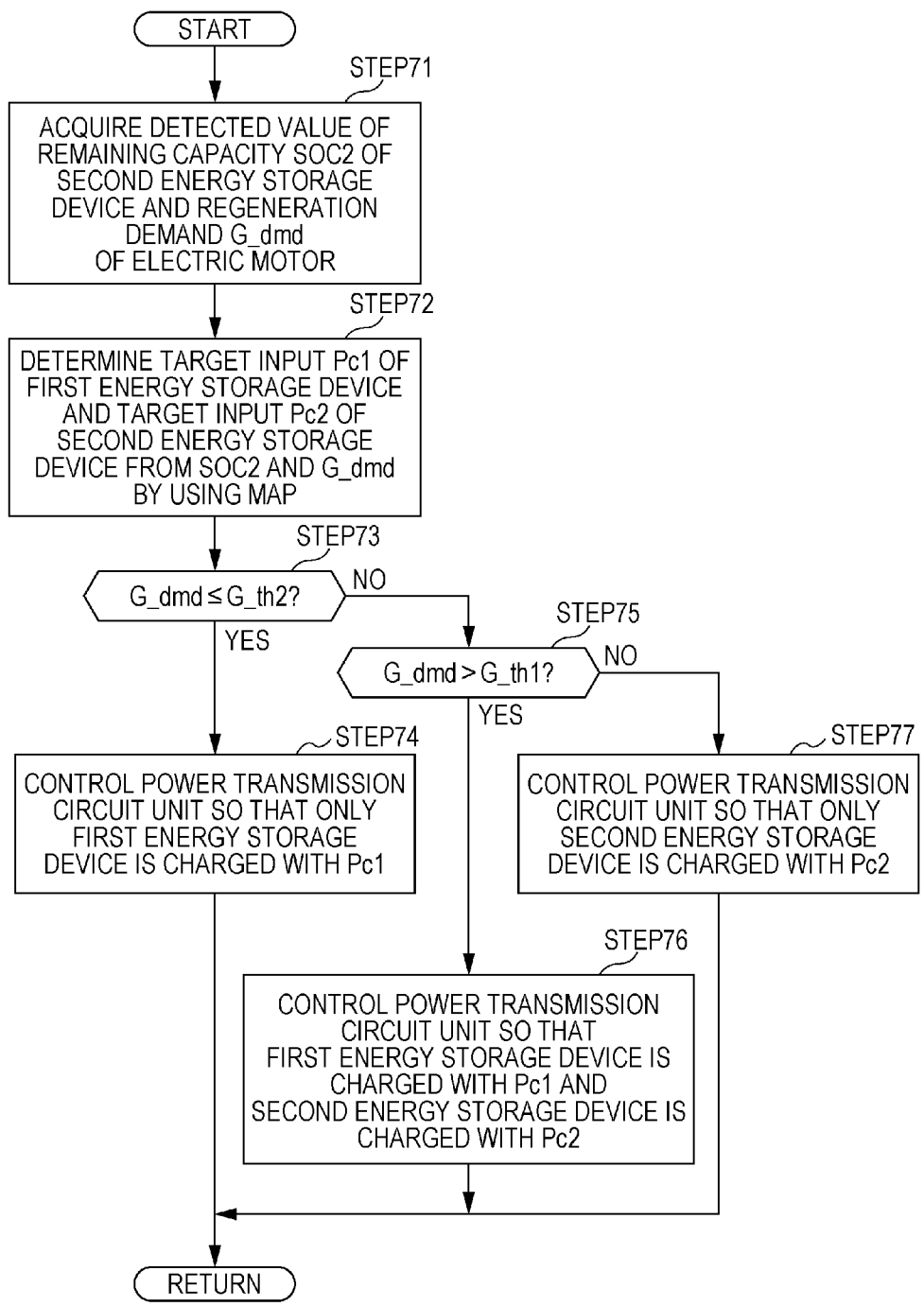
FIG. 24 is a flowchart illustrating a control process for the control device during the regenerative operation of the electric motor according to a third embodiment of the present disclosure.

In this embodiment, the control process for the power transmission controller 41 during the regenerative operation of the electric motor 100 is executed at intervals of a predetermined control process period in a way illustrated in a flowchart in FIG. 24.

Specifically, in STEP71, the power transmission controller 41 acquires a detected value of the second remaining capacity SOC2 and a regeneration demand G_dmd of the electric motor 100. The processing of STEP71 is the same or substantially the same as the processing of STEP51 in the first embodiment.

Then, in STEP72, the power transmission controller 41 determines the respective target inputs Pc1 and Pc2 (amounts of target charging power) of the first energy storage device 2 and the second energy storage device 3 from the detected value of the second remaining capacity SOC2 and the regeneration demand G_dmd of the electric motor 100 on the basis of a map created in advance.

In this case, the map used in this embodiment (how areas are separated by the threshold values G_th1 and G_th2) is the same or substantially the same as that in the second embodiment (illustrated in FIG. 23). In this embodiment, however, the energy storage device to be charged in the shaded area within which the regeneration demand G_dmd is larger than the threshold value G_th2 and is less than or equal to the threshold value G_th1 is different from that in the second embodiment.

In this embodiment, the shaded area illustrated in FIG. 23 is an area within which only the second energy storage device 3 is charged. When the combination of the detected value of the second remaining capacity SOC2 and the regeneration demand G_dmd falls within the shaded area illustrated in FIG. 23, the target input Pc1 of the first energy storage device 2 is set to zero and the regeneration demand G_dmd is set as the target input Pc2 of the second energy storage device 3.

The method of setting the target inputs Pc1 and Pc2 within the bottom diagonally hatched area and the top diagonally hatched area illustrated in FIG. 23 is the same or substantially the same as that in the second embodiment.

Then, in STEP73, the power transmission controller 41 determines whether or not the regeneration demand G_dmd is less than or equal to the threshold value G_th2.

The determination result of STEP73 is affirmative within the bottom diagonally hatched area illustrated in FIG. 23. In this situation, in STEP74, the power transmission controller 41 controls the power transmission circuit unit 11 so that only the first energy storage device 2 is charged with the target input Pc1.

In this case, specific control of the power transmission circuit unit 11 can be performed in a manner similar to that in the processing of STEP64 in the second embodiment.

On the other hand, when the determination result of STEP73 is negative, then, in STEP75, the power transmission controller 41 further determines whether or not the regeneration demand G_dmd is larger than the threshold value G_th1.

The determination result of STEP75 is affirmative within the top diagonally hatched area illustrated in FIG. 23. In this situation, in STEP76, the power transmission controller 41 controls the power transmission circuit unit 11 so that the first energy storage device 2 and the second energy storage device 3 are charged with the target inputs Pc1 and Pc2, respectively.

In this case, specific control of the power transmission circuit unit 11 can be performed in a manner similar to that in the processing of STEP54 in the first embodiment.

The determination result of STEP75 is negative within the shaded area illustrated in FIG. 23. In this case, in STEP77, the power transmission controller 41 controls the power transmission circuit unit 11 so that only the second energy storage device 3 is charged with the target input Pc2.

In this case, specific control of the power transmission circuit unit 11 can be performed in a manner similar to that in the processing of STEP55 in the first embodiment.

In this embodiment, the control process for the power transmission controller 41 during the regenerative operation of the electric motor 100 is executed in the way described above.

The control process for the power transmission controller 41 during the regenerative operation is executed in the way described above, thereby allowing, when the regeneration demand G_dmd is a small regenerative value less than or equal to the threshold value G_th2, the first energy storage device 2 to be charged with the small regenerative value. In this case, as in the second embodiment, the first energy storage device 2 can be charged slowly at a low charging rate. This allows the first energy storage device 2 to be charged while preventing the progression of deterioration of the first energy storage device 2. Hence, the drivable range of the vehicle can be extended.

When the regeneration demand G_dmd is larger than the threshold value G_th2, only the second energy storage device 3 is charged with regenerative power corresponding to the regeneration demand G_dmd so long as the threshold value G_th1 is not exceeded. In this case, even if the second energy storage device 3 is not charged at a low charging rate, deterioration of the second energy storage device 3 is less likely to progress. This can facilitate rapid charging of the second energy storage device 3. Thus, the power transmission circuit unit 11 can be controlled with high stability during the regenerative operation.

The correspondences between components illustrated in this embodiment and components disclosed herein will now be further explained below. In this embodiment, the control process performed during the regenerative operation illustrated in FIG. 24 corresponds to a regenerative power charging process disclosed herein the present disclosure.

The other correspondences between components illustrated in this embodiment and components disclosed herein are the same as those for the first embodiment.

As a supplementary explanation, in the second or third embodiment, when the regeneration demand G_dmd is larger than the threshold value G_th1, a regenerative value corresponding to the difference between the threshold value G_th1 and the threshold value G_th2 (a regenerative value corresponding to the difference obtained by subtracting a regenerative value that coincides with the threshold value G_th2 from a regenerative value that coincides with the threshold value G_th1) may be set as the target input Pc2 of the second energy storage device 3 and the residual regenerative value, which is obtained by subtracting the target input Pc2 of the second energy storage device 3 from the regeneration demand G_dmd, may be set as the target input Pc1 of the first energy storage device 2.

Modifications

There will now be described some modifications which may be made to the first to third embodiments described above.

In the embodiments described above, for each of the control modes in the normal combined-use control process, the second temperature T2 is classified into two ranges for the cases where T2≥T2_th is satisfied and where T2<T2_th is satisfied, and the respective target-remaining-capacity areas corresponding to these ranges of the second temperature T2 are set. Alternatively, in each control mode, the second temperature T2 may be classified into more than two ranges and the respective target-remaining-capacity areas corresponding to the ranges may be set.

Alternatively, the number of ranges into which the second temperature T2 is classified may differ for each of the plurality of control modes.

In the embodiments described above, furthermore, in a process for changing the base supplied power P1_base to be output from the first energy storage device 2 in accordance with the first temperature T1 for each of the control modes in the normal combined-use control process, the first temperature T1 is classified into two ranges for the cases where T1≥T1_th is satisfied and where T1<T1_th is satisfied, and the respective base supplied powers P1_base corresponding to these ranges of the first temperature T1 are set to change the amount of charging power supplied from the first energy storage device 2 to charge the second energy storage device 3 in accordance with the first temperature T1. Alternatively, in each control mode, the first temperature T1 may be classified into more than two ranges and the respective base supplied powers P1_base corresponding to the ranges may be set.

Alternatively, the number of ranges into which the first temperature T1 is classified may differ for each of the plurality of control modes.

In addition, the operation of changing the amount of charging power supplied from the first energy storage device 2 to charge the second energy storage device 3 in accordance with the first temperature T1 may be omitted. For example, the maximum value P1b of the base supplied power P1_base in each control mode may be set to a constant value regardless of the first temperature T1.

In addition, the embodiments described above provide the power supply system 1, which is configured to control the power transmission circuit unit 11 by using three control modes, namely, the first to third control modes. The number of control modes of the power transmission circuit unit 11 may be two or more than three. Alternatively, the power supply system 1 may be configured to control the power transmission circuit unit 11 by using only one of the first to third control modes.

In different control modes, only one of the base supplied power P1_base and the upper limit B2_th1 of the target-remaining-capacity area (medium-remaining-capacity area) may be different. For example, a control mode in which only one of the maximum value P1b of the base supplied power P1_base and the upper limit B2_th1 is different from that in the first control mode may be additionally used or may be used in place of the second control mode or the third control mode.

In the embodiments described above, furthermore, the first energy storage device 2 can be charged with the regenerative power during the regenerative operation of the electric motor 100. However, only the second energy storage device 3 may be charged with the regenerative power without the first energy storage device 2 being charged with the regenerative power. In this case, the first energy storage device 2 may be implemented as a non-rechargeable energy storage device such as a fuel cell or an air battery.

In the embodiments described above, furthermore, the extended-stop control process is executed. However, the extended-stop control process may be omitted.

In the embodiments described above, furthermore, the driving force demand DT_dmd of the electric motor 100 is used as the output demand of the electric motor 100 (electric load). Alternatively, for example, an amount of energy to be supplied to the electric motor 100 per unit time in response to the driving force demand DT_dmd or a request value for the current flowing through the electric motor 100 (the request value for the amount of charge per unit time) which corresponds to the driving force demand DT_dmd may be used as the output demand of the electric motor 100 (electric load).

In the embodiments described above, furthermore, the electric load is the electric motor 100, by way of example but not limited. The electric load may be an electric actuator other than the electric motor 100, or may be an electrical device that does not output any mechanical power.

In addition, a transportation device in which the power supply system 1 is mounted is not limited to an electrically driven vehicle. The transportation device may be a hybrid vehicle, for example, or may be a ship, a railway vehicle, or any other device.

A power supply system according to an aspect of the present disclosure includes a first energy storage device, a second energy storage device, a power transmission circuit unit, and a control device. The power transmission circuit unit is disposed in a power transmission path among an electric load, the first energy storage device, and the second energy storage device, and is configured to be capable of controlling power transmission among the electric load, the first energy storage device, and the second energy storage device in accordance with a control signal provided to the power transmission circuit unit. The electric load is activated upon being supplied with power from at least one of the first energy storage device and the second energy storage device. The control device is configured to have a function of controlling the power transmission circuit unit. The control device is configured to acquire a remaining capacity of the second energy storage device and a temperature of the second energy storage device, and is configured to further have a function of executing a target-remaining-capacity area setting process and a remaining-capacity adjusting process. The target-remaining-capacity area setting process is a process for setting a target-remaining-capacity area of the second energy storage device to be variable in accordance with the temperature of the second energy storage device. The remaining-capacity adjusting process is a process for controlling the power transmission circuit unit to cause the remaining capacity of the second energy storage device to converge to a value within the target-remaining-capacity area (a first aspect of the present disclosure).

Certain terms as used herein will be briefly explained below. The phrase "the power transmission circuit unit is capable of controlling power transmission among the electric load, the first energy storage device, and the second energy storage device" refers to that the power transmission circuit unit at least has a function of being capable of allowing selective switching control of the source and destination of power supply among the electric load, the first energy storage device, and the second energy storage device and controlling a supplied power from the source to the destination.

The "supplied power" refers to an "amount of electricity" to be output from or supplied to the target of power. The "amount of electricity" is expressed as an amount of electrical energy per unit time (for example, a value of (electric) power) or an amount of charge per unit time (for example, a value of current), for example.

The "remaining capacity" may be either an amount of electric power (for example, an amount of electric power expressed in ampere hours (Ah)) stored in an energy storage device (the first energy storage device or the second energy storage device) or a charging rate (expressed in percentages (%)) given by dividing the amount of electric power by a fully charged capacity of the energy storage device.

Based on the terms defined above, exemplary embodiments of the present disclosure will now be described.

According to the first aspect of the present disclosure, the control device executes a target-remaining-capacity area setting process to set a target-remaining-capacity area of the second energy storage device to be variable in accordance with the temperature of the second energy storage device. In addition, the control device executes a remaining-capacity adjusting process to control the power transmission circuit unit to cause the remaining capacity of the second energy storage device to converge to a value within the target-remaining-capacity area.

In the remaining-capacity adjusting process, the remaining capacity of the second energy storage device may be caused to converge to a value within the target-remaining-capacity area from a remaining capacity value higher than the target-remaining-capacity area by controlling the power transmission circuit unit to supply power from the second energy storage device to one or both of the electric load and the first energy storage device (discharging the second energy storage device).

The remaining capacity of the second energy storage device may be caused to converge to a value within the target-remaining-capacity area from a remaining capacity value lower than the target-remaining-capacity area by controlling the power transmission circuit unit to supply power from the first energy storage device to charge the second energy storage device (this operation includes supplying power from the first energy storage device to the electric load in parallel to charging the second energy storage device) or by controlling the power transmission circuit unit to charge the second energy storage device with regenerative power generated by the electric load (this operation includes charging both the first energy storage device and the second energy storage device with the regenerative power).

According to the first aspect of the present disclosure, as described above, the control device executes the target-remaining-capacity area setting process and the remaining-capacity adjusting process, thus enabling the remaining capacity of at least the second energy storage device out of the first energy storage device and the second energy storage device to be kept much as possible within a remaining-capacity area (target-remaining-capacity area) suitable for the temperature conditions of the second energy storage device.

In the first aspect of the present disclosure, energy storage devices having different characteristics or specifications may be used as the first energy storage device and the second energy storage device. In this case, preferably, the second energy storage device is an energy storage device having a higher resistance to deterioration due to charging than the first energy storage device (a second aspect of the present disclosure).

The phrase "the second energy storage device has a higher resistance to deterioration due to charging than the first energy storage device (in other words, the first energy storage device has a lower resistance to deterioration due to charging than the second energy storage device)" refers to that deterioration of the second energy storage device caused by charging is less likely to progress than that of the first energy storage device or that deterioration of the first energy storage device caused by charging is more likely to progress than that of the second energy storage device.

According to the second aspect of the present disclosure, the second energy storage device has a higher resistance to deterioration due to charging than the first energy storage device. Thus, rapid progression of deterioration of the second energy storage device caused by the charging of the second energy storage device in the remaining-capacity adjusting process is avoided.

In the second aspect of the present disclosure, preferably, the control device is configured to perform the remaining-capacity adjusting process so that the remaining-capacity adjusting process does not include controlling the power transmission circuit unit to supply power from the second energy storage device to charge the first energy storage device (a third aspect of the present disclosure).

According to this configuration, the first energy storage device having a lower resistance to deterioration due to charging than the second energy storage device is not charged with power supplied from the second energy storage device when, for example, the second energy storage device is discharged during the remaining-capacity adjusting process. Thus, rapid progression of deterioration of the first energy storage device can be prevented.

In the first to third aspects of the present disclosure, preferably, the second energy storage device is an energy storage device having a higher power density and a lower energy density than the first energy storage device (a fourth aspect of the present disclosure).

According to this configuration, the second energy storage device out of the first energy storage device and the second energy storage device has a relatively high power density and the remaining capacity of the second energy storage device is adjusted through the remaining-capacity adjusting process. Thus, even if the output demand of the electric load changes over a comparatively large range, a supplied power corresponding to the output demand of the electric load can be supplied with high responsivity.

In addition, since the first energy storage device has a relatively high energy density, it is possible to increase the length of the period during which power can be continuously supplied to the electric load.

Accordingly, a combination of the first energy storage device and the second energy storage device can realize an energy source with both increased power density and energy density, which is difficult to realize with a single type of energy storage device.

The "output demand" of an electric load refers to an expression that specifies a request value for an amount of electricity required to activate the electric load. The request value for the amount of electricity itself may be used as the "output demand". For example, if the electric load is designed to generate a mechanical output (dynamic or kinetic energy) corresponding to the amount of electricity to be supplied to the electric load, a request value for the mechanical output may be used as the "output demand" of the electric load.

The "supplied power corresponding to the 'output demand'" refers to an amount of power to be supplied to the electric load to meet the "output demand".

In the first to fourth aspects of the present disclosure, preferably, the remaining-capacity adjusting process executed by the control device includes a first process and a second process. The first process is a process for controlling the power transmission circuit unit to supply power from the first energy storage device to the electric load while charging the second energy storage device with power supplied from the first energy storage device. The second process is a process for controlling the power transmission circuit unit to supply power from at least one of the first energy storage device and the second energy storage device to the electric load, and the at least one of the first energy storage device and the second energy storage device includes the second energy storage device (a fifth aspect of the present disclosure).

According to this configuration, when the remaining capacity of the second energy storage device is lower than the lower limit of the target-remaining-capacity area, the first process is executed, thereby enabling the remaining capacity of the second energy storage device to be increased to a value within the target-remaining-capacity area while supplying power to the electric load.

When the remaining capacity of the second energy storage device is higher than the upper limit of the target-remaining-capacity area, the second process is executed, thereby enabling the remaining capacity of the second energy storage device to be decreased to be a value within the target-remaining-capacity area while supplying power to the electric load.

When the remaining capacity of the second energy storage device is within the target-remaining-capacity area, for example, the first process or the second process is executed as appropriate, thereby enabling the remaining capacity of the second energy storage device to be prevented from deviating toward the lower-limit side or the upper-limit side from the target-remaining-capacity area.

Accordingly, it is possible to appropriately execute the remaining-capacity adjusting process during supply of power to the electric load (during the activation of the electric load).

In the fifth aspect of the present disclosure, preferably, in a case where the electric load is an electric load capable of outputting regenerative power when no power is supplied to the electric load, the control device is configured to further have a function of executing a regenerative power charging process for controlling the power transmission circuit unit to charge the second energy storage device with all or part of the regenerative power when the regenerative power is output from the electric load, and is configured to set the target-remaining-capacity area to be variable in accordance with the temperature of the second energy storage device in the target-remaining-capacity area setting process so that, when the temperature of the second energy storage device is lower than a predetermined threshold temperature, at least an upper limit of the target-remaining-capacity area, which has the upper limit and a lower limit, is set to a value lower than a value set when the temperature of the second energy storage device is higher than the threshold temperature (a sixth aspect of the present disclosure).

According to this configuration, in a condition where the temperature of the second energy storage device is lower than a predetermined threshold temperature (hereinafter sometimes referred to as the low-temperature condition of the second energy storage device), the upper limit of the target-remaining-capacity area is set to a value lower than that in a condition where the temperature of the second energy storage device is higher than the predetermined threshold temperature (hereinafter sometimes referred to as the non-low-temperature condition of the second energy storage device). Thus, in the low-temperature condition where the second energy storage device has a comparatively high impedance, a remaining-capacity area of the second energy storage device (a remaining-capacity area higher than the upper limit of the target-remaining-capacity area) within which it is not necessary to charge the second energy storage device in the first process is extended compared with that in the non-low-temperature condition of the second energy storage device.

In the low-temperature condition of the second energy storage device, therefore, it is possible to prevent the occurrence of a situation in which electrical energy in the first energy storage device is lost as power loss by the impedance of the second energy storage device (a situation in which power is supplied from the first energy storage device to charge the second energy storage device).

In addition, since the upper limit of the target-remaining-capacity area in the low-temperature condition of the second energy storage device is lower than that in the non-low-temperature condition, the remaining capacity of the second energy storage device is kept at a remaining capacity value lower than that in the non-low-temperature condition through the remaining-capacity adjusting process. In the low-temperature condition of the second energy storage device, therefore, it is possible to charge the second energy storage device with a larger amount of regenerative power than that in the non-low-temperature condition. Consequently, it is possible to avoid, as much as possible, the occurrence of a situation in which there is a shortage of supplied power that can be supplied from the second energy storage device to the electric load.

In the sixth aspect of the present disclosure, preferably, in a case where the first energy storage device is an energy storage device having a lower resistance to deterioration due to charging than the second energy storage device, the control device is configured to control the power transmission circuit unit to charge both the first energy storage device and the second energy storage device with the regenerative power in the regenerative power charging process in such a manner that a proportion of power in the regenerative power which is used to charge the first energy storage device is smaller than a proportion of power in the regenerative power which is used to charge the second energy storage device or in such a manner that an amount of charging power used to charge the first energy storage device is less than or equal to a predetermined value (a seventh aspect of the present disclosure).

According to this configuration, the first energy storage device having a lower resistance to deterioration due to charging than the second energy storage device is prevented from being charged with regenerative power. This can prevent rapid progression of deterioration of the first energy storage device caused by charging. In particular, combining the seventh aspect of the present disclosure with the third aspect of the present disclosure can increase the effect of preventing the progression of deterioration of the first energy storage device caused by charging.

In the fifth to seventh aspects of the present disclosure, preferably, the control device is configured to execute the first process so that an amount of charging power supplied from the first energy storage device to charge the second energy storage device in the first process changes in accordance with the remaining capacity of the second energy storage device (an eighth aspect of the present disclosure).

According to this configuration, it is possible to adjust the amount of charging power used to charge the second energy storage device in the first process in accordance with the remaining capacity of the second energy storage device.

In the eighth aspect of the present disclosure, more specifically, preferably, the control device is configured to execute the first process so that the amount of charging power supplied from the first energy storage device to charge the second energy storage device in the first process decreases as the remaining capacity of the second energy storage device approaches an upper limit of the target-remaining-capacity area (a ninth aspect of the present disclosure).

According to this configuration, when the remaining capacity of the second energy storage device is smaller than the lower limit of the target-remaining-capacity area, the amount of charging power supplied from the first energy storage device to charge the second energy storage device is comparatively large. This allows the remaining capacity of the second energy storage device to be rapidly returned to within the target-remaining-capacity area.

As the remaining capacity of the second energy storage device approaches the upper limit of the target-remaining-capacity area, the amount of charging power supplied from the first energy storage device to charge the second energy storage device becomes small, which can prevent the remaining capacity of the second energy storage device from deviating toward the upper limit of the target-remaining-capacity area.

Accordingly, it is possible to execute the first process so that the remaining capacity of the second energy storage device is likely to fall within the target-remaining-capacity area.

In the fifth to ninth aspects of the present disclosure, preferably, the control device is configured to acquire a temperature of the first energy storage device, and is configured to execute the first process so that an amount of charging power supplied from the first energy storage device to charge the second energy storage device in the first process changes in accordance with the temperature of the first energy storage device (a tenth aspect of the present disclosure).

According to this configuration, it is possible to adjust the amount of charging power used to charge the second energy storage device in the first process in accordance with the temperature of the first energy storage device.

In the tenth aspect of the present disclosure, more specifically, preferably, the control device is configured to execute the first process so that the amount of charging power supplied from the first energy storage device to charge the second energy storage device in the first process decreases as the temperature of the first energy storage device decreases (a eleventh aspect of the present disclosure).

According to this configuration, in a condition where the temperature of the first energy storage device is relatively low (a condition where the first energy storage device has a relatively high impedance), a total supplied power to be output from the first energy storage device to the electric load and the second energy storage device is reduced compared with a condition where the temperature of the first energy storage device is relatively high. This can prevent electrical energy in the first energy storage device from being excessively lost as power loss by the impedance of the first energy storage device when the temperature of the first energy storage device is relatively low.

In the fifth to eleventh aspects of the present disclosure, preferably, in a case where the first energy storage device is an energy storage device having a lower resistance to deterioration due to changes in an input or output of the first energy storage device than the second energy storage device, the control device is configured to execute the first process in such a manner that a sensitivity of a change in the output of the first energy storage device to a change in an output demand of the electric load in the first process is relatively lower than a sensitivity of a change in an input of the second energy storage device to a change in the output demand of the electric load (a twelfth aspect of the present disclosure).

The phrase "the first energy storage device has a lower resistance to deterioration due to changes in an input or output of the first energy storage device than the second energy storage device" refers to that deterioration of the first energy storage device is more likely to progress than that of the second energy storage device (in other words, deterioration of the second energy storage device is less likely to progress than that of the first energy storage device) as a result of comparison between the degree of progression of deterioration of the first energy storage device when the input or output of the first energy storage device frequently changes and the degree of progression of deterioration of the second energy storage device when the input or output of the second energy storage device frequently changes.

The input of the first energy storage device refers to an amount of electricity (an amount of charging power) to be input to the first energy storage device, and the output of the first energy storage device refers to an amount of electricity output from (an amount of power discharged from) the first energy storage device. The same applies to the input and output of the second energy storage device.

According to the twelfth aspect of the present disclosure, the first process can be executed in such a manner that changes in the output of the first energy storage device which are caused by changes in the output demand of the electric load are less likely to occur than changes in the input of the second energy storage device. This can prevent the progression of deterioration of the first energy storage device.

In the twelfth aspect of the present disclosure, for example, the following configuration may be used. The control device may be configured to control the power transmission circuit unit to output a base supplied power set regardless of the output demand of the electric load from the first energy storage device in the first process in such a manner as to supply a supplied power that is a portion of the base supplied power corresponding to the output demand of the electric load to the electric load and charge the second energy storage device with a supplied power equal to a difference obtained by subtracting the supplied power that is a portion of the base supplied power corresponding to the output demand of the electric load from the base supplied power (a thirteenth aspect of the present disclosure).

According to this configuration, in the first process, the base supplied power, which is a supplied power to be output from the first energy storage device, is not set as a function value of the value of the output demand, and thus is not or less likely to be affected by changes in the output demand. This can ensure the stability of the output of the first energy storage device during the execution of the first process. Thus, the progression of deterioration of the first energy storage device can be restrained.

Furthermore, a supplied power that is a portion of the base supplied power corresponding to the output demand of the electric load is supplied to the electric load and a supplied power equal to a difference obtained by subtracting the supplied power that is a portion of the base supplied power corresponding to the output demand of the electric load from the base supplied power is supplied to charge the second energy storage device. This allows the second energy storage device to be charged with power supplied from the first energy storage device while supplying the supplied power corresponding to the output demand to the electric load.

In this case, the input of the second energy storage device (the amount of charging power) changes in response to a change in the output demand of the electric load. However, the second energy storage device has a relatively high resistance to deterioration due to changes in an input or output of the second energy storage device. Thus, deterioration of the second energy storage device is less likely to progress.

In the thirteenth aspect of the present disclosure, the first process is executed under a condition that the output demand of the electric load is smaller than the base supplied power.

In the thirteenth aspect of the present disclosure, preferably, the control device is configured to set the base supplied power to be variable in accordance with the remaining capacity of the second energy storage device (a fourteenth aspect of the present disclosure).

According to this configuration, it is possible to adjust the amount of charging power used to charge the second energy storage device in the first process in accordance with the remaining capacity of the second energy storage device while preventing the progression of deterioration of the first energy storage device.

When the progression of deterioration of the second energy storage device with regard to the capacity retention ratio and the like is likely to be affected by the remaining capacity of the second energy storage device, for example, when the second energy storage device is an energy storage device having a high power density, the base supplied power can be set by reflecting the degree to which the remaining capacity of the second energy storage device has an effect on the progression of deterioration of the second energy storage device. Thus, it is also possible to prevent the progression of deterioration of the second energy storage device.

In the thirteenth or fourteenth aspect of the present disclosure, preferably, the control device is configured to acquire a temperature of the first energy storage device, and is configured to set the base supplied power to be variable in accordance with the temperature of the first energy storage device (a fifteenth aspect of the present disclosure).

According to this configuration, as in the tenth aspect of the present disclosure, it is possible to adjust the amount of charging power used to charge the second energy storage device in the first process in accordance with the temperature of the first energy storage device.

In the fifteenth aspect of the present disclosure, more specifically, preferably, the control device is configured to set the base supplied power so that the base supplied power decreases as the temperature of the first energy storage device decreases (a sixteenth aspect of the present disclosure).

According to this configuration, the amount of charging power supplied from the first energy storage device to charge the second energy storage device in the first process can be reduced as the temperature of the first energy storage device decreases.

As a result, as in the eleventh aspect of the present disclosure, it is possible to prevent electrical energy in the first energy storage device from being excessively lost as power loss by the impedance of the first energy storage device when the temperature of the first energy storage device is relatively low.

In the first to sixteenth aspects of the present disclosure, the control device may be configured to further have a function of controlling the power transmission circuit unit in a plurality of control modes in such a manner as to control the power transmission circuit unit in different ways when power is to be supplied to the electric load, and may be configured to execute the remaining-capacity adjusting process and the target-remaining-capacity area setting process in each of the plurality of control modes in such a manner as to, in the target-remaining-capacity area setting process, set the target-remaining-capacity area to be variable in accordance with the temperature of the second energy storage device and the control mode (a seventeenth aspect of the present disclosure).

According to this configuration, a target-remaining-capacity area suitable for the temperature of the second energy storage device can be set for each control mode.

In the seventeenth aspect of the present disclosure, when the plurality of control modes include control modes having different upper limits of the target-remaining-capacity area, for example, the control device may be configured to set an upper limit of the target-remaining-capacity area for each of the plurality of control modes in the target-remaining-capacity area setting process so that the upper limit of the target-remaining-capacity area is variable in accordance with the temperature of the second energy storage device, and may be configured to execute the target-remaining-capacity area setting process so that a magnitude relationship between the upper limits of the target-remaining-capacity area in the plurality of control modes is kept constant regardless of a change in the temperature of the second energy storage device (an eighteenth aspect of the present disclosure).

According to this configuration, it is possible to set a target-remaining-capacity area suitable for the temperature of the second energy storage device for each control mode without causing a change in the feature difference between the operation characteristics of power transmission systems corresponding to a plurality of control modes in accordance with the temperature of the second energy storage device.

As a supplementary explanation, in the eighteenth aspect of the present disclosure, for example, the second energy storage device may be an energy storage device having a higher power density and a lower energy density than the first energy storage device. It is now assumed that a second control mode among the plurality of control modes is a control mode having a higher upper limit of the target-remaining-capacity area than a first control mode. In this case, in the second control mode, the remaining capacity of the second energy storage device is more likely to be kept higher than that in the first control mode. Thus, the second control mode is a control mode in which the amount of power to be supplied to the electric load can be made more highly responsive to changes in the output demand of the electric load than in the first control mode.

It is further assumed that a third control mode among the plurality of control modes is a control mode having a lower upper limit of the target-remaining-capacity area than the first control mode. In this case, in the third control mode, a situation in which power is supplied from the first energy storage device to charge the second energy storage device is less likely to occur than in the first control mode. Hence, in the third control mode, electrical energy in the first energy storage device is prevented from being lost as power loss by charging the second energy storage device, compared with the first control mode. The third control mode is thus a control mode in which the length of the period during which power can be continuously supplied to the electric load can be increased compared with the first control mode.

In the first to eighteenth aspects of the present disclosure, the electric load may be, for example, an electric motor (a nineteenth aspect of the present disclosure).

In the nineteenth aspect of the present disclosure, preferably, the power transmission circuit unit includes a voltage converter that converts an output voltage of at least one of the first energy storage device and the second energy storage device to produce a voltage and outputs the produced voltage, and an inverter that converts a direct-current power input from the first energy storage device, the second energy storage device, or the voltage converter into an alternating-current power and supplies the alternating-current power to the electric motor (a twentieth aspect of the present disclosure).

According to this configuration, it is possible to appropriately control power transmission among an electric motor serving as the electric load, the first energy storage device, and the second energy storage device.

Further, a transportation device according to another aspect of the present disclosure includes the power supply system according to the first to twentieth aspects of the present disclosure (a twenty-first aspect of the present disclosure). This transportation device is implementable as a transportation device that achieves the advantages described above with reference to the first to twentieth aspects of the present disclosure.

Further, a power transmission method of the present disclosure is a method for power transmission among an electric load, a first energy storage device, and a second energy storage device in a power supply system that includes the first energy storage device and the second energy storage device and that is configured to supply power from at least one of the first energy storage device and the second energy storage device to the electric load. The power transmission method includes the steps of setting a target-remaining-capacity area of the second energy storage device to be variable in accordance with a temperature of the second energy storage device, and performing the power transmission to cause a remaining capacity of the second energy storage device to converge to a value within the target-remaining-capacity area (a twenty-second aspect of the present disclosure).

This configuration enables, as in the first aspect of the present disclosure, the remaining capacity of at least the second energy storage device out of the first energy storage device and the second energy storage device to be kept much as possible within a remaining-capacity area (target-remaining-capacity area) suitable for the temperature conditions of the second energy storage device.

Obviously, numerous modifications and variations of the present invention are possible in light of the above teachings. It is therefore to be understood that within the scope of the appended claims, the invention may be practiced otherwise than as specifically described herein.

What is claimed is:

1. A power supply system comprising:
   a first energy storage to supply electric power to an electric load;
   a second energy storage to supply electric power to the electric load;
   a power transmission circuit via which the electric load is connected to the first energy storage and to the second energy storage; and
   circuitry configured to:
   acquire a remaining capacity of the second energy storage;
   acquire a temperature of the second energy storage;
   determine a target remaining capacity range of the second energy storage in accordance with the temperature such that at least one of an upper limit and a lower limit of the target remaining capacity range is lowered if the temperature is lower than a predetermined threshold temperature; and
   control the power transmission circuit to control power transmission among the electric load, the first energy storage, and the second energy storage such that the remaining capacity of the second energy storage is within the target remaining capacity range.

2. The power supply system according to claim 1, wherein the second energy storage is an energy storage device having a higher resistance to deterioration due to charging than the first energy storage.

3. The power supply system according to claim 2, wherein the circuitry is configured not to control the power transmission circuit to supply power from the second energy storage to charge the first energy storage.

4. The power supply system according to claim 1, wherein the second energy storage is an energy storage device having a higher power density and a lower energy density than the first energy storage.

5. The power supply system according to claim 1, wherein the circuitry is configured to perform
- a first process for controlling the power transmission circuit to supply power from the first energy storage to the electric load while charging the second energy storage with power supplied from the first energy storage, and
- a second process for controlling the power transmission circuit to supply power from at least one of the first energy storage and the second energy storage to the electric load, the at least one of the first energy storage and the second energy storage including the second energy storage.

6. The power supply system according to claim 5,
wherein the electric load is configured to output regenerative power when no power is supplied to the electric load, and
wherein the circuitry is configured to
  further have a function of executing a regenerative power charging process for controlling the power transmission circuit to charge the second energy storage with all or part of regenerative power when the regenerative power is output from the electric load, and
  set the target remaining capacity range to be variable in accordance with the temperature of the second energy storage so that, when the temperature of the second energy storage is lower than the predetermined threshold temperature, at least the upper limit of the target remaining capacity range, which has the upper limit and the lower limit, is set to a value lower than a value set when the temperature of the second energy storage is higher than the threshold temperature.

7. The power supply system according to claim 6, wherein the first energy storage is an energy storage device having a lower resistance to deterioration due to charging than the second energy storage, and
  wherein the circuitry is configured to control the power transmission circuit to charge both the first energy storage and the second energy storage with the regenerative power in the regenerative power charging process in such a manner that a proportion of power in the regenerative power which is used to charge the first energy storage is smaller than a proportion of power in the regenerative power which is used to charge the second energy storage or in such a manner that an amount of charging power used to charge the first energy storage is less than or equal to a predetermined value.

8. The power supply system according to claim 5, wherein the circuitry is configured to execute the first process so that an amount of charging power supplied from the first energy storage to charge the second energy storage in the first process changes in accordance with the remaining capacity of the second energy storage.

9. The power supply system according to claim 8, wherein the circuitry is configured to execute the first process so that the amount of charging power supplied from the first energy storage to charge the second energy storage in the first process decreases as the remaining capacity of the second energy storage approaches the upper limit of the target remaining capacity range.

10. The power supply system according to claim 5, wherein the circuitry is configured to acquire a temperature of the first energy storage, and is configured to execute the first process so that an amount of charging power supplied from the first energy storage to charge the second energy storage in the first process changes in accordance with the temperature of the first energy storage.

11. The power supply system according to claim 10, wherein the circuitry is configured to execute the first process so that the amount of charging power supplied from the first energy storage to charge the second energy storage in the first process decreases as the temperature of the first energy storage decreases.

12. The power supply system according to claim 5, wherein the first energy storage is an energy storage device having a lower resistance to deterioration due to changes in an output of the first energy storage than the second energy storage, and
  wherein the circuitry is configured to execute the first process in such a manner that a sensitivity of a change in the output of the first energy storage to a change in an output demand of the electric load in the first process is relatively lower than a sensitivity of a change in an input of the second energy storage to a change in the output demand of the electric load in the first process.

13. The power supply system according to claim 12, wherein the circuitry is configured to control the power transmission circuit to output a base supplied power from the first energy storage in the first process, the base supplied power being set regardless of the output demand of the electric load, in such a manner as to
  supply a supplied power that is a portion of the base supplied power corresponding to the output demand of the electric load to the electric load, and
  charge the second energy storage with a supplied power equal to a difference obtained by subtracting the supplied power that is a portion of the base supplied power corresponding to the output demand of the electric load from the base supplied power.

14. The power supply system according to claim 13, wherein the circuitry is configured to set the base supplied power to be variable in accordance with the remaining capacity of the second energy storage.

15. The power supply system according to claim 13, wherein the circuitry is configured to acquire a temperature of the first energy storage, and is configured to set the base supplied power to be variable in accordance with the temperature of the first energy storage.

16. The power supply system according to claim 15, wherein the circuitry is configured to set the base supplied power so that the base supplied power decreases as the temperature of the first energy storage decreases.

17. The power supply system according to claim 1,
  wherein the circuitry is configured to lower the lower limit of the target remaining capacity range if the temperature is lower than the predetermined threshold temperature, and wherein the circuitry is configured to control the power transmission circuit to supply the electric power from the second energy storage to charge the first energy storage such that the remaining capacity of the second energy storage is within the target remaining capacity range.

18. A power supply system comprising:
a first energy storage to supply electric power to an electric load;
a second energy storage to supply electric power to the electric load;
a power transmission circuit via which the electric load is connected to the first energy storage and to the second energy storage; and
circuitry configured to:
acquire a remaining capacity of the second energy storage;
acquire a temperature of the second energy storage;
determine a target remaining capacity range of the second energy storage in accordance with the temperature; and
control the power transmission circuit to control power transmission among the electric load, the first energy storage, and the second energy storage such that the remaining capacity of the second energy storage is within the target remaining capacity range,
wherein the circuitry is configured to
further have a function of controlling the power transmission circuit in a plurality of control modes in such a manner as to control the power transmission circuit in different ways when power is to be supplied to the electric load, and
execute determination of the remaining capacity and control of the power transmission circuit in each of the plurality of control modes in such a manner as to set the target remaining capacity range to be variable in accordance with the temperature of the second energy storage and the control mode.

19. The power supply system according to claim 18, wherein the plurality of control modes include control modes having different upper limits of the target remaining capacity range, and
wherein the circuitry is configured to
set an upper limit of the target remaining capacity range for each of the plurality of control modes so that the upper limit of the target remaining capacity range is variable in accordance with the temperature of the second energy storage, and
execute the determination of the target remaining capacity range so that a magnitude relationship between the upper limits of the target remaining capacity range in the plurality of control modes is kept constant regardless of a change in the temperature of the second energy storage.

20. A power transmission method for power transmission among an electric load, a first energy storage, and a second energy storage, the power transmission method comprising:
acquiring a remaining capacity of the second energy storage;
acquiring a temperature of the second energy storage;
determining a target remaining capacity range of the second energy storage in accordance with the temperature such that at least one of an upper limit and a lower limit of the target remaining capacity range is lowered if the temperature is lower than a threshold temperature; and
controlling, by a charger controller, the power transmission among the electric load, the first energy storage, and the second energy storage such that the remaining capacity of the second energy storage is within the target remaining capacity range.

* * * * *